United States Patent
Bader-Natal et al.

(10) Patent No.: US 10,805,365 B2
(45) Date of Patent: *Oct. 13, 2020

(54) SYSTEM AND METHOD FOR TRACKING EVENTS AND PROVIDING FEEDBACK IN A VIRTUAL CONFERENCE

(71) Applicant: Minerva Project, Inc., San Francisco, CA (US)

(72) Inventors: Ari Bader-Natal, Pacifica, CA (US); Brandon Tilley, San Francisco, CA (US); Stephen Michael Kosslyn, San Francisco, CA (US); Jonathan Scott Katzman, San Francisco, CA (US); Matthew Michael Regan, Seattle, WA (US); Ben Nelson, San Francisco, CA (US)

(73) Assignee: MINERVA PROJECT, INC., San Francisco, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/167,130

(22) Filed: Oct. 22, 2018

(65) Prior Publication Data

US 2019/0124128 A1 Apr. 25, 2019

Related U.S. Application Data

(63) Continuation of application No. 15/613,894, filed on Jun. 5, 2017, now Pat. No. 10,110,645, which is a (Continued)

(51) Int. Cl.
*H04N 7/14* (2006.01)
*H04L 29/06* (2006.01)
(Continued)

(52) U.S. Cl.
CPC ........ *H04L 65/4038* (2013.01); *G06F 3/0482* (2013.01); *G06F 3/04817* (2013.01);
(Continued)

(58) Field of Classification Search
CPC ...................................................... H04N 7/14
See application file for complete search history.

(56) References Cited

U.S. PATENT DOCUMENTS

| 5,559,875 A | * | 9/1996 | Bieselin | .................. | H04M 3/56 |
| | | | | | 379/202.01 |
| 5,601,436 A | | 2/1997 | Sudman et al. | | |

(Continued)

FOREIGN PATENT DOCUMENTS

| JP | 06-266632 A | 9/1994 |
| JP | 11-344920 A | 12/1999 |

(Continued)

OTHER PUBLICATIONS

Extended European Search Report for Application No. 15837998.2, dated May 15, 2018, 12 pages.
(Continued)

*Primary Examiner* — Olisa Anwah
(74) *Attorney, Agent, or Firm* — Nicholson De Vos Webster & Elliott LLP

(57) ABSTRACT

A virtual conferencing system is described which tracks events during a virtual conference, provides a user interface for reviewing the events, and allows a moderator and/or other participant to provide feedback related to the events. For example, one embodiment of a virtual conferencing system comprises: a plurality of clients operated by participants and at least one moderator of a virtual conference, each of the clients comprising state management logic to maintain a current state of the virtual conference; a virtual conferencing service to establish audio and/or video con-
(Continued)

nections between the plurality of clients during the virtual conference, the virtual conferencing service further including a state synchronization service communicatively coupled to the state management logic on each client to ensure that the current state of the virtual conference is consistent on each client; a virtual conferencing graphical user interface (GUI) to be rendered on the plurality of clients, the virtual conferencing GUI configured, via signals sent from the state synchronization service, to display a video stream of one or more current speakers during the virtual conference utilizing the established video connections; and a contribution identification module to identify events related to actions of participants during the virtual conference; an event log to store the events identified by the contribution identification module; and an event filter to provide options for searching for specific types of events within the event log based on input from the moderator and/or participants when reviewing a recording of the virtual conference, the event filter to generate a filtered set of events based on the input from the moderator and/or participants.

24 Claims, 67 Drawing Sheets

Related U.S. Application Data continuation of application No. 14/840,471, filed on Aug. 31, 2015, now Pat. No. 9,674,243.

(60) Provisional application No. 62/046,859, filed on Sep. 5, 2014, provisional application No. 62/046,879, filed on Sep. 5, 2014, provisional application No. 62/046,880, filed on Sep. 5, 2014.

(51) Int. Cl.
*G06F 3/0484* (2013.01)
*G06F 3/0481* (2013.01)
*G06F 3/0482* (2013.01)
*H04N 7/15* (2006.01)
*G06Q 10/10* (2012.01)

(52) U.S. Cl.
CPC ....... *G06F 3/04842* (2013.01); *G06Q 10/101* (2013.01); *H04L 65/1089* (2013.01); *H04L 65/1093* (2013.01); *H04L 65/403* (2013.01); *H04L 65/4015* (2013.01); *H04N 7/148* (2013.01); *H04N 7/15* (2013.01); *H04N 7/152* (2013.01)

(56) References Cited

U.S. PATENT DOCUMENTS

| | | | |
|---|---|---|---|
| 5,634,018 A | 5/1997 | Tanikoshi et al. | |
| 5,767,897 A | 6/1998 | Howell | |
| 5,909,874 A | 6/1999 | Daniel et al. | |
| 6,091,408 A | 7/2000 | Treibitz et al. | |
| 6,286,034 B1 | 9/2001 | Sato et al. | |
| 6,397,036 B1 | 5/2002 | Thean et al. | |
| 6,587,438 B1 | 7/2003 | Brendel | |
| 6,850,609 B1* | 2/2005 | Schrage | H04M 3/42221 379/158 |
| 6,909,874 B2 | 6/2005 | Holtz et al. | |
| 7,058,891 B2 | 6/2006 | O'Neal et al. | |
| 7,133,513 B1* | 11/2006 | Zhang | H04M 3/42221 379/202.01 |
| 7,225,227 B2 | 5/2007 | Omura et al. | |
| 7,228,332 B2 | 6/2007 | Rust | |
| 7,330,541 B1 | 2/2008 | Surazski et al. | |
| 7,418,090 B2* | 8/2008 | Reding | H04M 3/42221 379/202.01 |
| 7,447,608 B1 | 11/2008 | Poston et al. | |
| 7,454,460 B2 | 11/2008 | Ivashin | |
| 7,454,708 B2 | 11/2008 | O'Neal et al. | |
| 8,095,409 B2 | 1/2012 | Swanson | |
| 8,330,794 B2 | 12/2012 | Ramanathan et al. | |
| 8,370,142 B2* | 2/2013 | Frankel | G10L 15/32 704/235 |
| 8,549,159 B1 | 10/2013 | Ogdon et al. | |
| 8,581,958 B2 | 11/2013 | Baker et al. | |
| 8,660,251 B2 | 2/2014 | Miller et al. | |
| 8,670,018 B2 | 3/2014 | Cunnington et al. | |
| 8,850,320 B2 | 9/2014 | Taylor | |
| 9,003,303 B2 | 4/2015 | Jones et al. | |
| 9,077,849 B2 | 7/2015 | Meek | |
| 9,111,263 B2 | 8/2015 | Li et al. | |
| 9,154,531 B2 | 10/2015 | Kashi et al. | |
| 9,292,814 B2 | 3/2016 | Bentley et al. | |
| 9,298,342 B2 | 3/2016 | Zhang et al. | |
| 9,329,833 B2 | 5/2016 | Swierk et al. | |
| 9,354,763 B2 | 5/2016 | Latulipe et al. | |
| 9,477,380 B2 | 10/2016 | Amijee et al. | |
| 9,483,161 B2 | 11/2016 | Wenger et al. | |
| 9,729,823 B2 | 8/2017 | Meek et al. | |
| 9,734,485 B2 | 8/2017 | Sahai et al. | |
| 9,792,026 B2 | 10/2017 | Bloch et al. | |
| 2002/0140724 A1 | 10/2002 | Qureshi et al. | |
| 2003/0122863 A1 | 7/2003 | Dieberger et al. | |
| 2003/0191805 A1 | 10/2003 | Seymour et al. | |
| 2004/0008249 A1 | 1/2004 | Nelson et al. | |
| 2004/0047461 A1 | 3/2004 | Weisman et al. | |
| 2004/0103150 A1 | 5/2004 | Ogdon et al. | |
| 2004/0113934 A1 | 6/2004 | Kleinman | |
| 2004/0117194 A9 | 6/2004 | Lee et al. | |
| 2005/0099492 A1 | 5/2005 | Orr | |
| 2005/0102360 A1 | 5/2005 | Chavis et al. | |
| 2005/0131714 A1 | 6/2005 | Braunstein et al. | |
| 2005/0198139 A1 | 9/2005 | Malkin et al. | |
| 2006/0106872 A1 | 5/2006 | Leban et al. | |
| 2006/0224430 A1 | 10/2006 | Butt | |
| 2006/0259552 A1 | 11/2006 | Mock et al. | |
| 2007/0124682 A1 | 5/2007 | Fukeda et al. | |
| 2007/0172045 A1 | 7/2007 | Nguyen et al. | |
| 2007/0206759 A1* | 9/2007 | Boyanovsky | H04M 3/42221 379/202.01 |
| 2007/0299710 A1 | 12/2007 | Haveliwala | |
| 2008/0022209 A1 | 1/2008 | Lyle | |
| 2008/0183808 A1 | 7/2008 | Salesky et al. | |
| 2008/0254434 A1 | 10/2008 | Calvert | |
| 2009/0037821 A1 | 2/2009 | O'Neal et al. | |
| 2009/0172550 A1 | 7/2009 | Dantec et al. | |
| 2009/0263777 A1 | 10/2009 | Kohn | |
| 2010/0037151 A1 | 2/2010 | Ackerman et al. | |
| 2010/0077319 A1 | 3/2010 | Xu et al. | |
| 2010/0151431 A1 | 6/2010 | Miller | |
| 2010/0158213 A1* | 6/2010 | Mikan | H04M 3/42221 379/88.14 |
| 2011/0244953 A1 | 10/2011 | Pekau et al. | |
| 2011/0264705 A1 | 10/2011 | Diamond | |
| 2012/0127262 A1 | 5/2012 | Wu et al. | |
| 2012/0296688 A1 | 11/2012 | Dayasindhu et al. | |
| 2012/0323575 A1* | 12/2012 | Gibbon | G11B 27/28 704/246 |
| 2013/0007635 A1 | 1/2013 | Michaelis et al. | |
| 2013/0024789 A1 | 1/2013 | Adkins et al. | |
| 2013/0058471 A1* | 3/2013 | Garcia | H04M 3/42221 379/202.01 |
| 2013/0070045 A1 | 3/2013 | Meek et al. | |
| 2013/0091205 A1 | 4/2013 | Kotler et al. | |
| 2013/0145269 A1 | 6/2013 | Latulipe et al. | |
| 2013/0169742 A1 | 7/2013 | Wu et al. | |
| 2013/0203485 A1 | 8/2013 | Walker et al. | |
| 2013/0305147 A1 | 11/2013 | McBride et al. | |
| 2014/0099624 A1 | 4/2014 | Dohring et al. | |
| 2014/0200944 A1 | 7/2014 | Henriksen et al. | |
| 2014/0297350 A1 | 10/2014 | Kidron et al. | |

(56) References Cited

U.S. PATENT DOCUMENTS

2014/0320588 A1   10/2014   Midtun et al.
2015/0149929 A1    5/2015   Shepherd et al.
2015/0373063 A1   12/2015   Vashishtha et al.

FOREIGN PATENT DOCUMENTS

JP       2005-215086 A    8/2005
JP       2008-033732 A    2/2008

OTHER PUBLICATIONS

Final Office Action from U.S. Appl. No. 15/613,894, dated Mar. 22, 2018, 19 pages.
Final Office Action from U.S. Appl. No. 14/840,546, dated Sep. 24, 2018, 17 pages.
International Preliminary Report on Patentability for Application No. PCT/US2015/048593, dated Mar. 16, 2017, 8 pages.
International Search Report and Written Opinion for Application No. PCT/US2015/048593, dated Feb. 2, 2016, 12 pages.
Non-Final Office Action from U.S. Appl. No. 14/840,438, dated Feb. 18, 2016, 9 pages.
Non-Final Office Action from U.S. Appl. No. 14/840,471, dated Apr. 8, 2016, 9 pages.
Non-Final Office Action from U.S. Appl. No. 14/840,471, dated Jul. 29, 2016, 9 pages.
Non-Final Office Action from U.S. Appl. No. 14/840,513, dated Oct. 28, 2016, 13 pages.
Non-Final Office Action from U.S. Appl. No. 14/840,546, dated Mar. 30, 2018, 24 pages.
Non-Final Office Action from U.S. Appl. No. 15/613,894, dated Nov. 27, 2017, 11 pages.
Notice of Allowance from U.S. Appl. No. 15/613,894, dated Jul. 17, 2018, 13 pages.
Notice of Allowance from U.S. Appl. No. 14/840,438, dated Jun. 7, 2016, 9 pages.
Notice of Allowance from U.S. Appl. No. 14/840,438, dated Sep. 16, 2016, 9 pages.
Notice of Allowance from U.S. Appl. No. 14/840,471, dated Mar. 16, 2017, 11 pages.
Notice of Allowance from U.S. Appl. No. 14/840,471, dated Nov. 21, 2016, 7 pages.
Notice of Allowance from U.S. Appl. No. 14/840,513, dated Mar. 2, 2017, 5 pages.
Partial Supplementary European Search Report for Application No. 15837998.2, dated Feb. 12, 2018, 15 pages.
Requirement for Restriction/Election from U.S. Appl. No. 14/840,546, dated Feb. 13, 2018, 6 pages.
Non-Final Office Action from U.S. Appl. No. 14/840,546, dated Mar. 15, 2019, 18 pages.
Notice of Reasons for Refusal from foreign counterpart Japanese Patent Application No. 2017-531986, dated Jul. 16, 2019, 8 pages.
Applied Office, "Microsoft Powerpoint: Using Presenter View", avilable online at <appliedoffice.net/news/2009-jan/powerpoint.html>, Jan. 2009, 3 pages.
Communication under Rule 71(3) EPC, EP App. No. 15837998.2, dated May 8, 2019, 6 pages.
Decision to Grant pursuant to Article 97(1) EPC, EP App. No. 15837998.2, dated Oct. 10, 2019, 3 pages.
LibreOffice, "Impress Guide: Working with Presentations",Version 4.2, Aug. 26, 2014, 5 pages.
Non-Final Office Action, U.S. Appl. No. 14/840,546, dated Oct. 2, 2019, 14 pages.
Notice of Allowability, U.S. Appl. No. 14/840,546, dated Apr. 20, 2020, 2 pages.
Notice of Allowance, U.S. Appl. No. 14/840,546, dated Feb. 28, 2020, 11 pages.
Tex, "Is There a Nice Solution to get a "Presenter Mode" for Latex Presentations?", avilable online at <https://tex.stackexchange.com/questions/21777/is-there-a-nice-solution-to-get-a-presenter-mode-for-latex-presentations>, Jun. 28, 2011, 11 pages.
Decision to Grant a Patent, JP App. No. 2017-531986, dated May 11, 2020, 3 pages (2 pages of English Translation and 1 page of Original Document).

\* cited by examiner

Participant Thumbnails 701

Video of Student Raising Hand 901

Multimedia Replay from Class 1610

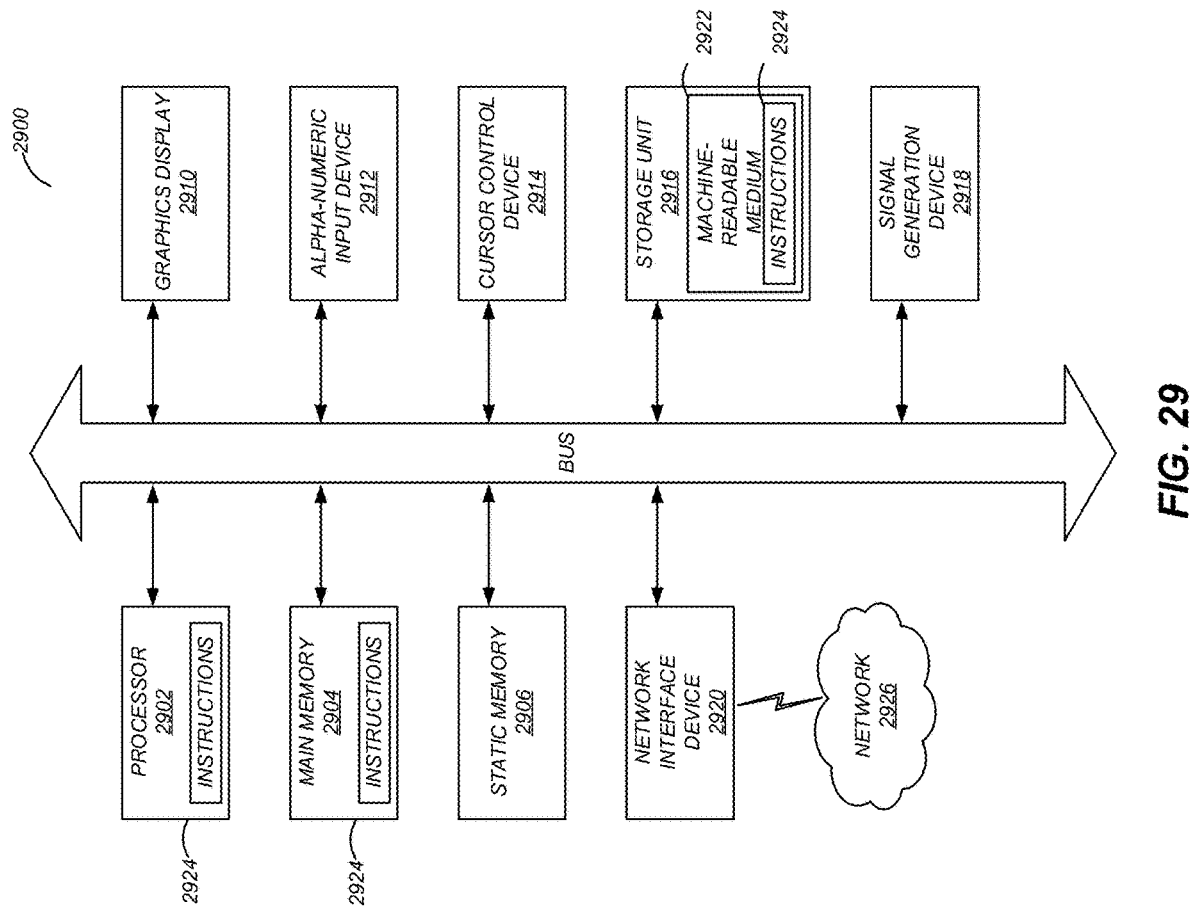

SYSTEM AND METHOD FOR TRACKING EVENTS AND PROVIDING FEEDBACK IN A VIRTUAL CONFERENCE

BACKGROUND

Field of the Invention

This invention relates generally to the field of computer systems. More particularly, the invention relates to a system and method for tracking events and providing feedback in a virtual conference.

Description of the Related Art

"Web conferencing" or "virtual conferencing" refers to various forms of online collaborative services including web seminars, webcasts, and peer-level web meetings. Web conferencing systems today support real-time audio and video streaming between participants, typically under the coordination of a central web conferencing server. Applications for web conferencing include online classrooms, meetings, training sessions, lectures, and seminars, to name a few.

Participants to a web conference such as students in a virtual classroom can benefit from formative feedback on their contributions during classroom discussions. Such feedback requires identifying, classifying, and/or assessing each contribution (e.g., spoken contribution, written contribution) by each individual participant, which may be time consuming and impractical. Notwithstanding the pedagogical value of formative feedback and assessment, the time and resources required in providing such feedback and assessment to participants can prevent or diminish this learning opportunity for participants.

BRIEF DESCRIPTION OF THE DRAWINGS

A better understanding of the present invention can be obtained from the following detailed description in conjunction with the following drawings, in which:

FIG. 29 illustrates a computer system in accordance with one embodiment of the invention.

DETAILED DESCRIPTION

Figure 1:
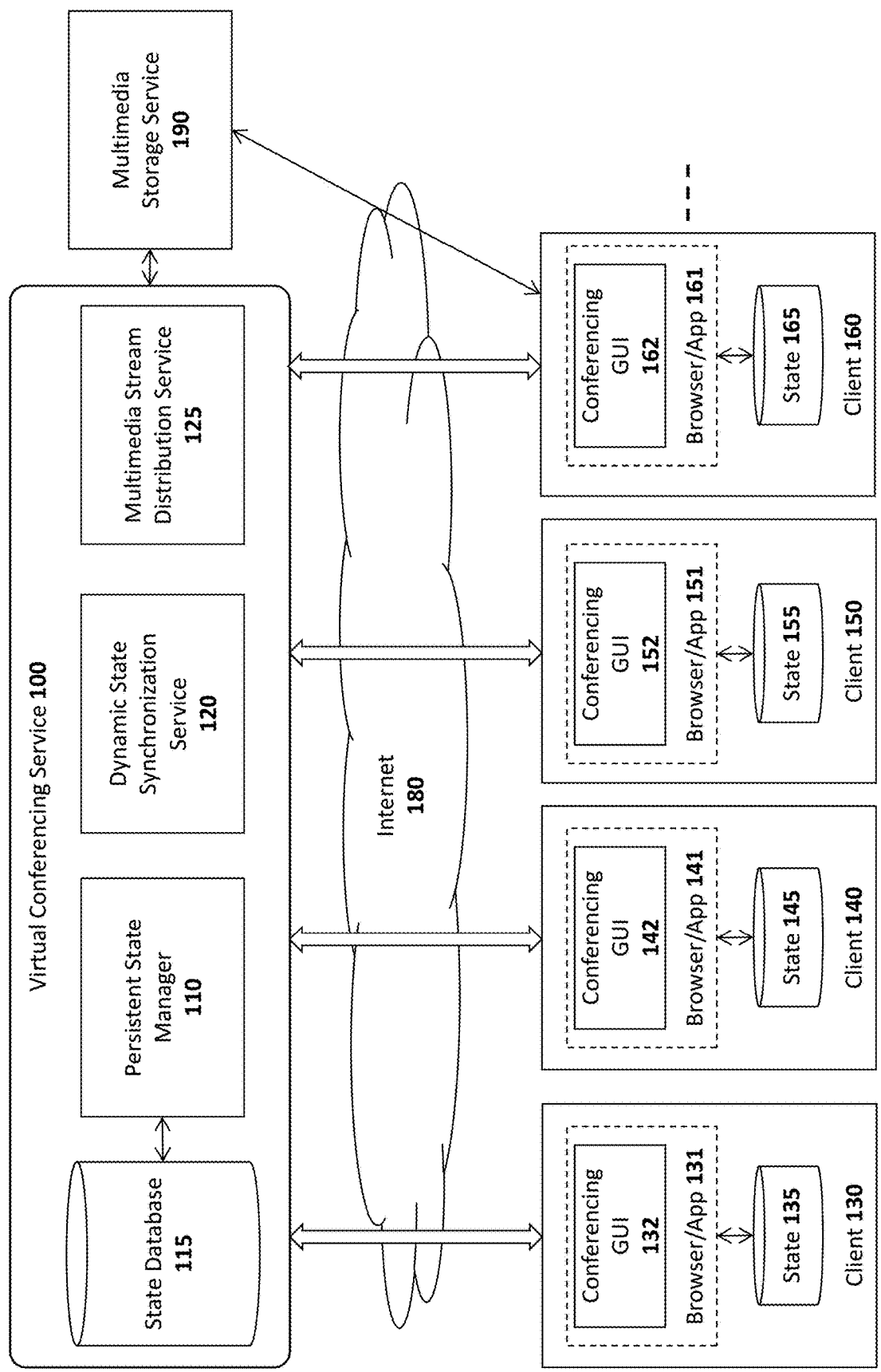
FIG. 1 illustrates an exemplary system architecture on which embodiments of the invention may be implemented.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention described below includes techniques for forming and managing a speaker queue, comprising an ordered set of participants scheduled to speak during the web conference. In one embodiment, participants may add themselves to the speaker queue by selecting a specified key or set of keys on the keyboard or by selecting a graphic within the graphical user interface. The speaker queue may be implemented as a first-in-first-out (FIFO) queue in which the current speaker is positioned at the first position or beginning of the queue and participants are initially placed at the last position or end of the queue (i.e., a participant moves towards the top of the speaker queue as each speaker finishes speaking and is removed from the top of the queue). In one embodiment, the professor/teacher or other moderator is designated to be the "default" speaker, and is always included in a default position in the queue (e.g., such as the bottom of the queue so that he/she reaches the top of the queue if no other participants are waiting to speak).

In addition, one embodiment of the invention includes techniques for subdividing the participants of a virtual conference into breakout groups. One embodiment of the invention automatically generates the breakout groups based on user profile information associated with each participant, previous interaction history associated with each participant, or any other data associated with participants in the virtual conferencing environment (e.g., for a group of 20 participants, 5 breakout groups of 4 participants each may be formed). One embodiment of the virtual conferencing system initially provides the professor/teacher or other moderator a set of recommended breakout groups, and then provides the moderator with the ability to edit the recommended groups (e.g., moving users between groups by clicking and dragging user icons via a graphical user interface), either before or after initiating the breakout groupings. In addition, each breakout group may be automatically provided with a set of materials (including both read-only documents and editable shared whiteboards and text editors) for working on the designated task and for storing the results generated by each breakout group. Once the breakout group session is complete, the virtual conferencing system may display the results for each breakout group, in turn, and provide each breakout group the opportunity to present the results (e.g., displaying the edited materials).

In addition, in some embodiments, an interactive timeline is implemented which may be used by a moderator to control the flow of a virtual conference and perform complex operations such as GUI adjustments with minimal effort. In addition, some embodiments provide techniques for automatically identifying speakers based on specified criteria; storing and filtering events identified during the course of a conference; providing feedback to conference participants (e.g., using the filtered events); and implementing discussions such as debates between two or more participants.

A. Architectural Overview

FIG. 1 illustrates a high level system architecture employed in one embodiment of the invention. In the illustrated embodiment, a plurality of clients 130, 140, 150, and 160 connect to a virtual conferencing service 100 over the Internet 180. The clients may comprise any form of end user devices including desktop/laptop computers (e.g., PCs or Macs), smartphones (e.g., iPhones, Android phones, etc), tablets (e.g., iPads, Galaxy Tablets, etc), and/or wearable devices (e.g., smartwatches such as the iWatch or Samsung Gear watch). Of course, the underlying principles of the invention are not limited to any particular form of user device.

In one embodiment, each of the client devices connect to the virtual conferencing service 100 through a browser or conferencing app/application 131, 141, 151, 161 which includes a graphical user interface 132, 142, 152, 162 to allow the end user to interact with the virtual conferencing service and participate in a virtual conference using the techniques described herein. In addition, each browser/app 131, 141, 151, 161 operates in accordance with a current state 135, 145, 155, 165 of the virtual conference which is synchronized between the clients 130, 140, 150, 160 using the synchronization techniques described below. By way of example, and not limitation, the current state 135 for client 130 may indicate positioning of the various graphical elements within the GUI 132, including the central position of the current speaker, a visual indication of the speaker queue, and a graphical representation and/or video images of participants in each breakout group.

In the illustrated embodiment, the virtual conferencing service 100 includes a persistent state manager 110 for persistently storing updates to the state of each virtual conference within a state database 115. As described in detail below, the state may be continually updated in response to user input provided via the browsers/apps 131, 141, 151, 161 running on the various clients 130, 140, 150, 160. In one embodiment, when a new participant joins the conference, the persistent state manager 110 provides the client with stored virtual conference state data required to synchronize the new client state with the state of the other clients participating in the conference. The persistent state manager 110 may be implemented with a Web server. However, the underlying principles of the invention are not limited to this implementation.

In one embodiment, after the client's state has been initialized from the virtual conference state database 115, a dynamic state synchronization service 120 provides dynamic state updates to the client in accordance with user input from all of the clients 130, 140, 150, 160 during the virtual conference. For example, one embodiment of the dynamic state synchronization service 120 implements a publish/subscribe mechanism in which each client publishes its own state updates to the dynamic state synchronization service 120. A client participating in the virtual conference subscribes to the dynamic state synchronization service 120 to receive the published state updates from all other clients (including itself). Thus, for a virtual conference in which Clients A-D are participants, if Client A publishes a state update (e.g., adding its user to the speaker queue), the dynamic state synchronization service 120 will forward the update to all subscribing clients (i.e., Clients A-D). This publish/subscribe mechanism is described in greater detail below. In addition, as discussed below, ordering techniques are employed in one embodiment to ensure that the state updates are applied to each client in the correct order (i.e., to ensure that the clients all remain in the same state).

In one embodiment, a multimedia stream distribution service 125 manages the receipt and distribution of audio and video streams for each of the clients 130, 140, 150, 160. In particular, in one embodiment, each client 130, 140, 150, 160 captures audio and/or video of its participant and streams the audio/video to the multimedia stream distribution service 125, which forwards the audio/video streams to each of the clients 130, 140, 150, 160. The audio is then decoded and output from speakers (not shown) and the video is decoded and rendered within each of the conferencing GUIs 132, 142, 152, 162 (examples provided below).

One embodiment of the multimedia stream distribution service 125 also implements a publish/subscribe mechanism in which each client subscribes to the audio/video streams from every other client. Thus, in the example shown in FIG. 1, Client 130 may subscribe to the audio/video streams of clients 140, 150, and 160. The particular resolution and/or frame rate of each video stream captured on each client may be dependent on the current state 135, 145, 155, 165 of the video conference. For example, when a participant is designated as the current speaker and is provided with the central speaking position within the GUI, that participant's client may capture video having a relatively higher resolution and/or frame rate than when the participant is not the speaker (i.e., and the video of the user is rendered within a small thumbnail region of the GUI). Choosing higher quality video for only the current speaker (or current set of speakers if multiple speakers are permitted) significantly reduces the bandwidth requirements of the system.

In one embodiment, a multimedia storage service 190 records audio/video content from the virtual conference and other related data to allow the moderator and/or participants to play back and review the virtual conference at a later time. For example, in a classroom environment, a professor or teacher may play back portions of the conference to review discussions among participants or questions which were posed during the conference. The professor or teacher may then provide feedback to the participants (e.g., clarifying and issue which was discussed, answering additional questions, providing positive reinforcement, etc).

The video and audio content stored on the multimedia storage service 190 may be a higher quality than the audio/video used during the live virtual conference. For example, each individual client may capture higher quality video and audio than may be possible to stream through the multimedia stream distribution service 130. The higher quality audio/video may be stored locally on each individual client 130, 140, 150, 160 during the virtual conference and may be uploaded to the multimedia storage service 190 following the conference. For example, each time a participant speaks, a local audio clip of the user's voice (e.g., an MP3 or AAC clip) may be recorded and subsequently uploaded to the multimedia storage service 190. Additionally, state data 135, 145, 155, 165 and/or other data required to reconstruct the virtual conference for playback may be stored on the multimedia storage service 190 (as described in greater detail below).

The multimedia storage service 190 may be an external service from which the virtual conferencing service purchases storage resources. In another embodiment, the multimedia storage service 190 is implemented as a separate module within the virtual conferencing service 100.

Additional details will now be provided for exemplary speaker queue and breakout group implementations, followed by a description of additional architectural details of the virtual conferencing service 100.

B. Speaker Queue Embodiments

In order to direct the visual attention of conference participants towards the focus of discussion in a multi-party conversation in a virtual conference, signals sent by participants themselves may be relied on to indicate an intention to speak. In contrast to systems which rely solely on speaker volume, this embodiment eliminates possible errors due to poor audio conditions, poor network connections, and ambiguity in speech patterns. For example, the signals sent by the participants can be used instead of or along with speech detection algorithms (e.g., manual or automatic).

Figure 2:
FIG. 2 illustrates one embodiment of a graphical user interface (GUI) which includes a center or primary speaker region and a speaker queue.

During a web video conference or virtual conference, meeting participants are provided with the ability to request and gain access to the "center of attention." For example, as illustrated in FIG. 2, a participant has the center of attention if the participant is displayed in the largest video element or in a center element in the virtual conference, referred to as the "current speaker position" 203. In one embodiment, this is done by a "push-to-talk" or "trigger-to-talk" mechanism where the participant holds down a particular key on the keyboard, presses a graphical indication in the virtual conference environment, or performs any other suitable trigger action that would indicate that the participant would like to talk, herein referred to as the "queue key." The queue key may also toggle the microphone mute status if the microphone was previously muted.

By pressing the queue key, the participant places him or herself into a speaker queue which may be synchronized across all of the clients 130, 140, 150, 160 using the dynamic state synchronization service 120 as described herein. As illustrated in FIG. 2, a visual indication 201 of the participants in the speaker queue may be rendered within the GUI of each client 130, 140, 150, 160. In one embodiment, each client 130, 140, 150, 160 maintains its own synchronized copy of the speaker queue. When a particular participant is added to the speaker queue (e.g., by holding the queue key), that participant is automatically added to the local speaker queue on the participant's client, thereby altering the local state. The local state change is then synchronized to the other clients through the publish/subscribe mechanism implemented by the dynamic state synchronization service. If another participant requested entry into the speaker queue at approximately the same time, the dynamic state synchronization service 120 resolves the potential conflict using an ordering mechanism (described in greater detail below) and propagates correct state updates to all of the clients 130, 140, 150, 160.

Thus, by holding the queue key, the participant ensures a place in the speaker queue and the speaker queue is made visible to all participants in the virtual conference. In FIG. 2, the visual representation of the speaker queue 201 displays each participant in the queue through screenshots of the video stream of the participant in the virtual conference or any other suitable digital representation of the participant (e.g., a picture, avatar, etc). Video of the speaker at the front of the queue is displayed within the current speaker position 203 of the GUI. In addition, in FIG. 2, thumbnails of all other participants 202 (or a subset thereof) in the virtual conference are displayed within the GUI.

One embodiment of the system tracks how long each participant is in the speaker queue, how long each participant is given the center of attention and how much each participant has talked (e.g., based on signal processing of the participant's visual cue while the participant was given the center of attention). In one embodiment, this is accomplished by setting/resetting programmable timers on each of the clients 130, 140, 150, 160 and/or on the virtual conferencing service 100. In one embodiment, the time allocated to speak may be controlled by the professor or teacher (or other moderator).

The same queue key can also be used to control the mute status of the microphone. If the microphone was previously muted, entering into the speaker queue by holding the queue key will also un-mute the microphone allowing the audio of that participant to be heard by all participants in the virtual conference. In another embodiment, the previously muted microphone may not be un-muted automatically and, instead, the microphone's status is presented to the participant or all participants. For example, if the microphone was muted prior to pressing the same key (or providing any of the other actions), then pressing the same key presents an indication that the microphone is currently muted.

The action of the participant joining the speaker queue is communicated to all other participants via a message or indication such as a speaker queue visualization or a display of the speaker queue 201. In one embodiment, this is delivered to clients through the publish/subscribe mechanism employed by the dynamic state synchronization service 120.

In one embodiment, one of the participants or a moderator/instructor is set as a "default" speaker (e.g., the professor, leader, or designated participant or student of the participants in the virtual conference) who may be configured as being "behind" the last participant in the speaker queue. Thus, when the speaker queue is empty, the default speaker is placed in the center and may indicate which participant should be given the center of attention. The default speaker can be designated, for example, by a professor to a student allowing the student to field or answer questions after a presentation is given (e.g., by the student).

The speaker queue 201 may be implemented as a First In, First Out (FIFO) queue and may have a default speaker associated with the queue. For example, the default speaker would be placed in the last or trailer position of the speaker queue. In one embodiment, a participant is added to the speaker queue (e.g., at the end of the speaker queue visually) by selecting a queue key and the participant is kept in the speaker queue by holding the queue key. The queue key can be a control key or any other suitable key on their keyboard and/or may be implemented as a graphical icon in the GUI (which the user selects via a mouse or a touch-pad). In one embodiment, a participant is removed from the speaker queue when he or she releases the designated queue key or deselects the graphical icon.

In one embodiment, the participant at the head of the speaker queue is given the center of attention by being visually featured in the conference. For example, the participant's visual cue is placed in a center element of the virtual conference or placed in the largest element in the virtual conference (e.g., center speaker position 203 in FIG. 2). Once the participant has been given the center of attention, the participant may be excluded/removed from the displayed speaker queue 201.

In one embodiment, the speaker queue is made visible to every participant in the virtual conference in a displayed speaker queue or queue visualization. For example, the displayed speaker queue 201 may be an array (e.g., horizontal, vertical, curved, etc.) of small photographs or visual cues of participants in the speaker queue. The displayed speaker queue can be in the bottom left-hand corner of the user interface of the virtual conferencing environment and positioned from left-to-right based on index or position of the participant in the speaker queue. Of course, the underlying principles of the invention are not limited to any particular visual representation of the speaker queue.

When the speaker queue is empty, the default speaker (e.g., in the trailer position of the speaker queue) is featured in the conference, for example, by being given the center of attention. The leader, web conference initiator, or professor can initially be the default speaker and/or can designate a default speaker. For example, the professor can designate the default speaker by selecting the designated participant's thumbnail video feed 202 or other visual cue in the list or group of visual cues (e.g., at top, bottom, or side of the virtual conference). In one embodiment, each participant's audio broadcasting is muted by default and may be unmuted in response to input from the participant (e.g., by the participant holding the queue key).

In one embodiment, when a participant presses and holds down the queue key, his or her microphone is un-muted. When the participant releases the queue key, the participant's microphone is muted again. In one embodiment, each speaker queue modification is synchronized to the clients of all participants via the publish/subscribe techniques implemented by the dynamic state synchronization service 120. In addition, data related to participation in the speaker queue may be stored by the virtual conferencing service 100 (and/or the external multimedia storage service 190) and later used to analyze participation activity (e.g., a length of time each participant was speaking).

While the embodiment in FIG. 2 illustrates a single speaker in a current speaker position 203, other embodiments may include multiple current speaker positions. For example, one embodiment of the invention includes multi-region layouts in which the center of attention is sub-divided into multiple "attention regions," allowing for the simultaneous display of more than one participant in the virtual conference. For example, FIG. 12 (discussed below) illustrates an embodiment with two attention regions for two different speakers. Another embodiment includes four attention regions arranged in a square or rectangle with two regions towards the top of the display and two regions towards the bottom of the display. Any number of attention regions may be generated while still complying with the underlying principles of the invention.

In these embodiments, a single speaker queue may be maintained for all attention regions. When a region becomes available (using the same criteria as with the single-region center of attention embodiments described herein), the first participant in the speaker queue is removed and the participant video is displayed in that attention region. In an alternate embodiment, each attention region may be assigned its own dedicated speaker queue (e.g., N speaker queues for N attention regions). This embodiment may be used, for example, to provide a dedicated attention region for each breakout group, to allow different members of the breakout group to take turns speaking within each dedicated attention region. In either of these embodiments, a "default speaker" may also be specified for each attention region.

In addition, in one embodiment, when a speaker occupies an attention region in the center of attention, the professor, leader, or designated participant can "pin" the speaker to that region (e.g., by selecting a key or graphical element within the GUI). Pinning a speaker has the same effect as if the speaker actively maintained the position by holding the push-to-talk activation key or alternative mechanism to maintain the featured position. In one embodiment, no other speaker will be moved from the speaker queue into the speaker position until the featured speaker is "unpinned" by the professor, leader, designated participant, or the featured speaker themselves.

C. Breakout Group Embodiments

In a traditional classroom environment or meeting, an instructor or meeting organizer determines how to subdivide a group (e.g., by having participants count off, dividing into pre-arranged groups or using some other heuristic). Once the groups are organized, the groups typically shuffle around the room to a designated spot to work together. The organizer may walk around to interact with each group. Once re-assembled, the groups may take turns presenting.

One embodiment of the invention provides support for the same functionality within a virtualized conferencing environment. Breakout groups can be formed by the virtual conferencing environment based on user profile information associated with each participant, previous interaction history associated with each participant or any other suitable historical data associated with each participant in the virtual conferencing environment. For example, this information includes past participation statistics associated with the participant, grades, performance in assignments, etc.

In another embodiment, the participant leading the virtual conference can also affect how the breakout groups are formed. For example, the participant can select to move participants between the formed breakout groups (e.g., using a graphical click-and-drag mechanism or other suitable actions), or indicate which participants should be in the same breakout group when the breakout groups are formed.

The participant leading the virtual conference can also determine a start and/or an end time associated with the session of formed breakout groups, for example, indicating when the breakout groups are formed and when the breakout groups are dissolved into additional breakout groups or one big group.

In one embodiment, each breakout group is provided with a copy of all associated materials and/or resources from the main group (e.g., a class) and can include any additional materials and/or resources needed to perform an assigned task or other suitable action in the virtual conference. Any participant may be provided with the ability to upload any type of material, as appropriate. Furthermore when the breakout groups are re-assembled into one big group or one or more additional breakout groups, the participant leading the virtual conference can access and feature the participants and their work (e.g., through the materials and/or additional materials).

Figure 3:
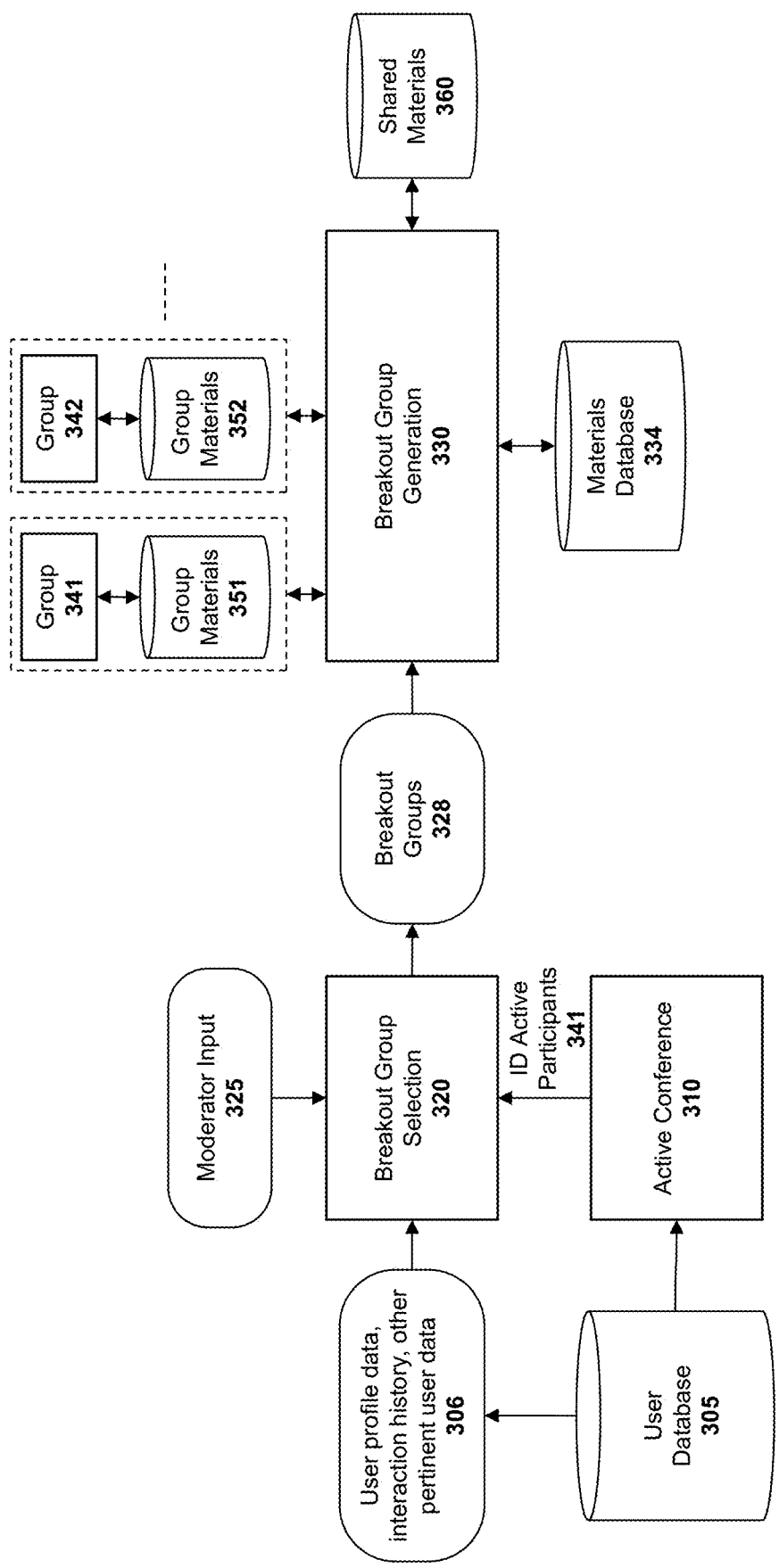
FIG. 3 illustrates one embodiment of an architecture for selecting breakout groups.

One embodiment of a logical architecture and flow for forming breakout groups is illustrated in FIG. 3. This architecture may be implemented in software modules executed within the virtual conferencing service 100, on the client machines 130, 140, 150, 160, or any combination thereof (e.g., with some operations performed on the virtual conferencing service and some on the clients).

In one embodiment, an active conference 310 is formed as participants log in and authenticate with the virtual conferencing service 100 (e.g., as participants arrive for class). A user database 305 containing user IDs and other pertinent information may be queried during the login process to uniquely identify each user. In one embodiment, a breakout group selection module 320 selects participants to be sub-divided into breakout groups in accordance with input from the moderator 325 (e.g., a processor or instructor), the identity of active participants in the conference 341, and other user data 306 which may be retrieved from the user database 305 (or a different database).

By way of example, and not limitation, the moderator input 325 may indicate that the moderator wishes for there to be four breakout groups, with randomly selected participants. In response, the breakout group selection module 320 will subdivide the active participants 341 into four groups, as close in size as possible. For example, if there are 28 students, then four groups of 7 participants will be created. If there are 26 students, then two groups of 7 and two groups of 6 will be formed. Rather than randomly selecting the participants, the breakout group selection module 320 may run through the list of active participants alphabetically (e.g., using the first or last names of the participants).

Alternatively, the participants in each breakout group may be pre-assigned by moderator ahead of the class or other meeting. In this embodiment, all that is required by the breakout group selection module 320 is the list of active participants 341.

In one embodiment, the breakout group selection module 320 may select an initial set of breakout groups which the moderator may then review and modify. For example, the initial set may be selected based on user profile data or other pertinent data 306 stored in the user database 305 such as the performance of each user in the class (e.g., ensuring that each group includes at least some higher performing participants). Performance may be based on the current grade of each participant in the class, the cumulative time that each participant has talked, the grade on a recent exam, and/or additional information provided by the moderator.

The breakout group selection module 320 may consider other pertinent data to generate the initial set of breakout groups such as participant relationships (e.g., frequency of interactions among participants); specific exercise outcomes; results from a poll (e.g., automatically grouping together participants who had similar or different responses); differing responses (e.g., automatically grouping together participants who had differing responses, in order to maximize likelihood of a productive learning exchange among participants); pre-class work; and order of arrival time to virtual conference or presence in virtual conference, to name a few. In one embodiment, the moderator may also specify a maximum size for breakout groups. The breakout group selection module 320 will then form the breakout groups in accordance with this maximum size.

In one embodiment, breakout groups may be formed by an indication or a trigger from a participant or moderator (e.g., selection of a button, voice activated). The indication or trigger may be implemented within the virtual conference GUI or may be specified on a second screen or mobile device connected to the virtual conference.

In one embodiment, once a breakout group is formed, the members of the breakout group will only receive and render video and/or audio of other members of the breakout group. The video/audio of the moderator may also be shared with the members of a breakout group when visiting the breakout group. This may be accomplished, for example, by muting the audio and disabling video rendering of streams for participants in all other groups. in another embodiment, the publish/subscribe mechanism in the multimedia stream distribution service 125 is updated to that a client only subscribes to the audio/video stream of other participants in the group. Various other mechanisms may be employed to ensure that audio is contained within each breakout group.

In one embodiment, End-of-Breakout indications are generated, warning when breakout groups are about to end and/or that the breakout groups will be formed into additional breakout groups or a larger group (e.g., the original group). The indications maybe visual (e.g., via a pop-up window), audible (e.g., via an alarm or ringtone), or any combination thereof.

In addition to having the ability to "visit" breakout groups, the processor or teacher may broadcast audio/video or messages to all of the breakout groups, and may also receive messages from one or more of the breakout groups (e.g., questions posed by participants).

Returning to FIG. 3, once the breakout groups 328 have been selected (i.e., the users in each breakout group identified using the techniques described above), breakout group generation logic 330 generates an instance of each breakout group, which may include (among other things) copies of materials from a materials database 334 to be used during the breakout sessions. In FIG. 3, for example, group materials 351 and 352 are provided to breakout groups 341 and 342, respectively. In one embodiment, the group materials 351 and 352 are copies of materials from the materials database 334 which may be independently edited by each respective group, 341 and 342. In addition, the same set of shared materials 360 may also be made available and shared by each breakout group.

In one embodiment, the materials and/or resources that may be distributed to all breakout groups include (but are not limited to) YouTube videos; PDF files; PowerPoint files; URLs; document notes; picture files in different forms; sound files (e.g., MP3); links to online sites; and any other visible or audible material capable of being reviewed and/or edited during for the breakout session.

In one embodiment, each the participants in a breakout group are provided with a shared text editor and whiteboard function via a note element in the virtual conference. The shared text editor may be implemented by program code executed on each client and/or the virtual conferencing service 100. Each participant in a breakout group can also add material or documents not visible to other breakout groups. These additional external materials may be kept private to the participants of the specific breakout group (i.e., stored as group materials 351-352 in FIG. 3).

In one embodiment, each breakout group is provided with a tool to draw and annotate on top of shared or private materials or resources. The annotation tool may be provided as program code executed on each client 130, 140, 150, 160 or on the virtual conferencing service 100 (or both).

One embodiment of the invention provides for group-specific dispersion of material. For example, the professor, teacher or other form of moderator may send particular documents and other resources (e.g., homework) to specific breakout groups (e.g., based on participants in the breakout group).

As mentioned, in one embodiment, the moderator (e.g., professor or teacher) send a written-text or spoken-audio message to all breakout groups and may join a breakout group and leave the breakout group to return to a bird's-eye overview of all breakout groups. In addition, the moderator may audibly listen to all/each breakout group individually without joining each breakout group and may oversee work happening within all breakout groups. The moderator may also view the materials being edited by each of the breakout groups (e.g., shared notes as they are being typed; whiteboards, as they are being drawn, annotations as they are being added). The moderator may further respond to individual questions raised by specific breakout groups; move/drag a participant from one breakout group into another breakout group or out of the formed breakout groups completely; and cancel breakout group formation and return to additional breakout groups or one big group.

In one embodiment, a breakout group can be featured (to other participants not in the breakout group). For example, the moderator may select the breakout group (e.g., click, voice activate) resulting in the presentation of the breakout group (and all the participants in the selected breakout group) in the center of the virtual conference. In one embodiment, when a breakout group is presenting, the dynamic state synchronization service 120 will ensure that the state updates on each client cause the members of the breakout group to have the center of attention. The moderator may also minimize the presentation of other participants not in the selected breakout group. Materials associated with the selected or featured breakout group may be presented in a similar manner.

Figure 4:
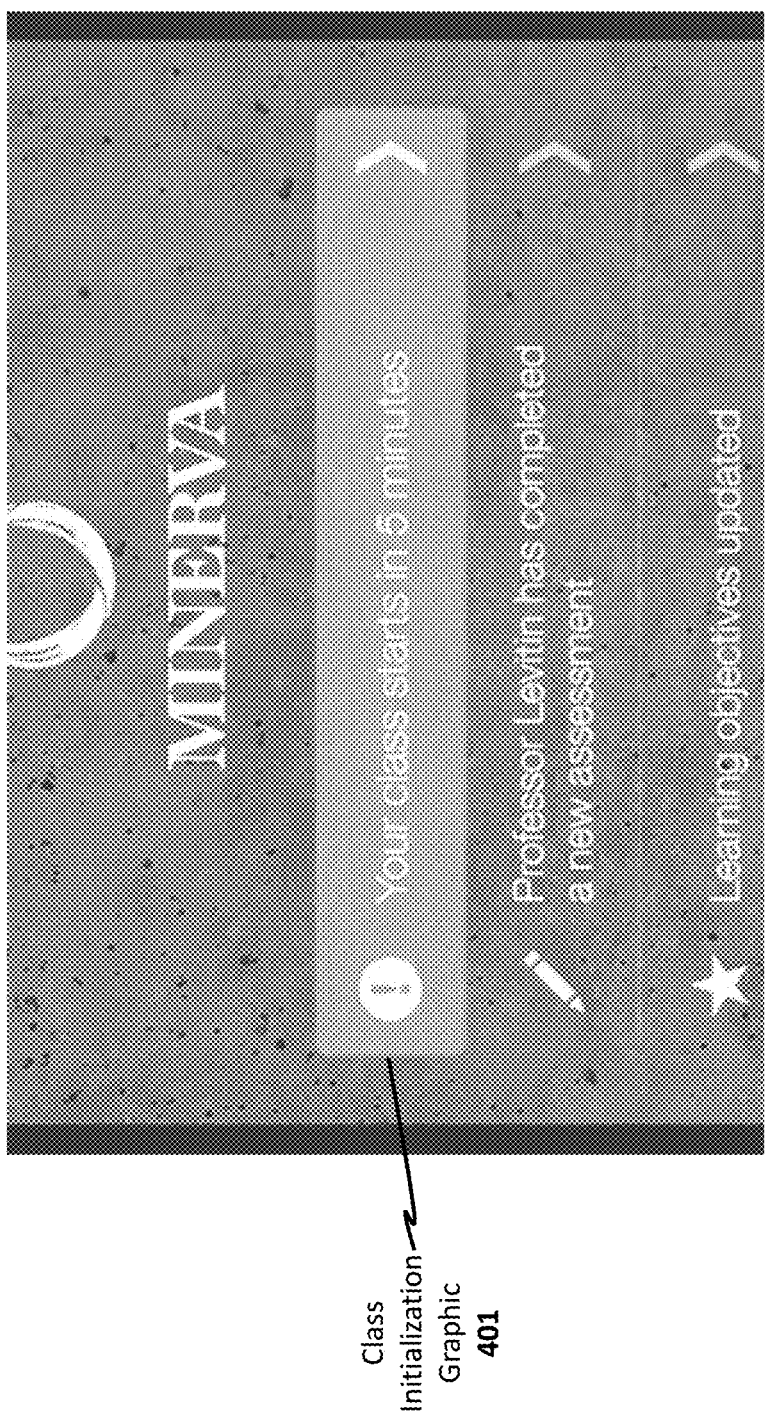
FIG. 4 illustrates a class initialization graphic for providing a participant entry into a virtual classroom.

Additional graphical user interface (GUI) features are illustrated in FIGS. 4-18. FIG. 4 illustrates an embodiment which may be displayed once a participant has logged in to the virtual conferencing service. A class initialization graphic 401 provides an indication of the amount of time before class begins (5 minutes in the example). The user may select the graphic to enter into the virtual classroom.

Figure 5:
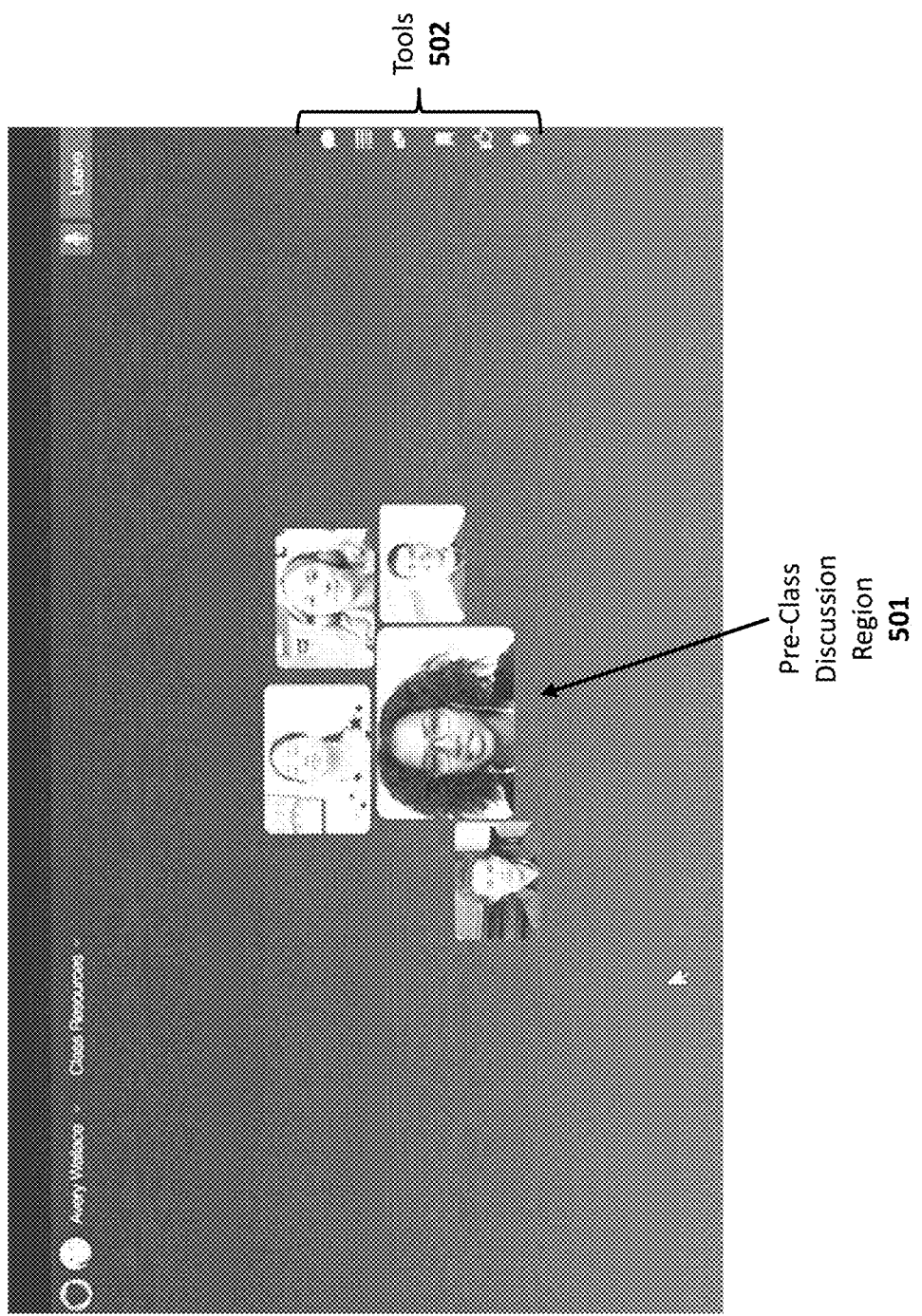
FIG. 5 illustrates an exemplary pre-class discussion region including video images of participants.

Once the participant has selected the class initialization graphic 401, the participant is taken to a pre-class user interface such as shown in FIG. 5. In this embodiment, video thumbnails of other participants who have logged in to the classroom are displayed within a pre-class discussion region 501. A set of tools 502 are also provided to allow users to text one another, open personal video chat sessions, etc.

Figure 6:
FIG. 6 illustrates a group of students connecting to the virtual classroom using a shared projector.

FIG. 6 illustrates multiple students sharing a single screen on a projector for the class and using separate devices (e.g., computers, tablets, etc) to interact with the virtual classroom (e.g., to speak in the center position, provide text comments and/or questions, etc).

Figure 7A:
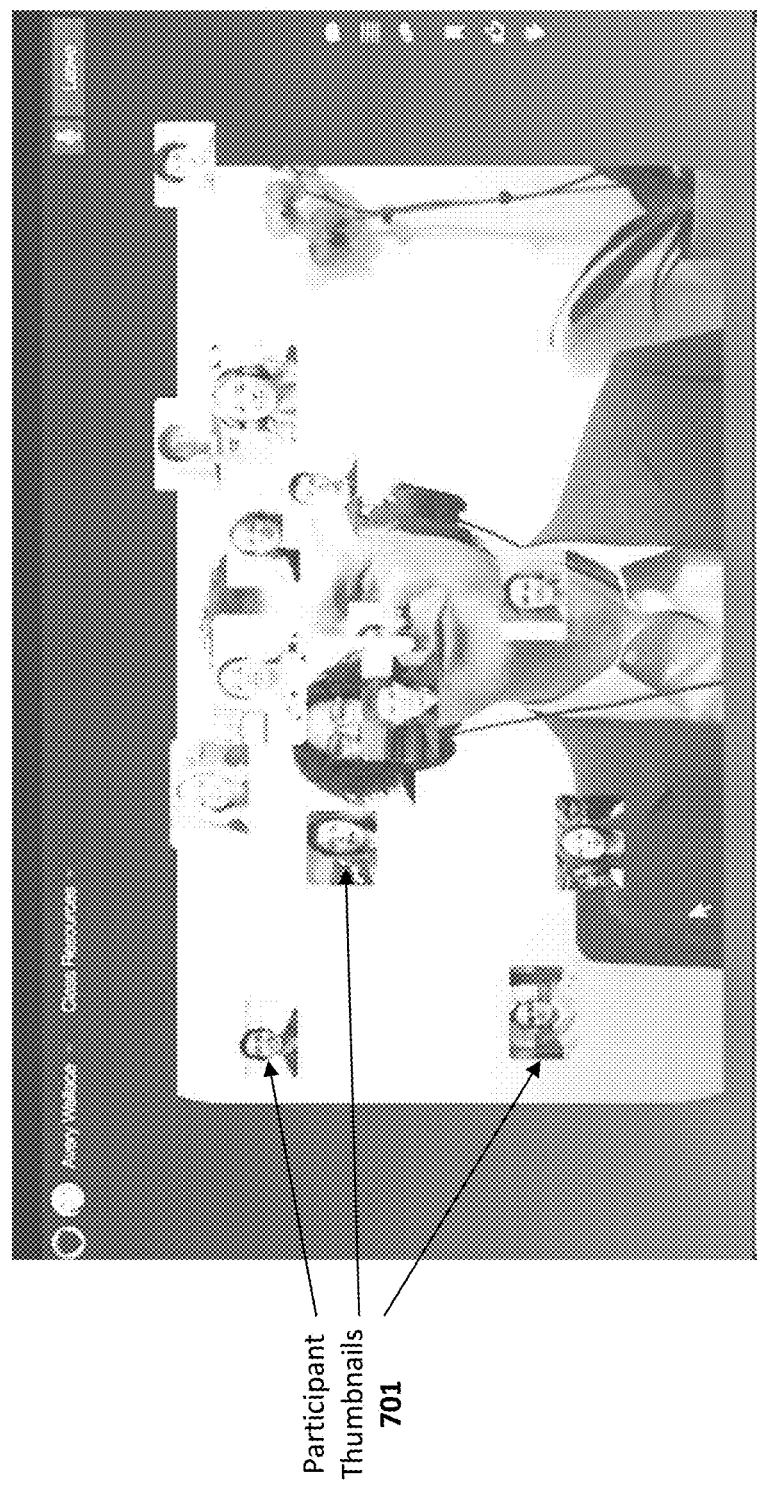
FIGS. 7A-B illustrates one embodiment of the graphical user interface as a professor or other moderator joins the virtual classroom.
Figure 7B:

FIG. 7A illustrates the graphical user interface when the professor initially joins the video conference. As illustrated, the participant thumbnails 701 are arranged randomly around the main display. In contrast, in FIG. 7B, the participant thumbnails 701 have been moved in an organized manner to the top of the display (no longer obscuring the primary speaker region). The order of the participant thumbnails 701 may be alphabetical or based on other variables such as grades or class performance.

Figure 8:
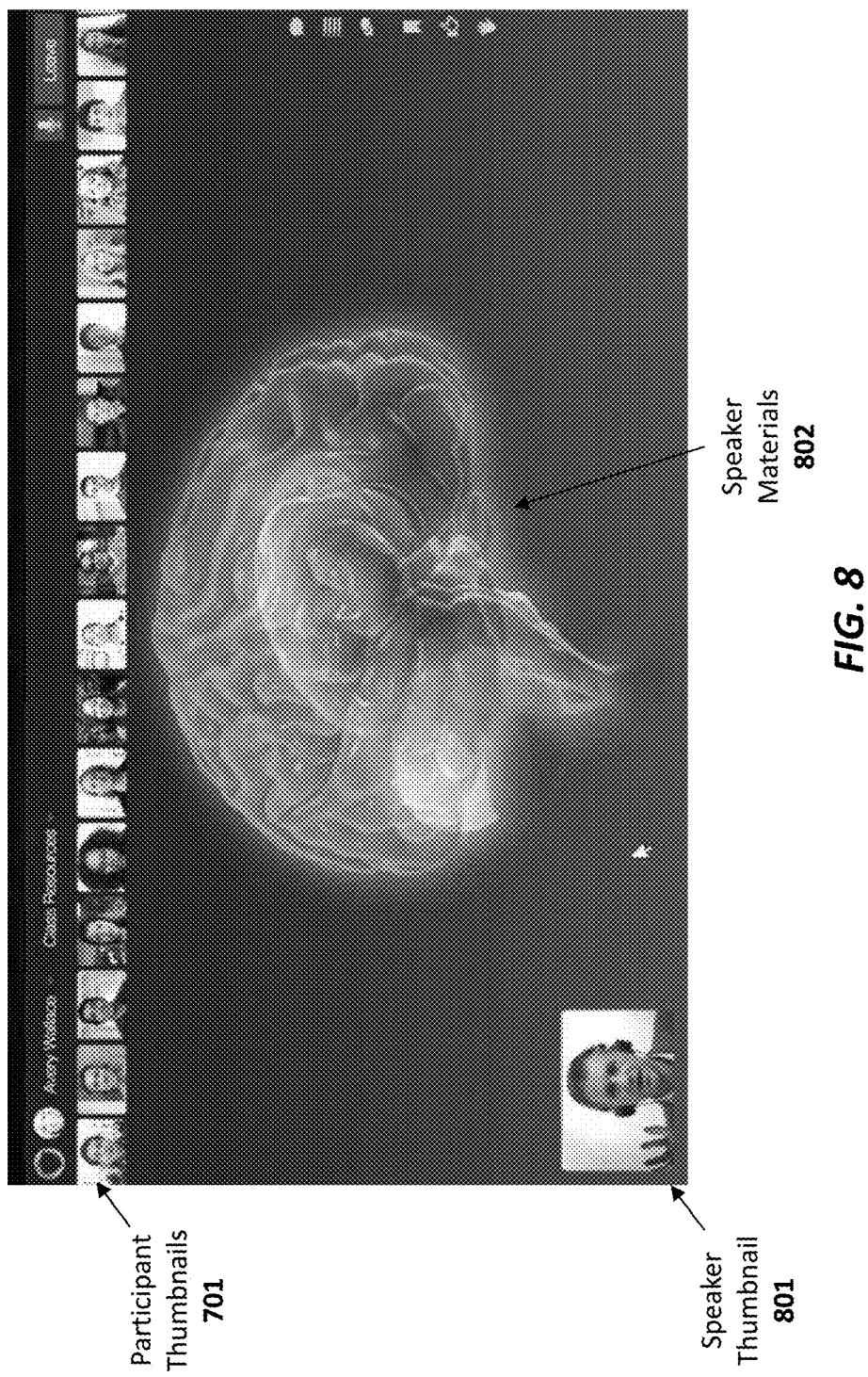
FIG. 8 illustrates a visual display of materials used by the speaker and a smaller video region for the speaker.

As mentioned, the current speaker may rely on various visual materials during the class such as a PowerPoint presentation or other graphical materials. FIG. 8 illustrates one embodiment in which the speaker is relying on materials 802 which are displayed in the center region of the display. In one embodiment, this is enabled by providing the speaker with a control button (physical or graphical) which, when selected, allows the speaker to identify materials to be displayed during the class. The video image of the speaker is offset to a thumbnail image 801 towards the bottom of the display which is differentiated from the participant thumbnails 701 based on location and size (i.e., the speaker thumbnail 801 is larger than the participant thumbnails 701).

In one embodiment, the professor uses gesture controls to manipulate the content in the speaker materials. For example, in FIG. 8, the professor is rotating his hand to cause the image of a human brain to rotate within the primary display region. Gesture controls may be implemented by capturing sensor data from a motion controller attached to the professor's computer, and using it to modify or reposition (e.g. 3-D rotate) the content. Through the publish-subscribe mechanism, the stream of sensor data that triggered these modifications can be replicated in the view of all other clients in the class/conference.

Figure 9:
FIG. 9 illustrates a professor or teacher meeting with a student during office hours.

In one embodiment, students/participants are provided with a graphic to "raise a hand" during the class/conference. The professor or other moderator will be provided with a visual indication of a student raising a hand (e.g., via the student's thumbnail being highlighted with a hand icon or other form of highlight graphic) and may acknowledge the student by selecting the student's thumbnail. FIG. 9 illustrates a video region 901 for displaying the video feed of the student who has been acknowledged by the professor. She is brought into the main element or center element along with the professor in response to the professor's acknowledgement.

Figure 10:
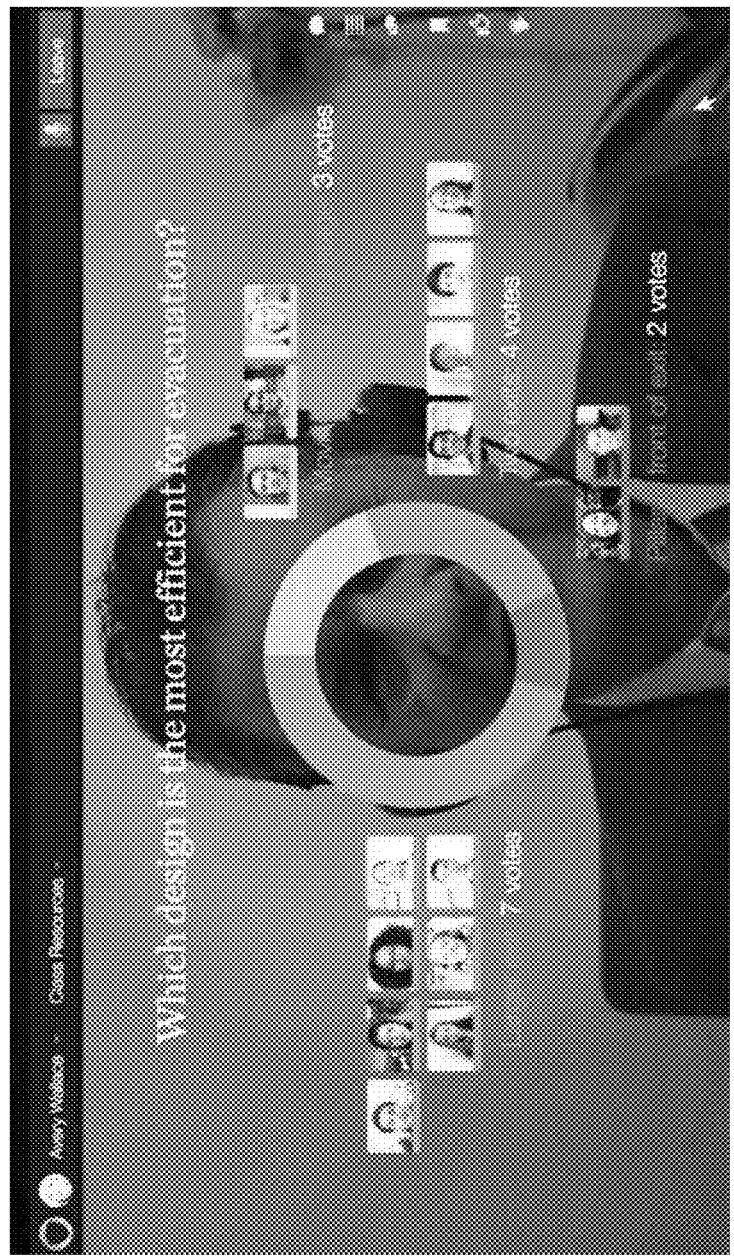
FIG. 10 illustrates visual results of a question on which participants have voted.

FIG. 10 illustrates a poll which is conducted for the purpose of forming breakout groups. That is, the breakout groups are initially determined by participants' answers to the poll. The breakout groups can include the participants who voted similarly or can be a mixed group including participants who all voted differently. In the illustrated embodiment, the participants' answers are shown but in another embodiment the answers can be anonymous.

Figure 11:
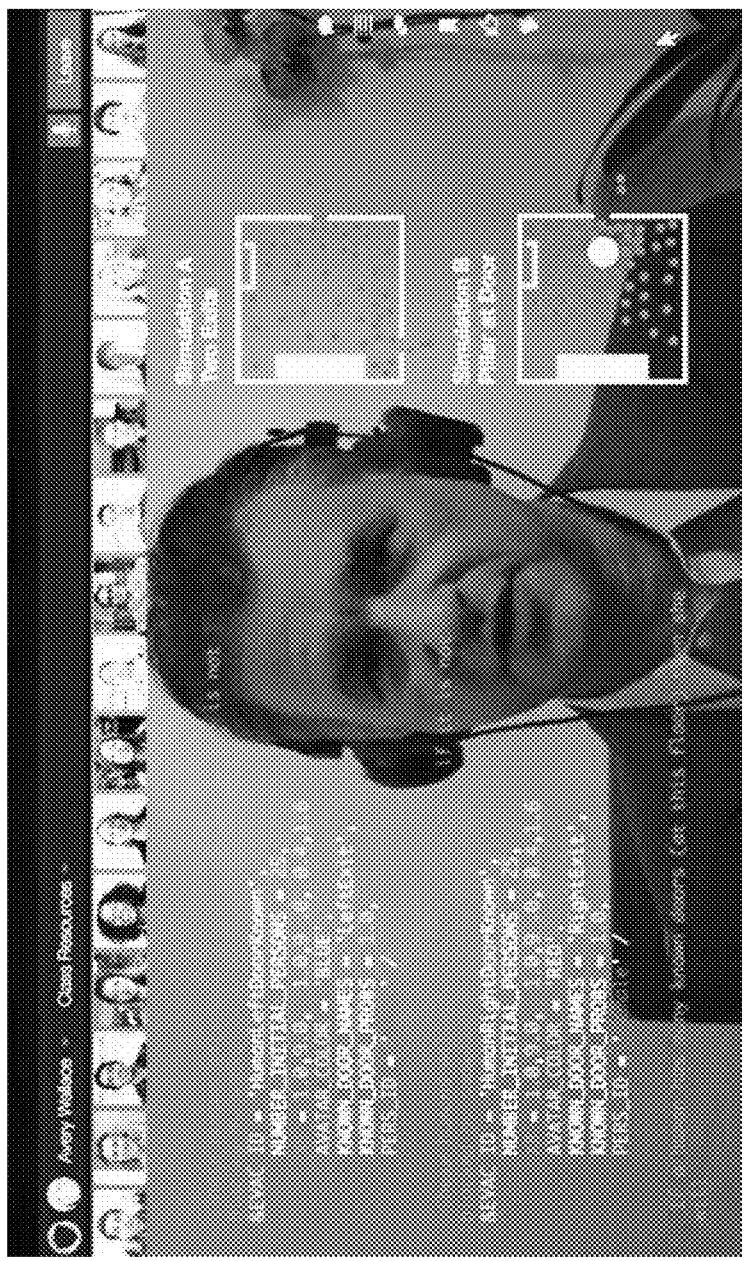
FIG. 11 illustrates one embodiment in which content is displayed on top of the primary speaker region.

FIG. 11 illustrates a GUI feature in which the professor has selected an option to overlay material over the primary speaker region in the center of the display (in contrast to the embodiment shown in FIG. 8 in which the material is displayed in the center and the video image of the professor is offset to the side). The professor may specify this option using a different control key or graphic. The overlaid material in this embodiment may also be a real-time simulation.

Figure 12:
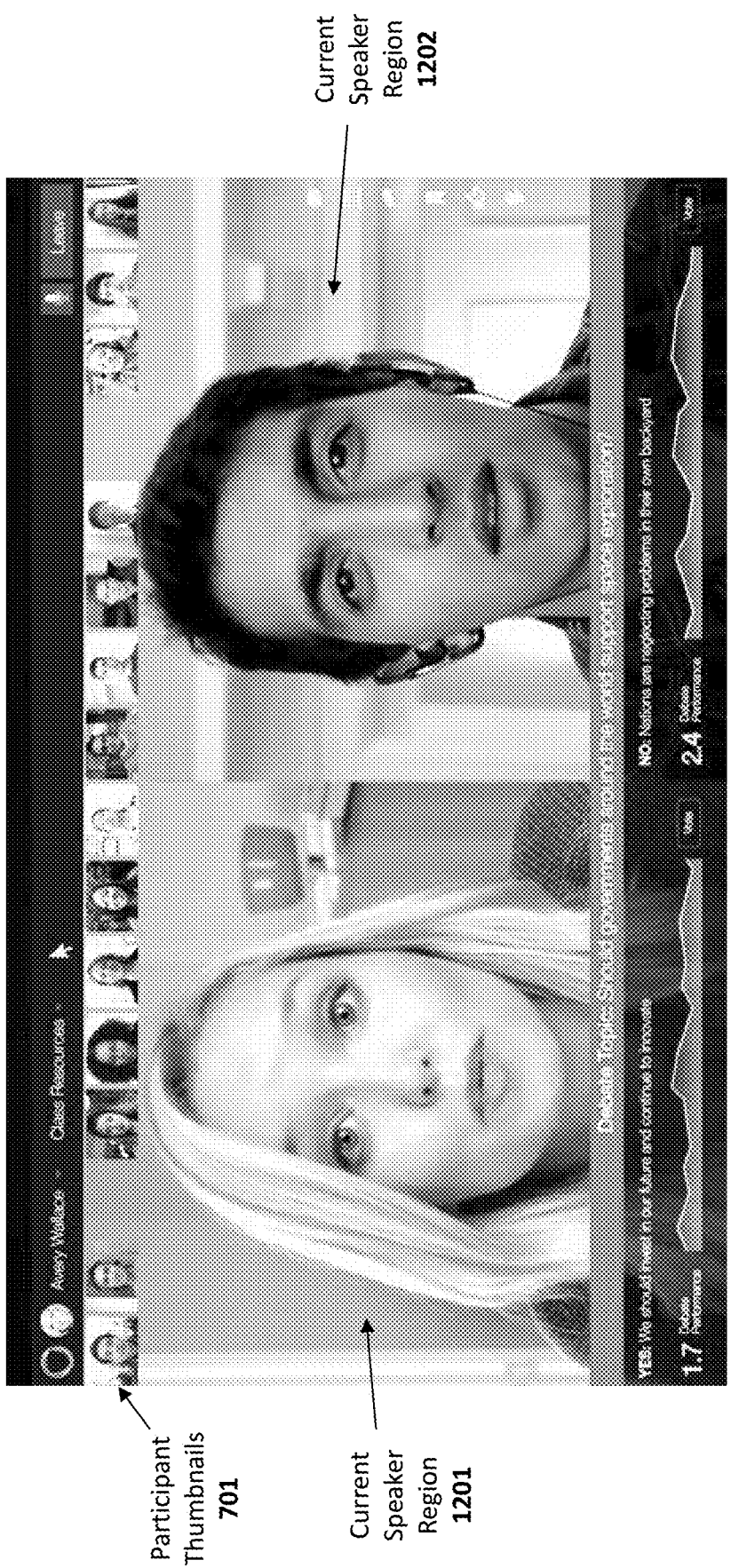
FIG. 12 illustrates one embodiment of a graphical user interface comprising two current speaker regions.

FIG. 12 illustrates an embodiment which includes two primary speaker regions 1201-1202 within the GUI. This embodiment may be used, for example, to enable debates between two or more participants or to allow two representatives of a breakout group to present results. Additional users may be added within additional speaker regions. For example, N adjacent regions may be used for N different users during a debate or during a breakout group presentation. In one embodiment, the thumbnails of the users may be removed from the participant thumbnail region 701 when the participants are shown in the current speaker regions 1201-1202.

Figure 13:
FIG. 13 illustrates one embodiment of a graphical user interface for a touch screen device.

As mentioned, in one embodiment, users are provided with the ability to view and annotate material via a touchscreen device such as a tablet device. FIG. 13 illustrates one embodiment of a tablet on which material is presented and annotations of material are made by a participant of the conference. A participant (e.g., as shown in the slightly enlarged visual cue on the top of the GUI) presents material and can annotate the material in front of the class or conference. Each participant may or may not have the ability to annotate the material. In one, the professor is provided with the ability to annotate the material and may grant access to other participants.

Figure 14:
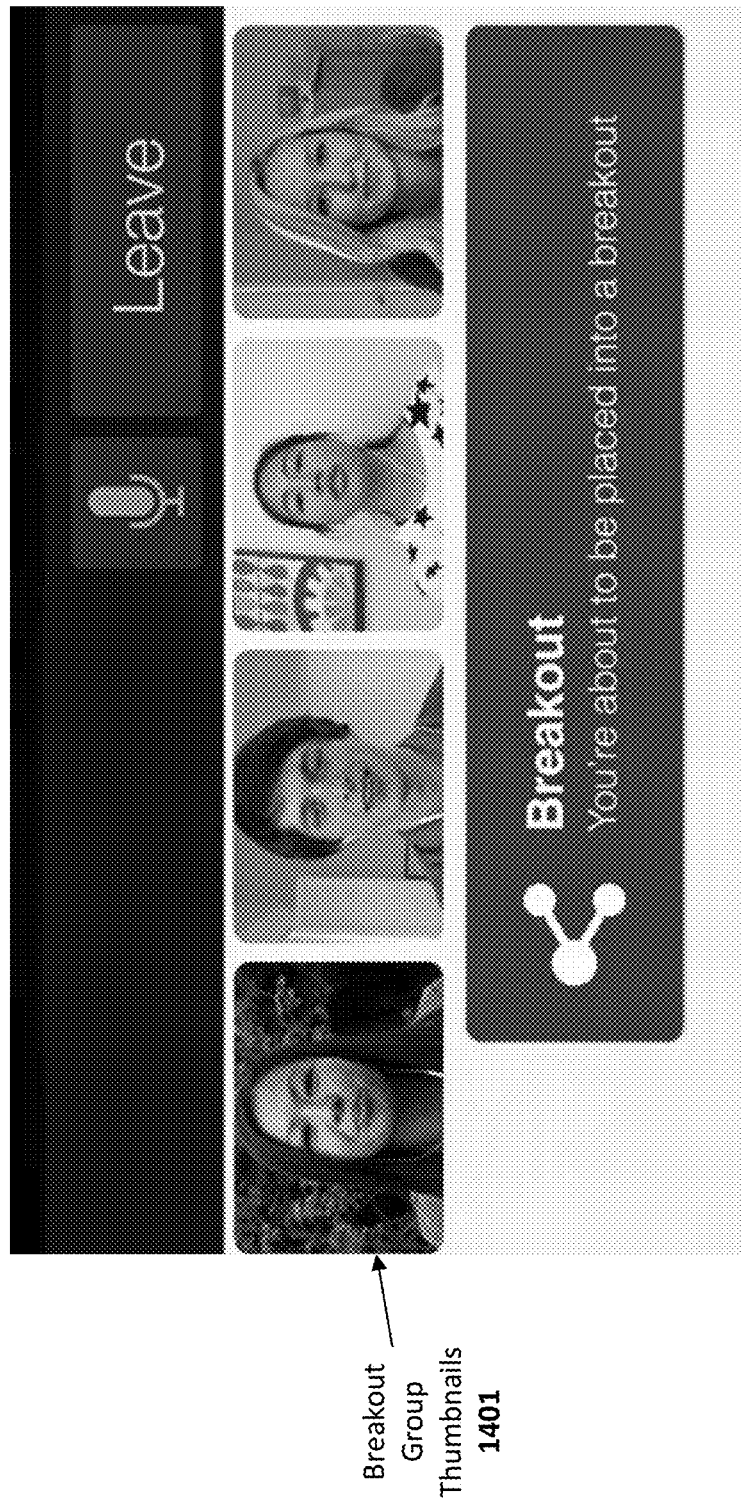
FIG. 14 illustrates one embodiment of a graphical user interface for initializing a breakout group.

FIG. 14 illustrates an exemplary message and GUI displayed to participants who are about to be placed in a breakout group. In the illustrated embodiment, the GUI includes a set of breakout group thumbnails comprising still pictures or video of the participants in the breakout group.

Figure 15A:
FIGS. 15A-B illustrate exemplary breakout group materials, annotations made to the materials, and video images of participants.
Figure 15B:
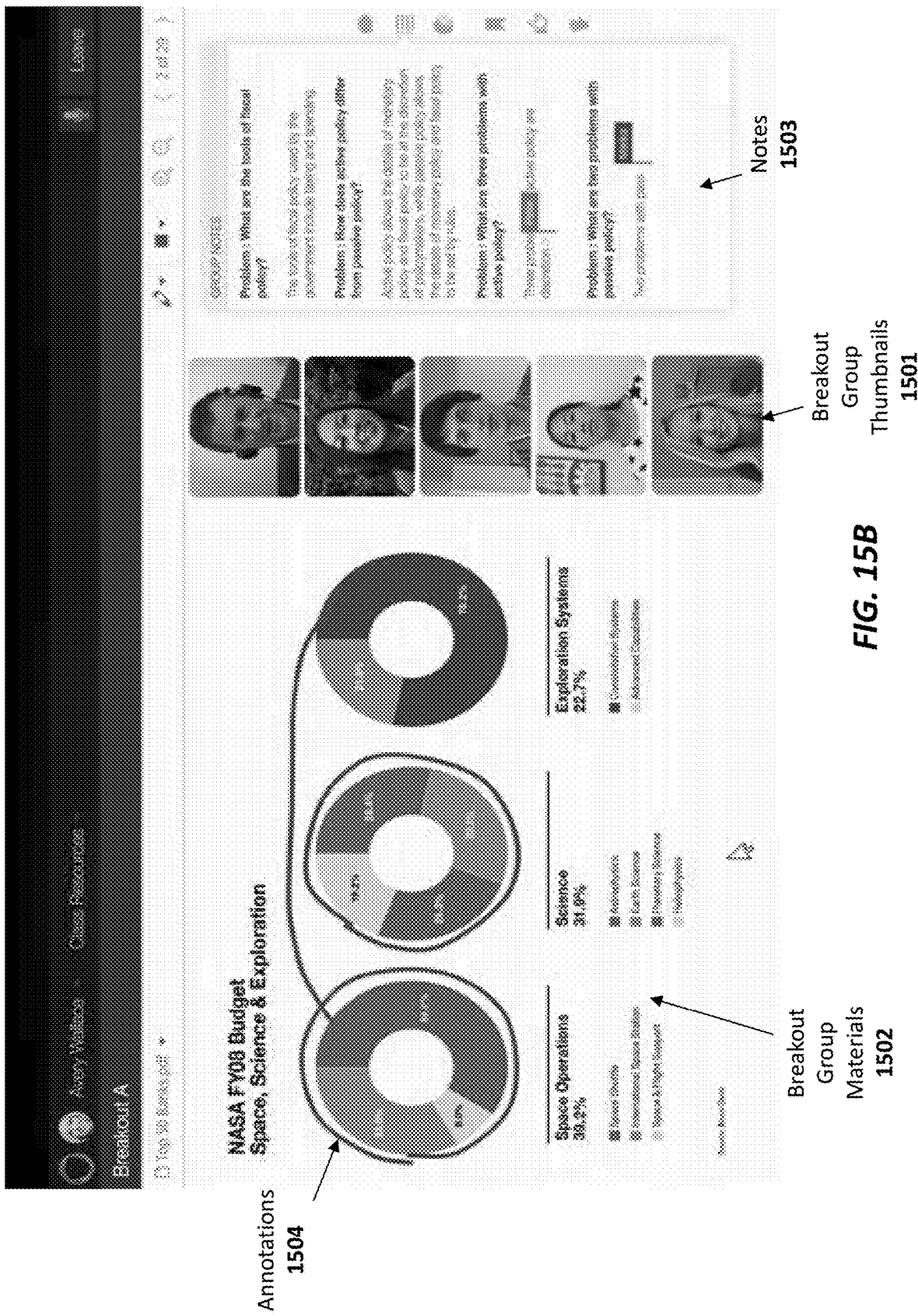

FIGS. 15A-B illustrates an exemplary set of breakout group GUI including a vertically arranged set of breakout group thumbnails 1501, breakout group materials 1502, and notes 1503 recorded by the breakout group. In addition, FIG. 15B shows how the breakout group materials 1502 may be edited with annotations 1504 (e.g., performed via a touchscreen, mouse, or other user input device).

Figure 16A:
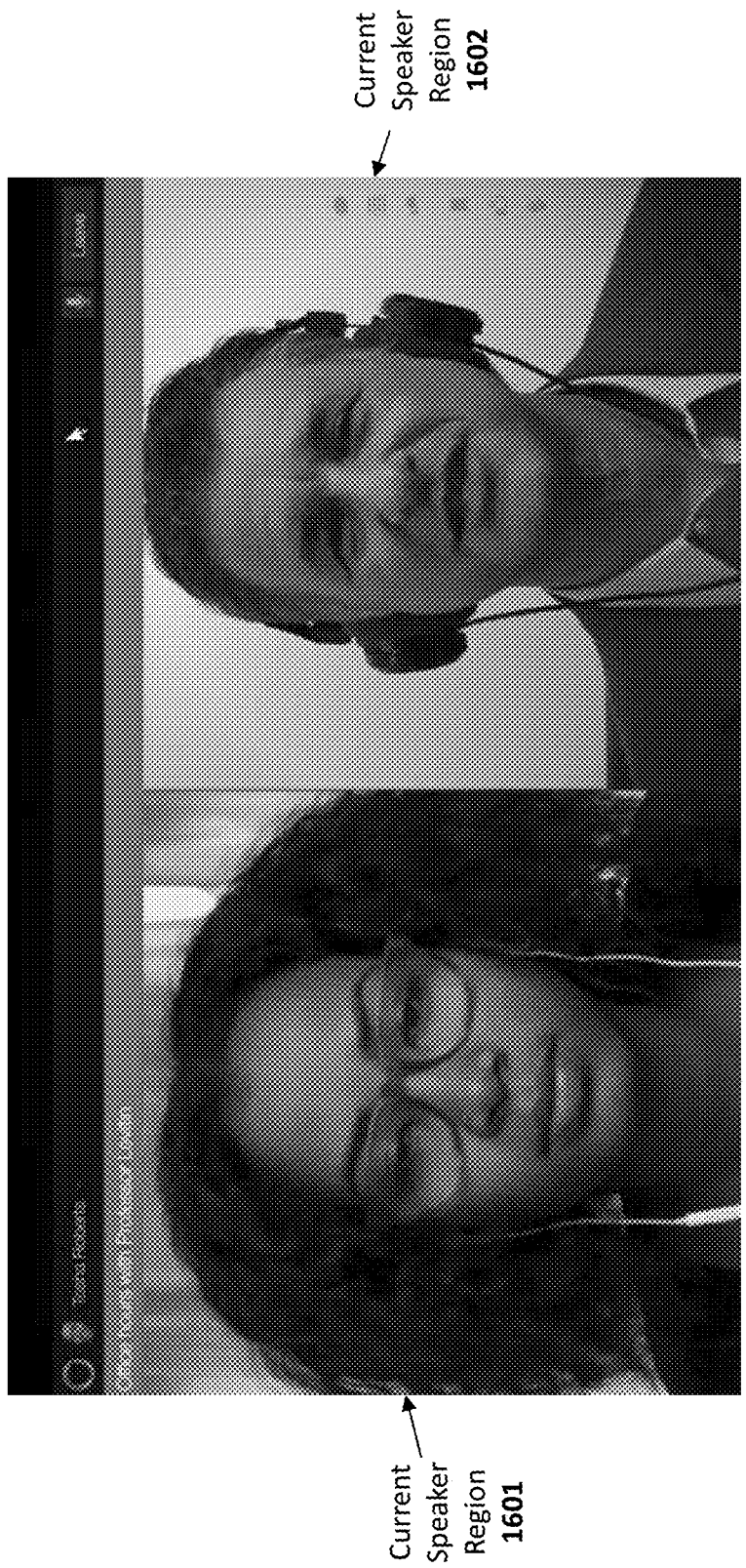
FIGS. 16A-C illustrate an exemplary graphical user interface comprising multiple speaker regions, and a region for evaluating student performance data when visiting a professor or teacher during office hours.
Figure 16B:
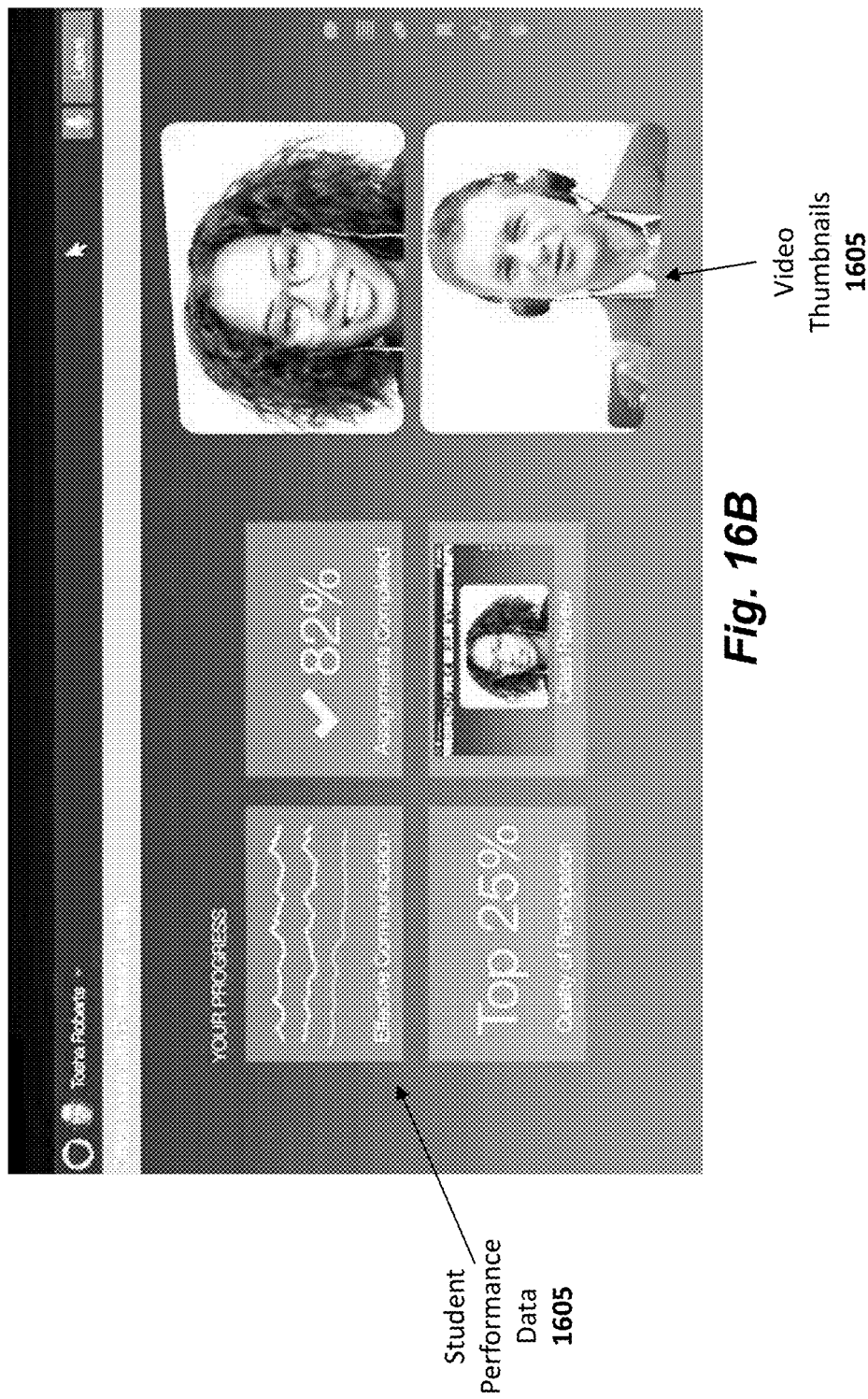
Figure 16C:

In one embodiment of the invention, the professor or teacher may be available to meet with students during office hours. FIG. 16A illustrates an exemplary embodiment in which video of a participant is displayed in current speaker region 1601 as the participant is meeting with a professor during office hours, with video of the professor displayed in current speaker region 1602. FIG. 16B illustrates an exemplary embodiment in which the student and professor review the student's performance in the class, as indicated by student performance data 1605. In this embodiment, video of the student and professor is displayed within thumbnail images 1605. As illustrated in FIG. 16C, the student and professor may review the student's participation during the class, which is replayed in region 1610. As previously discussed, the audio and/or video from the class may be stored and replayed from the external multimedia storage service 190.

D. Additional Architectural Embodiments

Figure 17:
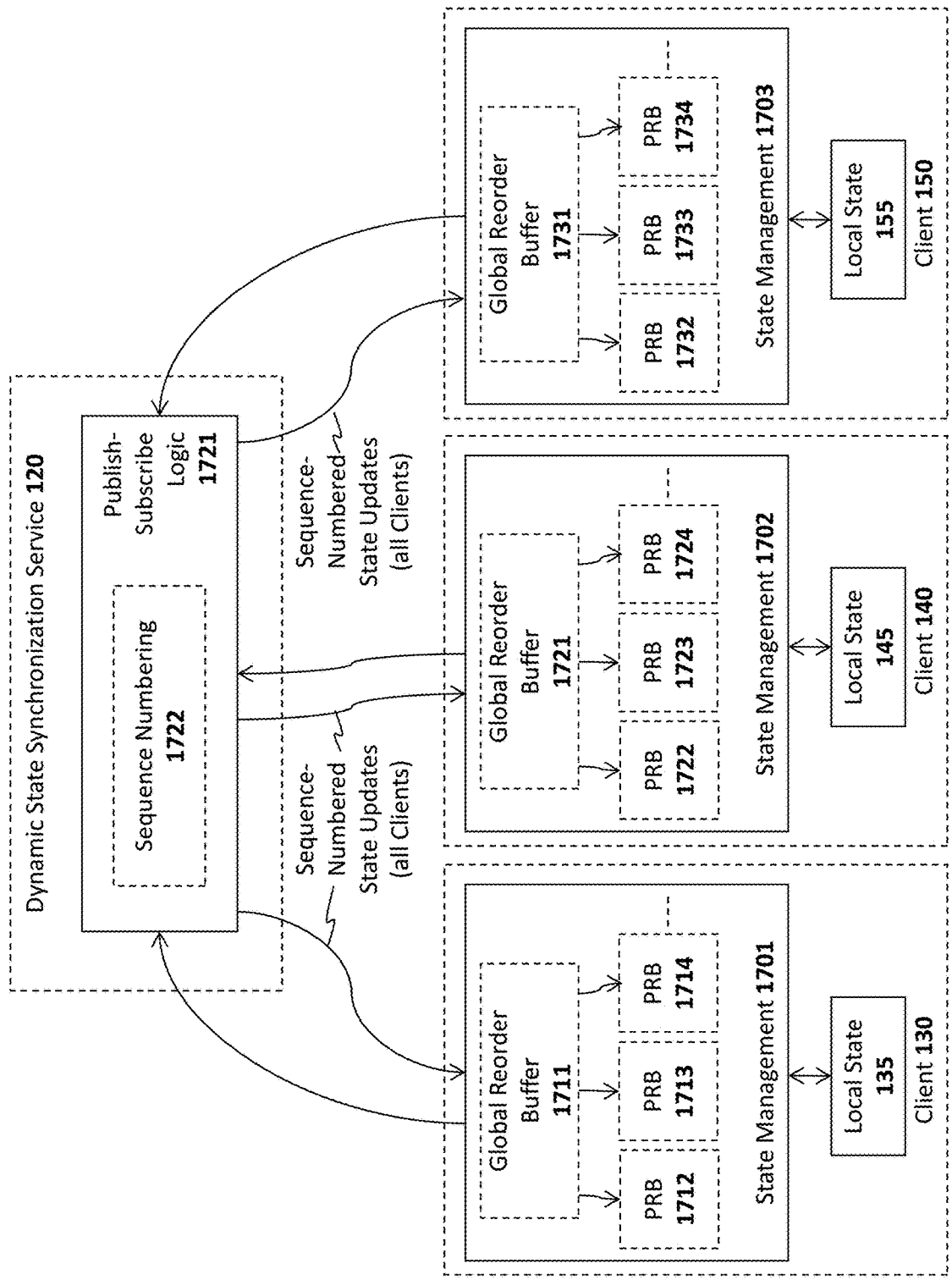
FIG. 17 illustrates an architecture for synchronizing state between clients in accordance with one embodiment of the invention.

As mentioned above, in one embodiment of the invention, the dynamic state synchronization service 120 interacts with the various clients 130, 140, 150, 160 to ensure that the state of each client is consistent (e.g., the current state of the speaker queue, the identity of the participant currently in the center speaker position, the identity of participants in each breakout group, etc). As illustrated in FIG. 17, one embodiment of the dynamic state synchronization service 120 includes publish-subscribe logic 1721 which allows each client to subscribe to receive state updates for every other client. In one embodiment, the publish-subscribe logic 1721 maintains a publication queue for each client and every client subscribes to the publication queues of every other client (i.e., to ensure that all state updates are received by every client). Thus, when client 130 transmits a state update to its publication queue, all of the clients 130, 140, 150 which subscribe to client 130's publication queue receive the state update.

In addition, in one embodiment, sequence numbering logic 1722 ensures that state updates are applied to each client in the correct order. For example, the sequence numbering logic 1722 may increment a counter in response to the receipt of each new state update received from each client. The current counter value may then be attached to each state update to ensure that the state updates are applied in the order in which they are received by the dynamic state synchronization service 120. For example, the publish-subscribe logic 1721 may construct a packet for each state update and may embed the counter value within a field in each packet prior to transmission to each client 130, 140, 150.

In one embodiment, each client 130, 140, 150 includes state management logic 1701, 1702, 1703, respectively, which processes the state updates to maintain a consistent local state 135, 145, 155, respectively. The state management logic 1701, 1702, 1703 maintains a global reorder buffer 1711, 1721, 1731 into which all of the state updates are initially stored. Because packets may sometimes be received over the Internet out of order, the global reorder buffer is used to reorder the state updates when necessary to ensure that the state updates are applied in the same order as the counter values associated with each state update.

In addition, in one embodiment, the state management logic 1711, 1721, 1731 assigns a publisher sequence number to indicate the order of state update generated locally on its client 130, 140, 150, respectively. For example, if a participant on client 130 generates a request to be the current speaker, then sends a request to ask a question, and then removes the request to be the current speaker, the state management logic 1701 may assign a sequence number to each of these state updates to indicate the order in which they were submitted. The publisher sequence numbers are transmitted along with each state update to the publish-subscribe logic 1721 and are received by each individual client. To ensure that the state updates are applied in the same order as they were generated, the state management logic 170, 1702, 1703, maintains a set of publisher reorder buffers 1712-1714, 1722-1724, 1732-1734, respectively, which may be chained to the global reorder buffers 1711, 1721, 1731, respectively. The state management logic 1701-1703 reorders the state updates within the publisher reorder buffers 1712-1714, 1722-1724, 1732-1734 in accordance with the publisher sequence numbers to ensure that the state updates are applied in the same order in which they were generated on each client.

The end result is that the global order of state updates is maintained, based on the order in which state updates are received by the publish-subscribe logic 1721 and program order is maintained based on the sequence of operations performed on each individual client.

Figure 18:
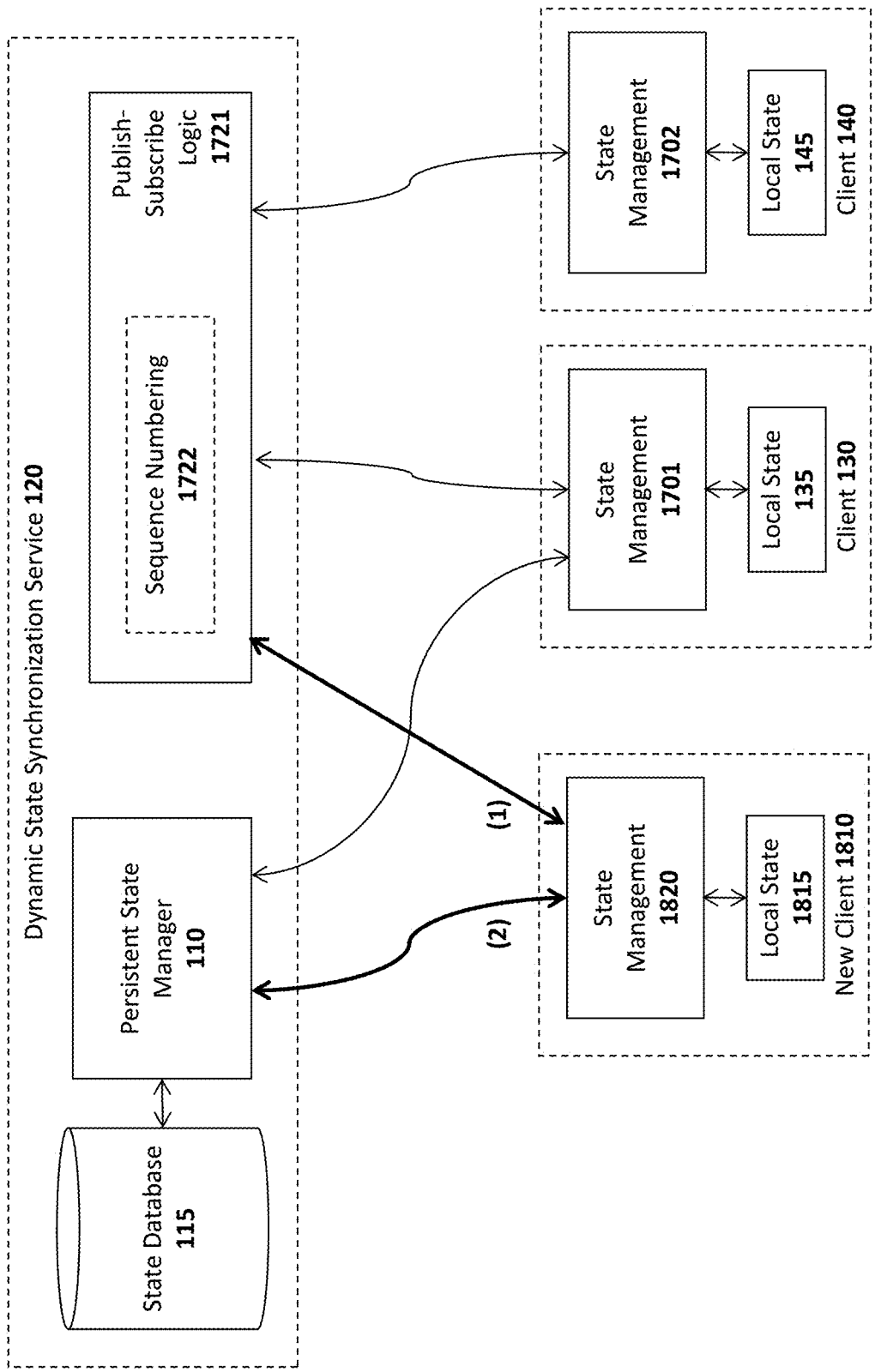
FIG. 18 illustrates additional details of the exemplary architecture for synchronizing state between clients.

Because participants may arrive to the virtual classroom (or other type of virtual conference) at different times, one embodiment of the invention includes techniques for initializing each newly-arrived client with the correct state. As illustrated in FIG. 18, this is accomplished in one embodiment with the persistent state manager 110 (briefly mentioned above) which maintains the current state of each client within a state database 115. Each time a state update is generated at a client, that client initially transmits an indication of the state update to the persistent state manager 110, which stores the state update within the state database 115. The client then connects with the publish-subscribe logic 1721 to publish the state update to the other clients. Thus, the state database 115 contains a persistent representation of the current state of all of the clients.

In one embodiment, when a new client 1810 comes online (e.g., in response to the participant joining an ongoing class), its state management logic 1820 performs the following operations to initialize its local state 1815. In one embodiment, the state management logic 1820 first establishes a connection with the publish-subscribe logic 1721, subscribing to all state updates published by all other clients and to its own state updates (as previously described). It then begins buffering all state updates received from the publish-subscribe logic 1721. In one embodiment, the state management logic 1820 then connects with the persistent state manager 110 to receive a copy of the current persistent state stored in the state database 115. Given transactional delays over the Internet, during the period of time when the initial connection is made to the persistent state manager 110 and the time when the state is downloaded from the state database 115, there may be changes made to the persistent state within the state database 115. Moreover, some state updates which the state management logic 1820 receives from the publish-subscribe logic 1721 may already be reflected in the state database 115 (i.e., because the state management logic 1820 connects first to the publish-subscribe logic 1721). Consequently, following the retrieval of the state from the state database 115 the state management logic 1820 may have a superset of all of the state data needed to initialize its local state 1815. It may include redundant state updates—some of which are reflected in the persistent state from the state database and some of which were received from the publish-subscribe logic.

To ensure that these redundancies are resolved consistently, one embodiment of the invention ensures that all state updates are idempotent. As understood by those of skill in the art, idempotence is a property of operations in computer science that can be applied multiple times without changing the result beyond the initial application. Thus, for example, if the participant on client 130 requests to be added to the speaker queue, this state update may be applied multiple times on the new client 1810 (e.g., once from the state database 115 and once from the publish-subscribe logic 1721) to achieve the same local state 1815 (i.e., the second application of the state update will not alter the final local state 1815). Thus, by ensuring that all state updates are idempotent, redundant state updates may simply be applied multiple times without affecting the underlying local state of each client.

In summary, once the state management logic 1820 has received and applied the copy of the persistent state from the state database 115 and applied all of the state updates received from the publish-subscribe logic (some of which may be redundant), the local state 1815 on the new client 1810 will be consistent with the local states 135, 145 of the other clients 130, 140.

In order to ensure a responsive user interface, one embodiment of the state management logic 1820 applies speculative state updates locally, in response to input from the local participant, and then resolves the state updates to ensure consistency upon receipt of state update responses from the publish-subscribe logic 1721. For example, in response to the participant on client 1810 selecting and holding the queue key, the state management logic 1820 may instantly place the participant in the speaker queue and/or place the participant in the center speaker region (if the participant is first in the queue). Thus, the state update will be instantly reflected in the graphical user interface of the participant, resulting in a positive user experience.

The state management logic 1820 then transmits the state update to the publish-subscribe logic 1721 where it is assigned a sequence number as described above. Because the client 1810 subscribes to its own publication queue as well as those of all other clients, the client 1810 will receive the state update from the publish-subscribe logic 1721. Upon receiving its own state update, both the global and publisher reorder buffers are applied to ensure proper ordering, and then the update is re-applied to client 1810. The second application of the state update ensures state consistency since the proper ordering is maintained. Re-applying an update is safe to do because of the idem potent property of state updates, as mentioned above.

There is the possibility of flicker in the user interface if there was an intervening, conflicting update to client 1810 between the first application of the state update and the second. That flicker will not affect state consistency, but it can cause a visual effect that is undesirable to the user. In one embodiment, some instances of flicker are eliminated by explicitly detecting conflicting state updates. To detect conflicting state updates, each incoming state update to client 1810 is checked against a queue of speculatively applied state changes to see if it will affect state that was speculatively applied. If a conflicting incoming state update is detected, client 1810 will not apply that update in one important case, specifically when client 1810 has already applied the state update as a speculative update (i.e., client 1810 published the state update) and no other conflicting state updates have been detected. This optimization eliminates flicker when, for instance, a user requests entry into the speaker queue and then quickly (in less than the round trip time to the publish-subscribe server) requests to be removed from the speaker queue.

Figure 19:
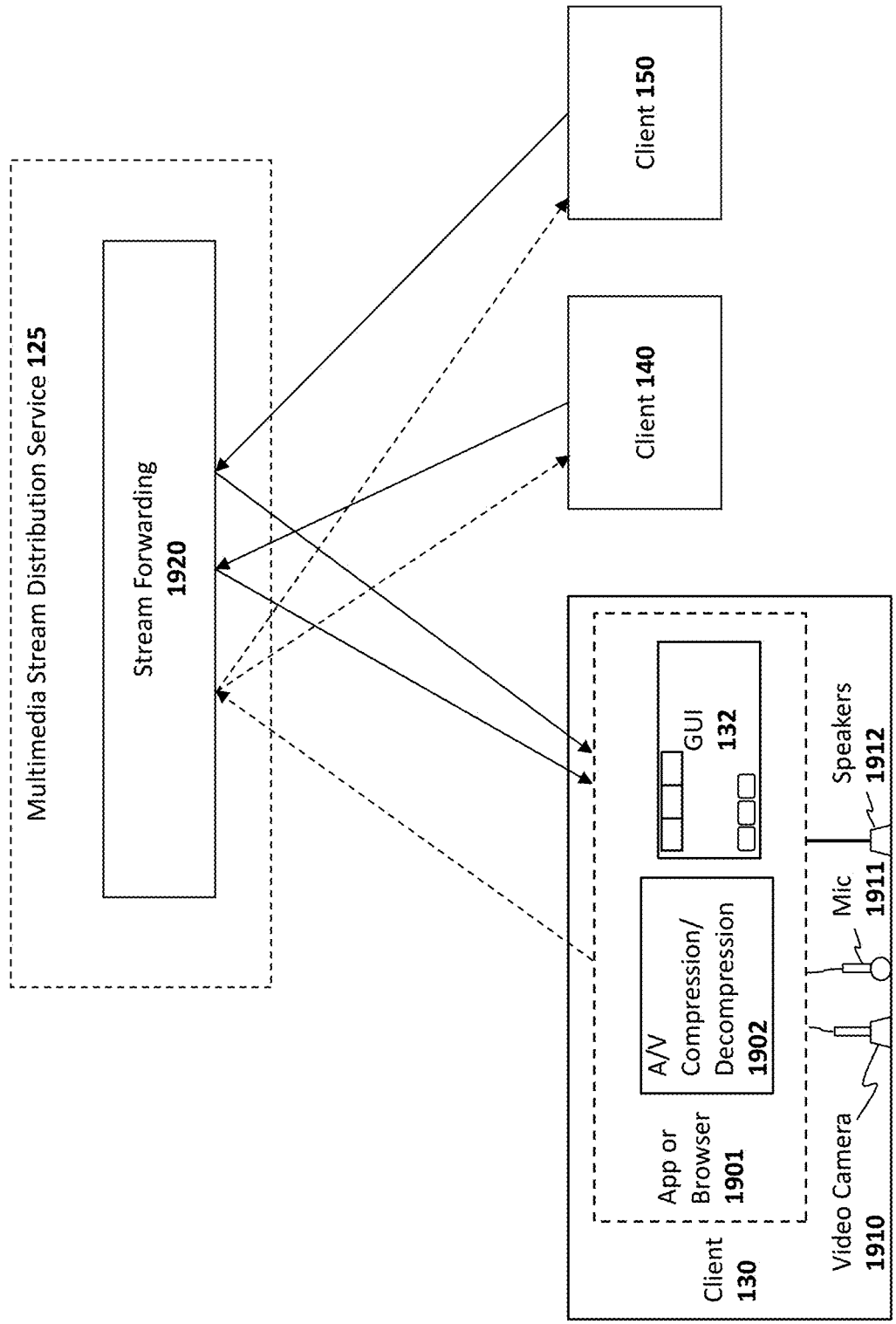
FIG. 19 illustrates one embodiment of an architecture for distributing audio and video among participants.

As illustrated in FIG. 19, in one embodiment, the multimedia stream distribution service 125 includes stream forwarding logic 1820 for managing the receipt and distribution of audio and video streams for each of the clients 130, 140, 150. In particular, in one embodiment, each client 130, 140, 150 captures audio and/or video of its participant and streams the audio/video to the stream forwarding logic 1920, which forwards the audio/video streams to each of the clients 130, 140, 150. A video camera 1910 and microphone are illustrated for capturing video and audio of the participant, respectively. Each client 130 also includes a display on which the GUI 132 is rendered and speakers 1912 for generating the audio of other participants. In one embodiment, audio/video (A/V) compression and decompression logic 1902 compresses audio and video of the participant and the compressed audio/video is then streamed to the stream forwarding logic 1920 by the virtual conferencing app or browser 1901. While the A/V compression/decompression logic is shown integrated within the app/browser in FIG. 19, this may be a logically separate module which is accessed by the app/browser.

In one embodiment, the app/browser 1901 of each client 130, 140, 150 establishes a web socket connection with the stream forwarding logic 1920 to receive streams from each of the other clients. The stream forwarding logic 1920 may distribute audio/video using a publish/subscribe mechanism where each client subscribes to the audio and video feeds of all other clients. The stream forwarding logic then forwards the incoming audio/video feeds to all subscribing clients.

Upon receiving the audio and video from other clients, the A/V decompression logic 1902 decompresses/decodes the audio and video streams, renders the video within the GUI (e.g., within the thumbnail images or within the center speaker region as described above) and outputs the decoded audio through the speakers 1912.

In one embodiment, the A/V compression/decompression logic 1902 adjusts the compression on the video of the participant depending on the size of the video image of the participant shown within the GUI. For example, if the participant is the current speaker (i.e., at the top of the speaker queue), the A/V compression/decompression logic 1902 may encode the video at a relatively higher resolution and/or frame rate, because a higher resolution is needed to provide an acceptable level of video quality for the relatively larger speaker region. In contrast, if the participant is not the current speaker, then the compression/decompression logic 1902 may encode the video at a relatively lower resolution and/or frame rate to provide an acceptable quality for displaying video within a thumbnail region. The app or browser 1901 may determine the required size of the video image (e.g., whether the user is the current speaker) by reading the local state data 135 stored on the client. In one embodiment, the app/browser 1901 may specify a desired bitrate to the A/V compression/decompression logic 1902 which will then adjust the resolution and/or frame rate accordingly. These techniques will help to keep the bitrate at a reasonable level because if there is only one speaker, for example, then only one high quality stream will be transmitted and sent to all clients. In one embodiment, when a new participant becomes the current speaker, this will be reflected in the state data of each client and the app or browser will control the A/V compression/decompression logic accordingly (i.e., to increase the resolution and frame rate of the video stream showing the new speaker).

In one embodiment of the invention, each app or browser 1901 performs dynamic bitrate adaptation based on the bitrate available to each client and the requirements of the various video regions within the GUI. For example, if 2 Mbps is available to a particular client 130, then (using FIG. 12 as an example GUI) the app/browser 1901 may specify to the A/V compression/decompression logic 1902 to allocate 1 Mbps to encode both of the current speaker regions 1201-1202 and may allocate the remaining 1 Mbps to encode all of the participant thumbnails 701. The A/V compression/decompression logic 1902 will then compress/decompress video in accordance with the allocated bitrates for each region of the GUI. In addition, in one embodiment, each participant may be provided the ability to select different quality levels to be used when encoding the participant's outgoing video stream. By way of example, these selectable levels may include high quality, low quality, and audio only (i.e., no video feed).

Figure 20:
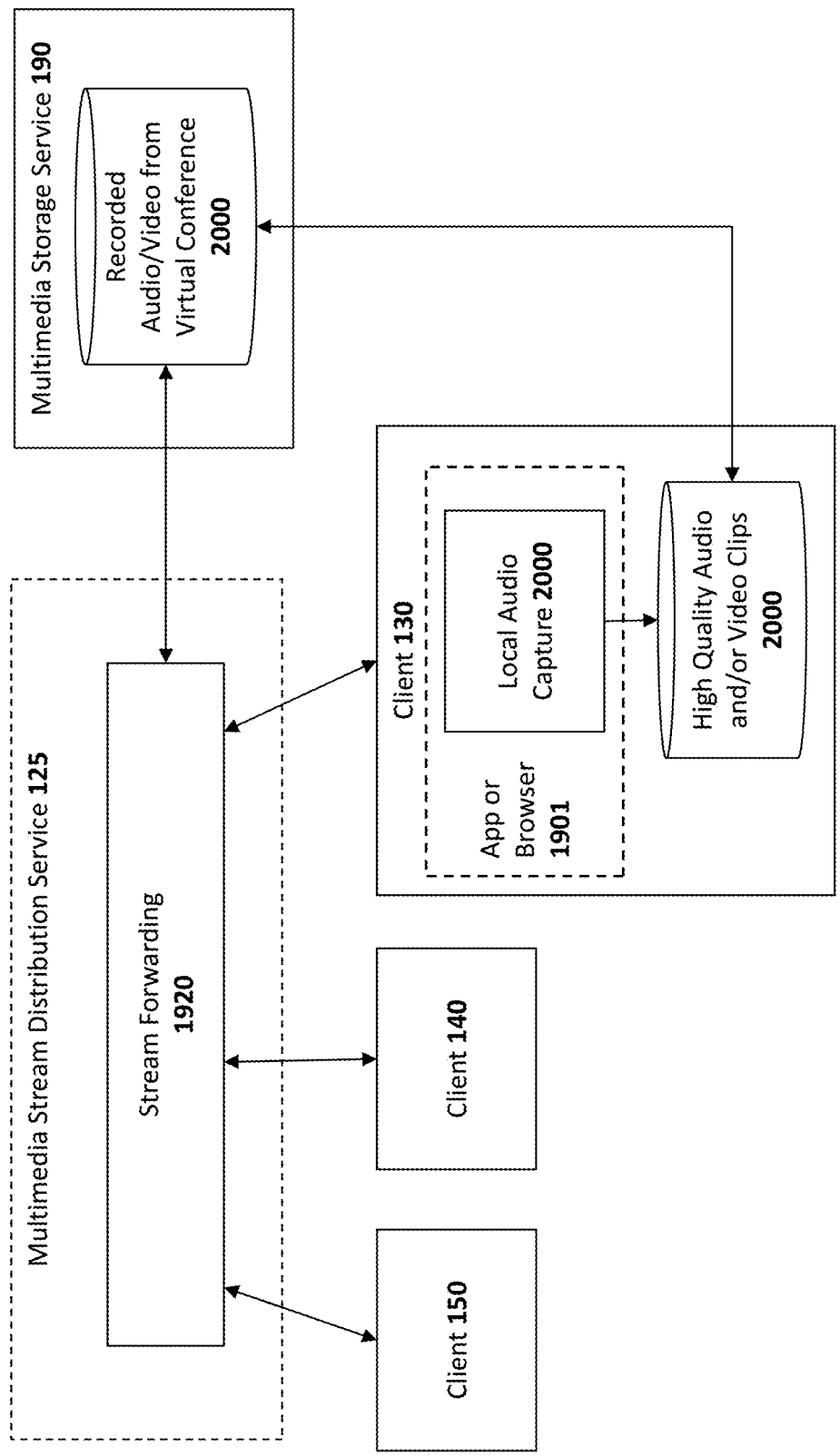
FIG. 20 illustrates one embodiment of an architecture for storing and replaying video and audio captured during a class or other virtual conference type.

As mentioned, the multimedia storage service 190 may capture and store audio and video of a class (or other virtual conference) for subsequent playback. As illustrated in FIG. 20, in one embodiment, the multimedia storage service 190 may be treated like any other client and may be configured to receive and record all audio/video streams for all participants on a storage device 2000. The data format used may comprise a plurality of audio and video clips of each of the participants. In addition, a timestamp may be associated with each audio and video clip which may be used to reconstruct the playback of the virtual class (i.e., to ensure that each audio and video clip is played back at the appropriate time).

As mentioned above, the video and audio content stored on the multimedia storage service 190 may be a higher quality than the audio/video used during the live virtual conference. For example, as illustrated in FIG. 20, local audio and/or video capture logic 2005 on each individual client may capture higher quality video and audio than may be possible to stream through the multimedia stream distribution service 130. The higher quality audio/video may be stored locally, as a set of audio and/or video clips on a storage device 2001 of each client 130 during the virtual conference. When the conference has ended, these clips may be uploaded to the storage device 2000 on the multimedia storage service 190. For example, each time a participant speaks, a local audio clip of the user's voice (e.g., an MP3 or AAC clip) may be recorded and subsequently uploaded to the multimedia storage service 190. Additionally, state data 135, 145, 155, 165, timestamp data, and/or any other data usable to reconstruct the virtual conference for playback may be collected and stored on the multimedia storage service 190 (as described in greater detail below).

In one embodiment, the recorded audio/video from the virtual conference 2000 may include audio/video and other content generated by each of the breakout groups. In this embodiment, each of the audio/video clips may be associated with an identifier identifying the breakout group from which they were collected. In this manner, the professor or teacher may individually play back the audio/video and other content to reconstruct and review the discussion and content generated by each breakout group.

In one embodiment, playback of audio, video, and other content is performed using a virtual conference playback tool. The playback tool may be implemented as a separate app or application or as a browser plug-in.

While the embodiment described above relies on a central virtual conferencing service 100 to establish connections between clients and to stream video and audio between the clients, the underlying principles of the invention are not limited to this particular implementation. For example, in one embodiment, the clients are configured to establish peer-to-peer connections with one another, either without a central server (e.g., using a peer-to-peer networking protocol), or using a central server solely as a directory server, to lookup the network addresses of the other clients participating in the virtual conference. Once connected via peer-to-peer connections, the clients may implement the same state synchronization techniques described above, including management of the speaker queue and breakout groups. In addition, in this embodiment, the clients establish direct connections with one another to exchange video and audio of the participants.

Alternatively, rather than merely forwarding video and audio streams between participants, the central virtual conferencing service 100 may compress/recompress the video and/or audio based on the capabilities of each individual client (e.g., reducing the resolution and/or frame rate for clients with smaller displays or lower-bitrate network connections). In addition, in one embodiment, the virtual conferencing service 100 may combine the video streams from each of the clients into a single video stream that is then streamed to all of the clients (e.g., compositing all of the video streams into a single video frame, which is then compressed and streamed to the clients).

In addition, various different forms of video and audio compression may be used by the clients and/or the virtual conferencing service 100 while still complying with the underlying principles of the invention. This includes, but is not limited to, H.264, VP8, and VP9 for video coding and Opus and iSAC for audio coding.

System and Method for a Virtual Conference Interactive Timeline

As mentioned above, in some virtual conferencing systems, the meeting organizer or moderator is provided with control over the state of the virtual conferencing system via a graphical control panel. For example, when it is time to set up a debate between two or more students, the professor uses the control panel to manually rearrange the graphical user interface to include two or more speaker positions and identifies the students to participate in the debate. Similarly, to subdivide the class into breakout groups, the professor uses the control panel to manually specify the size of the breakout groups, identify the students in each group, provide the necessary materials for each group to use during the breakout session, and specify the duration of the breakout period. When the breakout period is over, the professor again uses the control panel to rearrange the graphical user interface to review the results of each breakout group. As another example, when a poll is to be conducted, the professor uses the control panel to initiate the poll, which may involve additional modifications to the graphical user interface.

Requiring the instructor (or other moderator) to manually perform all of the above operations during the course of a class (or other type of virtual conference) can be distracting and time consuming. To address this problem, one embodiment of the invention comprises an interactive video conferencing timeline which includes a graphical representation of each of the ordered events scheduled to occur during the course of a virtual conference. To perform the sequence of operations required to implement an event, the professor (or other moderator) simply selects the graphical representation corresponding to the event. In an alternate implementation, the graphical representations may be selected automatically by the system, in accordance with timing information associated with each event.

While the remainder of the discussion below will focus on an online classroom implementation, the underlying principles of the invention may be implemented in any virtual conferencing environment in which different events require changes to the virtual conferencing system configuration.

Figure 21A:
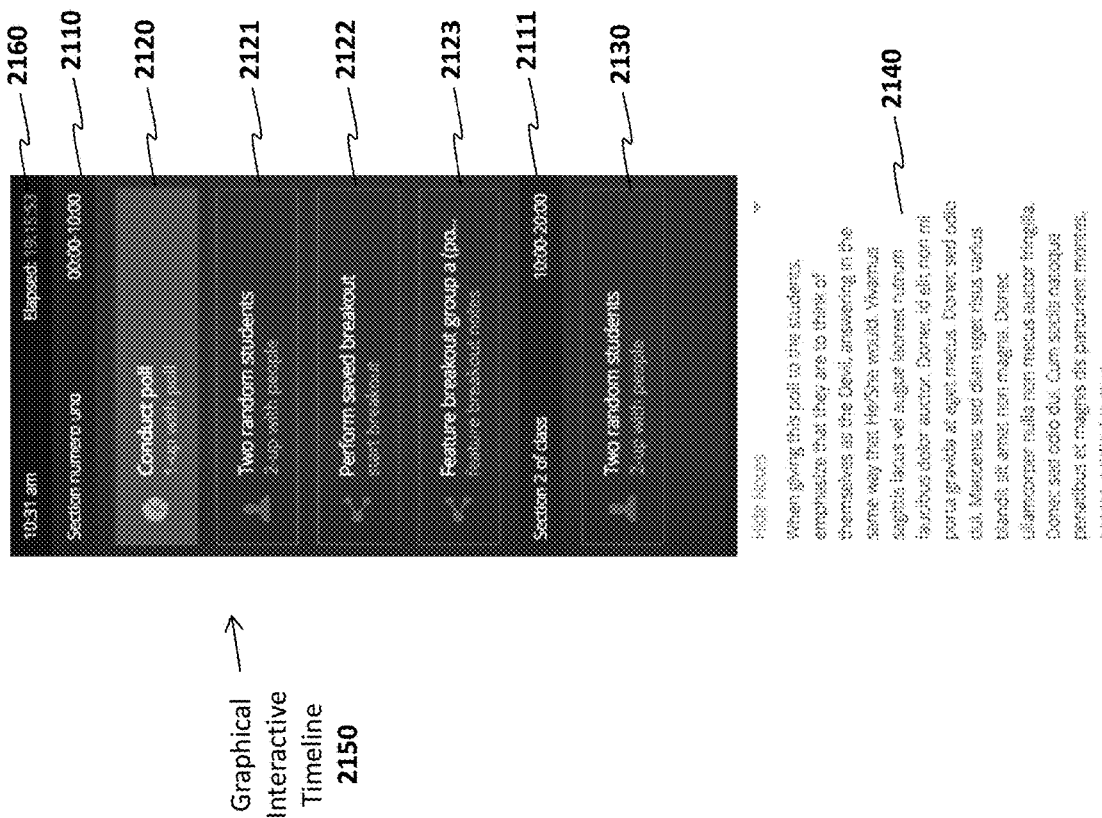
FIGS. 21A-B illustrate embodiments of a graphical interactive timeline.

FIG. 21A illustrates an exemplary graphical interactive timeline 2150 for use in an online classroom in which the lesson plan for the class is subdivided into a plurality of "sections" 2110-2111 and each section is subdivided into a plurality of "segments" 2120-2123, 2130 corresponding to scheduled events during the class. Selection of a segment from the timeline causes the client on which the timeline is displayed (typically the instructor's client) to transmit one or more commands to cause the video conferencing system to implement the operations associated with the segment 2120. In the illustrated example, segment 2120 is highlighted to indicate that this section is currently being implemented by the online virtual conferencing system. Because this particular segment 2120 is associated with conducting a poll with video of a single participant being displayed in the central speaker region (as indicated by the "1-up" indication), the selection of this segment (either manually by the instructor or automatically) causes the client device on which the segment is selected to transmit one or more commands to the online video conferencing system to implement the poll using the "1-up" user interface arrangement. This may include, for example, generating the necessary data structures to collect the poll data and generating a graphical user interface which includes video of a single speaker in the speaker region (e.g., the professor) and a region which includes one or more poll questions to be answered by each participant.

In one embodiment, the dynamic state synchronization service 120 described above in detail synchronizes the state of each client in response to receipt of the commands. For example, the dynamic state synchronization service 120 may open records in the state database 115 required to implement the online poll and may transmit synchronization signals to each of the clients participating in the online conference to ensure that the virtual conferencing graphical user interface is consistent across all of the clients.

In one embodiment, timing data may be associated with each of the sections and/or segments. For example, in FIG. 21A, the time allocated to each section is displayed within the graphical elements, 2110 and 2111, associated with each section (e.g., 10 minutes for each of sections 2110 and 2111). In addition, in one embodiment, an elapsed time indicator 2160 may be displayed showing the total amount of time which has elapsed during the class. The color of the elapsed time may be updated to provide an indication as to whether the class is proceeding in a timely manner. For example, green may indicate that the class is proceeding on schedule or ahead of schedule, yellow may indicate that the class is proceeding slightly behind schedule (e.g., <5 minutes behind), and red may indicate that the class is proceeding significantly behind schedule. The system may determine how far the class has progressed based on the current segment highlighted within the timeline.

A notes section 2140 provides instructions to the professor related to each segment. For example, the notes 2140 may provide general instructions related to the purpose and/or goals of the segment. The notes 2140 may also provide instructor notes from which the instructor may reference. A first graphical element at the bottom of the timeline may be selected to display the notes and a second graphical button (e.g., located at the top of the notes) may be selected to hide the notes.

Figure 21B:
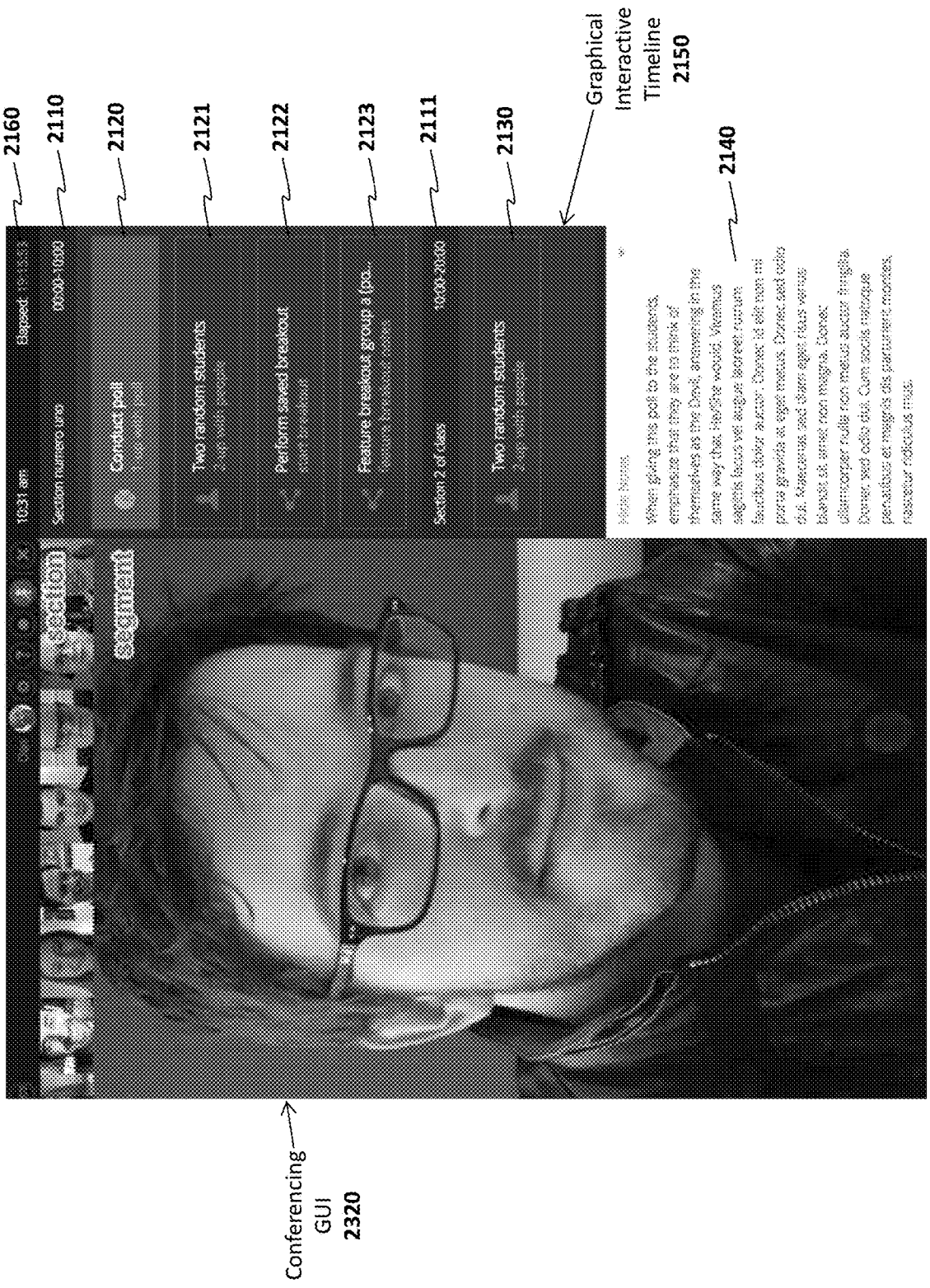

FIG. 21B illustrates the exemplary graphical interactive timeline 2150 integrated within the video conferencing GUI 2320, which may include the various virtual conferencing features described above such as a central speaker region, and video thumbnails of the various conference participants. In one embodiment, the instructor and/or an assistant to the instructor are the only participants who are provided with access to the interactive timeline 2150. The timeline may be hidden and brought into the display via a graphical user interaction by the instructor. For example, in one embodiment, the instructor may select a graphical button or other element to the right of the GUI or may select a designated control key on the keyboard to bring the interactive timeline 2150 into view.

In one embodiment, when timeline events are active (e.g., in response to the instructor selecting one of the segments 2120-2123), the event that is highlighted automatically becomes disabled to prevent accidental re-triggering of the event. When breakouts or polls are active in the timeline, their main button will become disabled, but different selectable actions may be provided. For example, for breakouts, a "message all" option may appear which opens the breakout sidebar with keyboard focus on the message field (e.g., so the instructor may message all students). In addition, an "end breakout" option may appear allowing the instructor to end the breakout session. For polls, a "restart poll" option may appear to re-take a poll and an "end poll" option may appear to end the polling process. For a segment which provides an N-up (e.g., placing N students in the speaker regions), N random students may be selected and/or N students may be selected based on specified selection criteria (e.g., picking the least talkative N students to feature). In one embodiment, as soon as the event is no longer active the actions described above will disappear and the entire action will again become clickable.

Figure 22A:
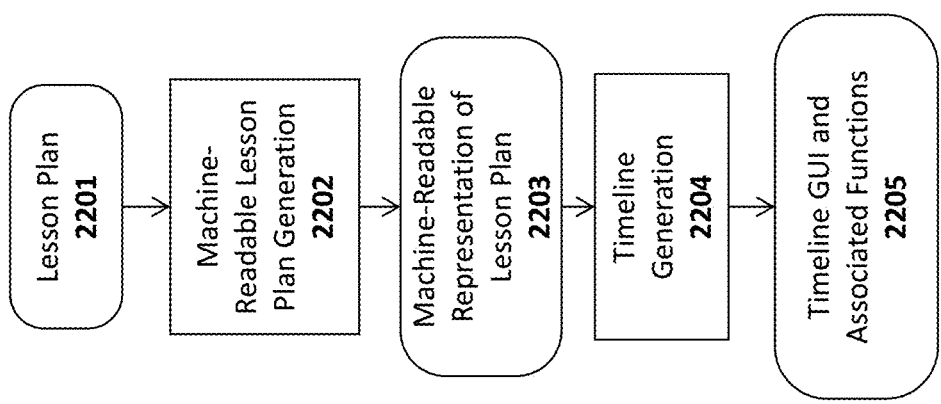
FIGS. 22A-B illustrate different logic and processes for generating an interactive timeline in accordance with one embodiment of the invention.
Figure 22B:
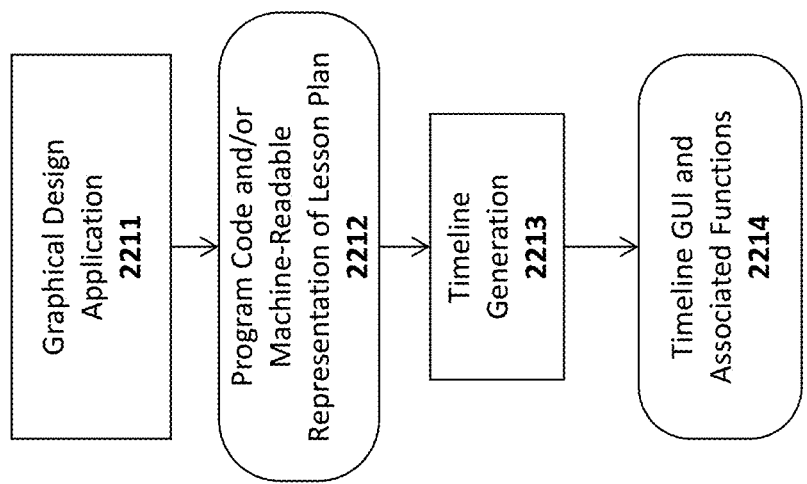
Figure 23:
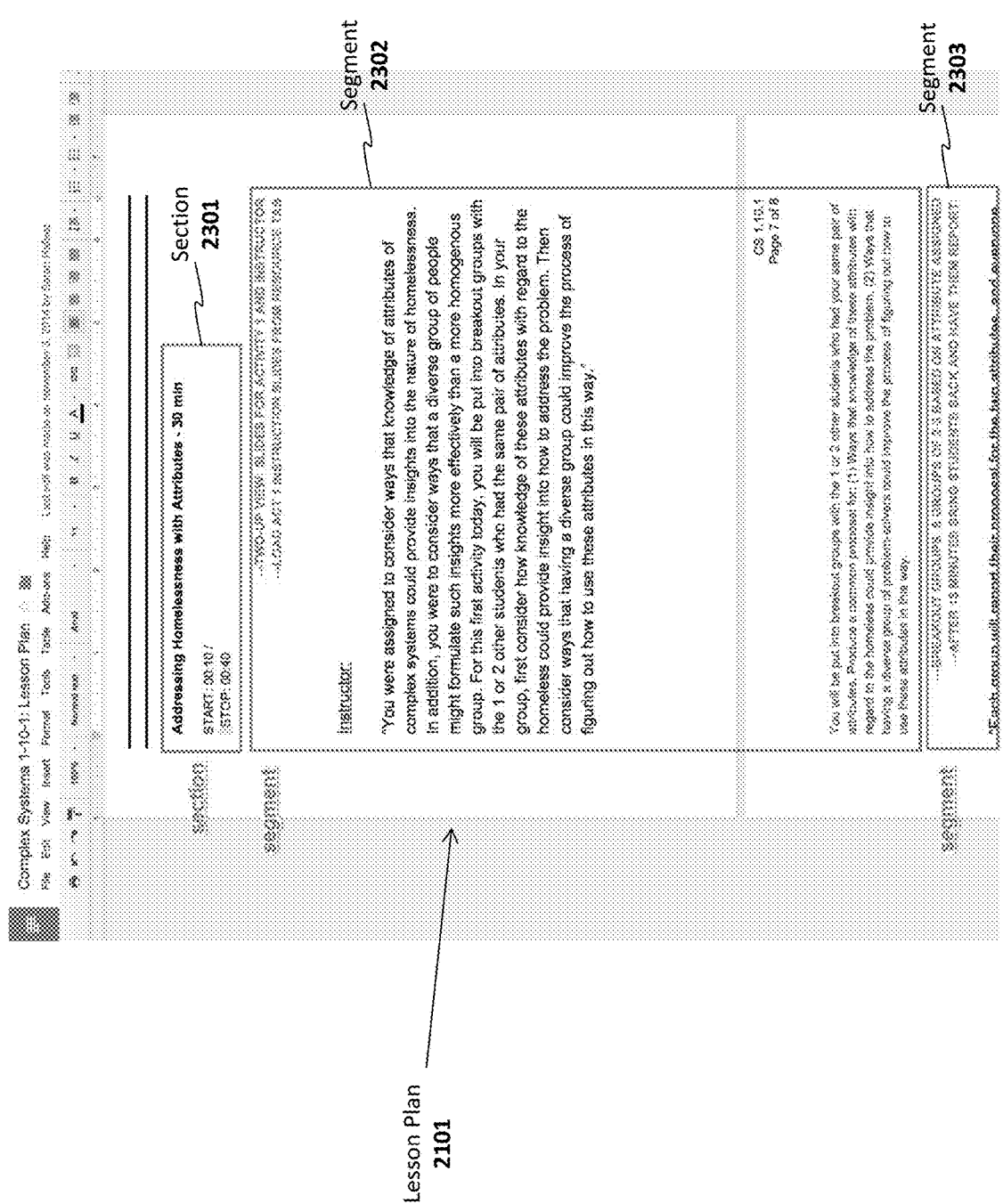
FIG. 23 illustrates an exemplary lesson plan in a human-readable format.

FIGS. 22A and 22B illustrate how a lesson plan may be constructed and used to generate the graphical interactive timeline. In the embodiment shown in FIG. 22A, a lesson plan 2101 may be constructed in a human-readable format prior to the online class (e.g., by a team of academic advisors working for the online university, by the instructor, etc). FIG. 23 illustrates one such implementation in which a lesson plan 2101 has been constructed using an online word processor (e.g., Google™ Docs). One section 2301 is illustrated which indicates, in a human-readable format, a title, a time limit, and a start and stop time associated with the section. The first segment 2302 includes a specification of the operations which need to be performed for the segment including setting up a "2-up" view which includes video of the instructor and a set of slides to be used for the segment. A script or set of instructions are also provided within the segment 2302. The top portion of a second segment 2303 is illustrated which indicates that six breakout groups are to be formed using 2-3 students in each groups based on a particular attribute (e.g., frequency of participation in class, grade, polling results, or any of the other variables discussed above).

The lesson plan 2201 may be used to generate a machine-readable representation of the lesson plan 2203. For example, in FIG. 21B, machine-readable lesson plan generation logic 2102 uses the lesson plan 2101 to generate a machine-readable representation of the lesson plan 2103. For example, the machine-readable lesson plan generation logic 2202 may scan the lesson plan 2101 for certain keywords or fields and embed the data contained therein into the machine-readable representation 2103. In an alternate embodiment, the machine-readable representation of the lesson plan 2103 may be generated manually by a user (e.g., an academic team member) using the data contained in the lesson plan 2103.

Figure 24:
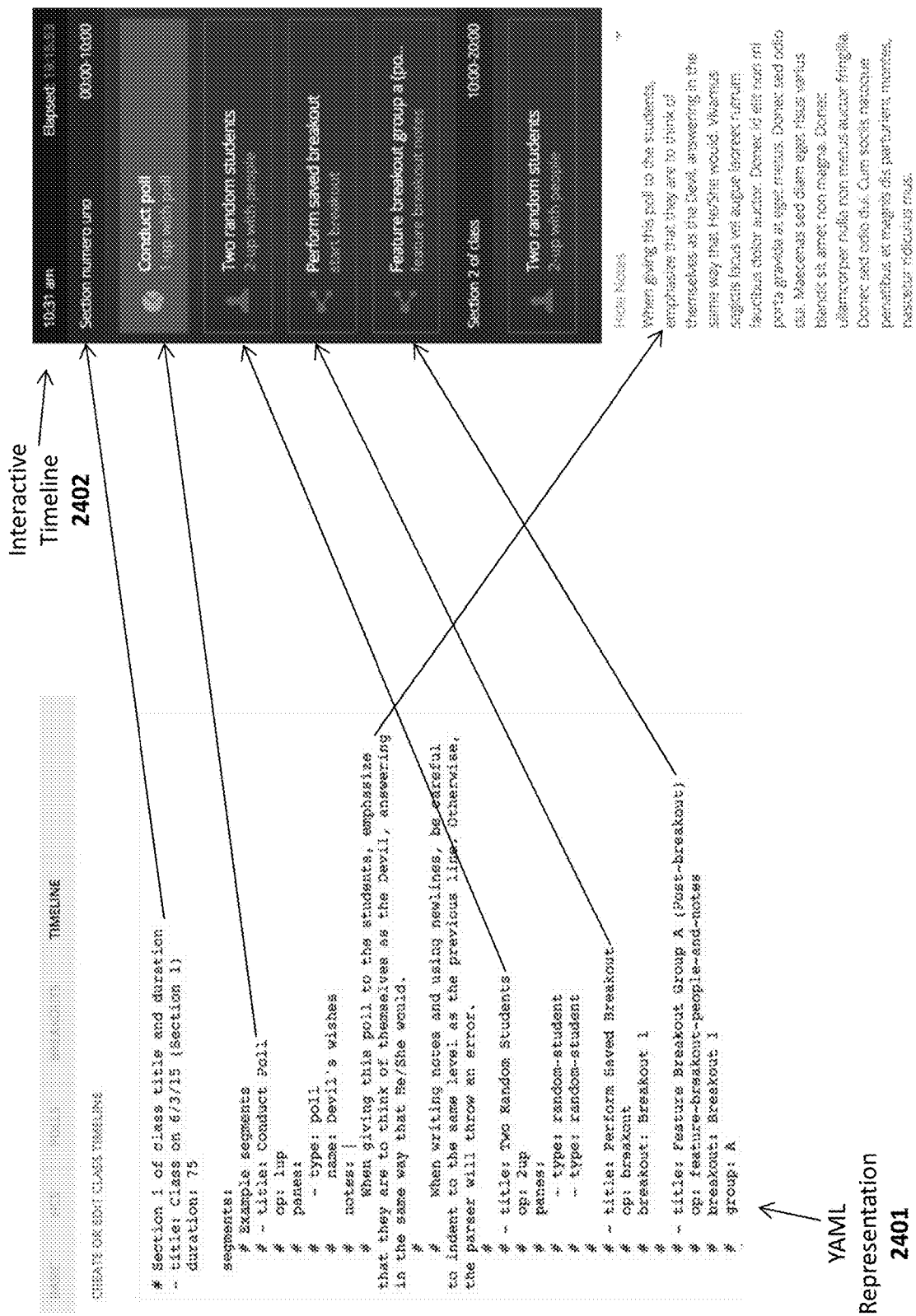
FIG. 24 illustrates an exemplary interactive timeline and a mapping between a YAML representation and the interactive timeline.

Regardless of how the machine-readable representation of the lesson plan 2103 is generated, in one embodiment, it is generated in a YAML format, a well-known human-readable and machine-readable data serialization format (sometimes referred to as "Yet Another Markup Language" and sometimes using the recursive acronym "YAML Ain't Markup Language"). FIG. 24 illustrates an exemplary portion of a YAML representation 2401 with arrows mapping section data and segment data to a graphical interactive timeline 2402. For example, "section 1" of the YAML representation 2401 includes a field for the section title and field for the duration of the segment. Each segment includes data indicating a title (e.g., "conduct poll"), an operation to be performed on the user interface (e.g., "1-up") and other pertinent information for implementing the section on the video conferencing system (e.g., specific panes and GUI features to be displayed). In addition, notes are provided which may be used by the instructor during the class. As mentioned, in one embodiment, the notes may be displayed beneath the interactive timeline 2402.

Returning to FIG. 22A, timeline generation logic 2204 interprets the machine-readable representation of the lesson plan 2203 to generate the timeline GUI and implement the underlying operations associated therewith. In one embodiment, the timeline generation logic 2204 is implemented as program code executed on one or more virtual conferencing servers within the virtual conferencing service 100. The various timeline GUI features and associated functions are then streamed to the instructor's client which may implement the timeline and other GUI features within the context of a Web browser or conferencing application installed on the client. Alternatively, the timeline generation logic 2204 may be executed directly on the instructor's client to generate the timeline GUI and associated functions. In this embodiment, the machine-readable representation 2203 may be sent directly to the instructor's client to be interpreted locally by the timeline generation logic 2204. Of course, the underlying principles of the invention are not limited to the particular location at which the program code for implementing the timeline is executed.

Figure 25A:
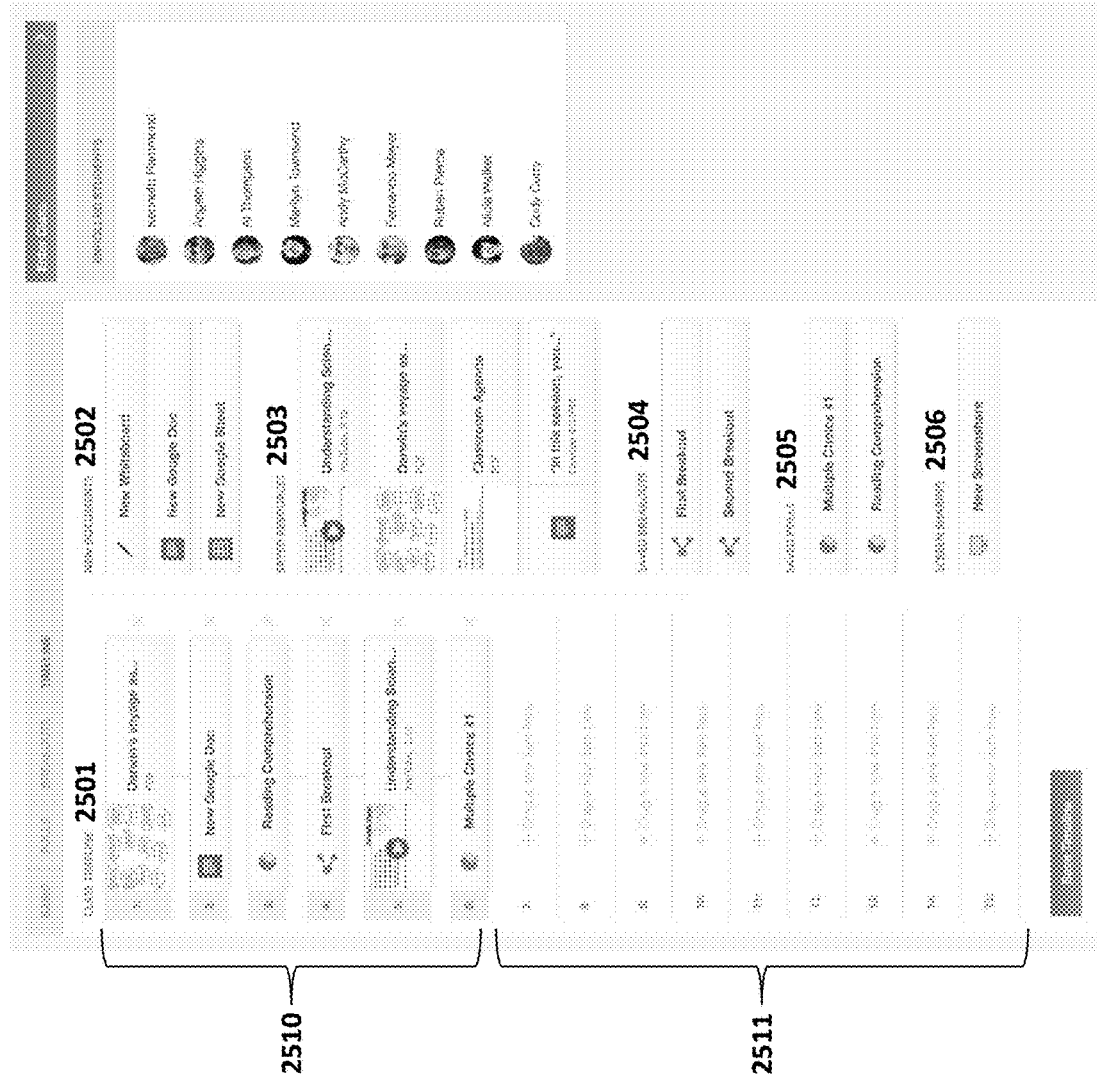
FIGS. 25A-C illustrate embodiments of a graphical design interface for designing interactive timelines.
Figure 25B:
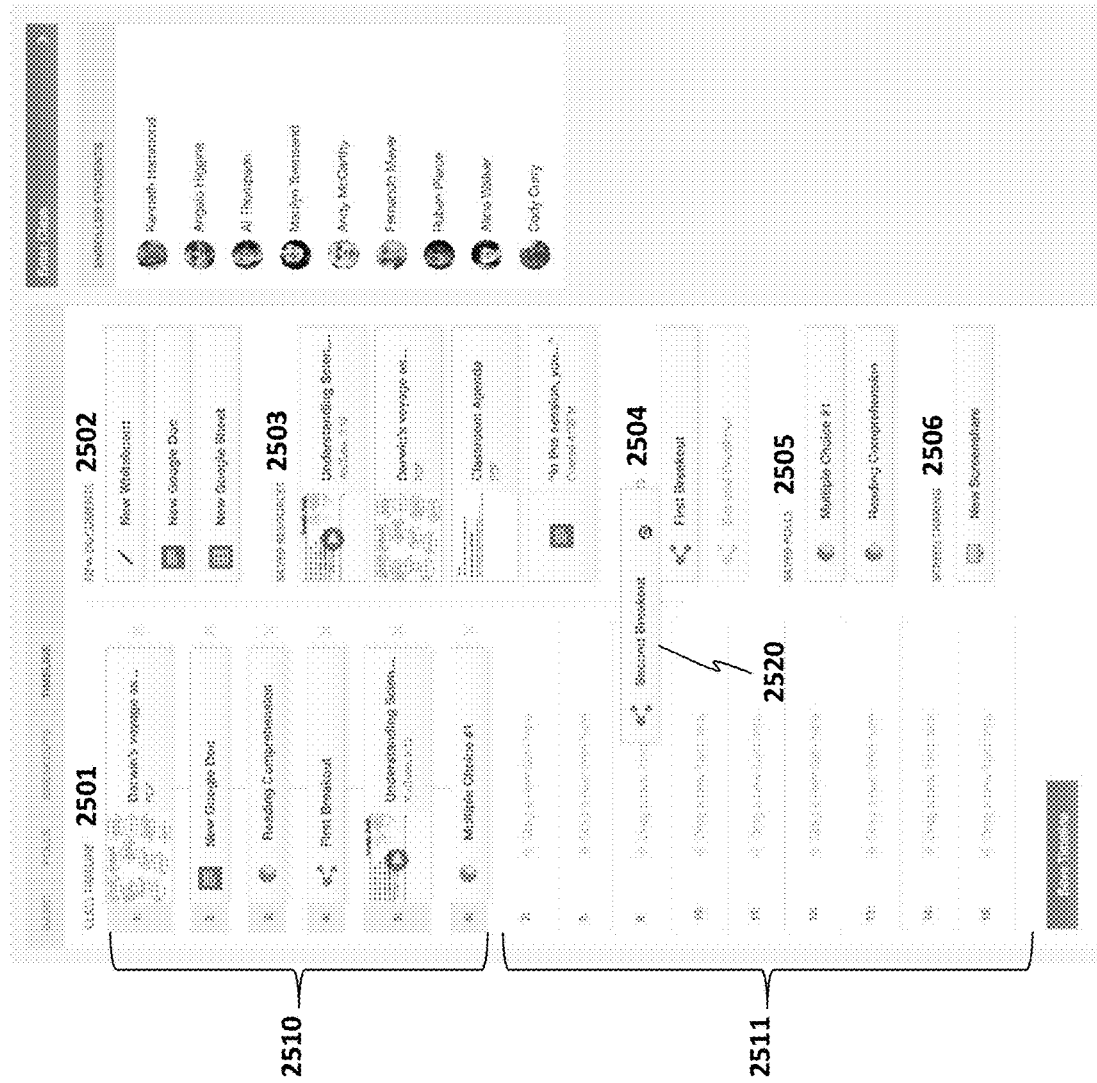
Figure 25C:
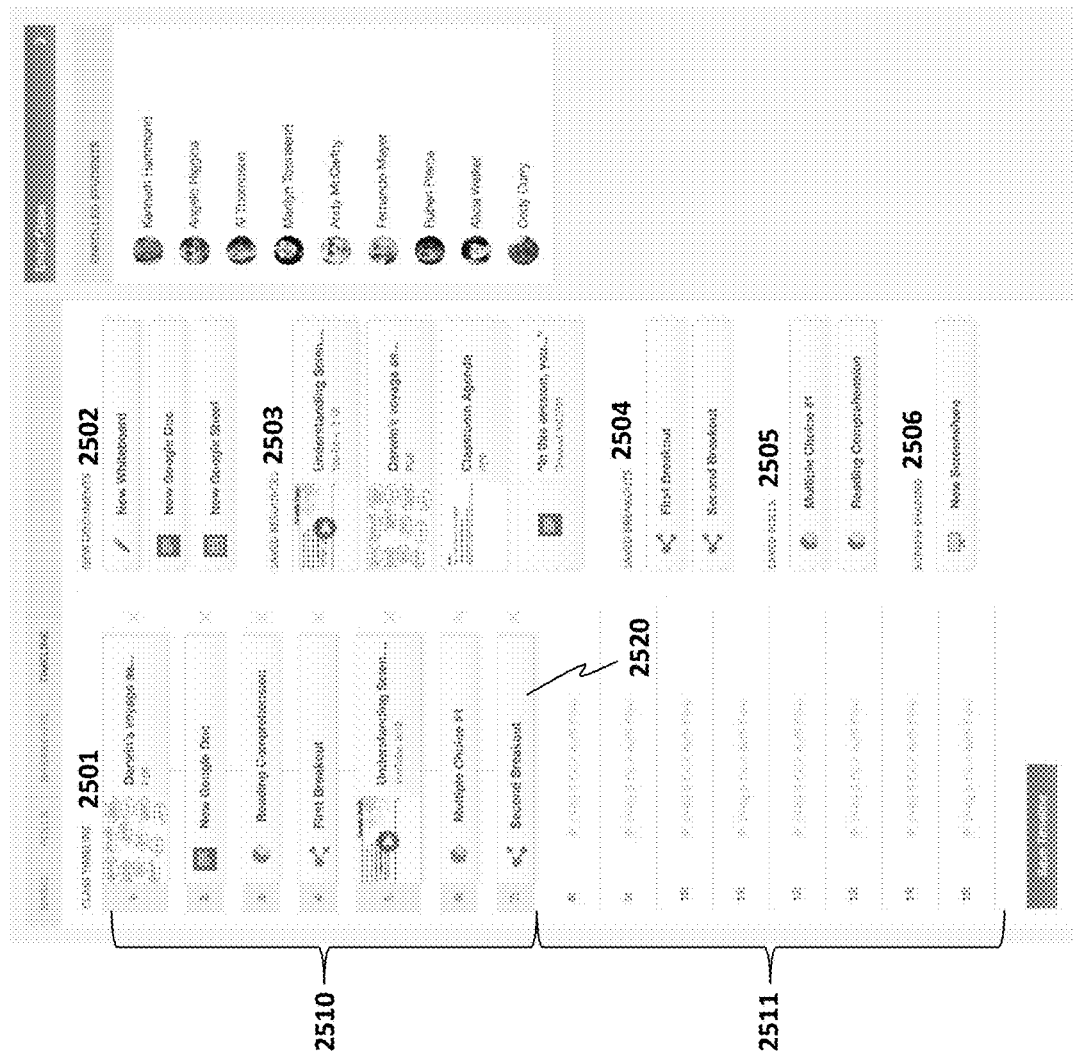

In another embodiment, illustrated in FIG. 22B, a graphical design application 2204 is used to construct the timeline for each class and responsively generate program code and/or a machine-readable representation of the lesson plan 2212. One example of such a graphical design application is illustrated in FIGS. 25A-C which includes a class timeline region 2501 comprising a series of entries into which different graphical objects may be moved by the lesson designer to construct each section and segment. In the example shown in FIG. 25A, objects have been moved into a first set of entries 2510 (numbered 1-6) and a second set of entries 2511 (numbered 7-15) are available to receive new objects. In one embodiment, the lesson designer may create a new section and/or segment by clicking and dragging a new object into one of the open entries 2511. Different objects may be provided which represent different resources, tasks, and GUI configurations for each segment. In the example shown in FIG. 25A, the objects include new documents 2502, saved resources 2503 such as PDFs, notes, videos, breakout groups 2504, polls 2505, and screen sharing 2506. A virtual unlimited number of such objects may be created and made available for the lesson designer to design each section and/or segment. In FIG. 25B, the lesson designer has selected a second breakout object 2520 and is dragging the second breakout object towards the next open entry within the open entry region 2511 (entry #7). FIG. 25C illustrates the second breakout object 2520 positioned within the set 2510 of selected objects.

In one embodiment, each object provided within the graphical design application may have a set of parameters from which the lesson designer may select. For example, when selecting a new breakout group, a drop-down menu or other graphical selection structure may be provided to allow the lesson designer to select the parameters for the breakout group (e.g., the number of participants per group, the resources to be used during the session, etc). Similarly, when conducting a poll, the lesson designer may be provided with a design widget to enter a question and a set of possible responses. Various additional object-specific design features may be provided to allow the lesson designer to design each section and/or segment.

In one embodiment, once the lesson designer has selected and configured a set of objects within the graphical design application 2211, the graphical design application 2211 will generate program code and/or a machine readable representation of the lesson plan 2212 which may then be interpreted by timeline generation logic 2213 to generate the timeline GUI and associated functions 2214 described herein. As mentioned, the generation of the timeline GUI and associated functions may be performed on the virtual conferencing service or locally on the instructor's client.

Figure 26A:
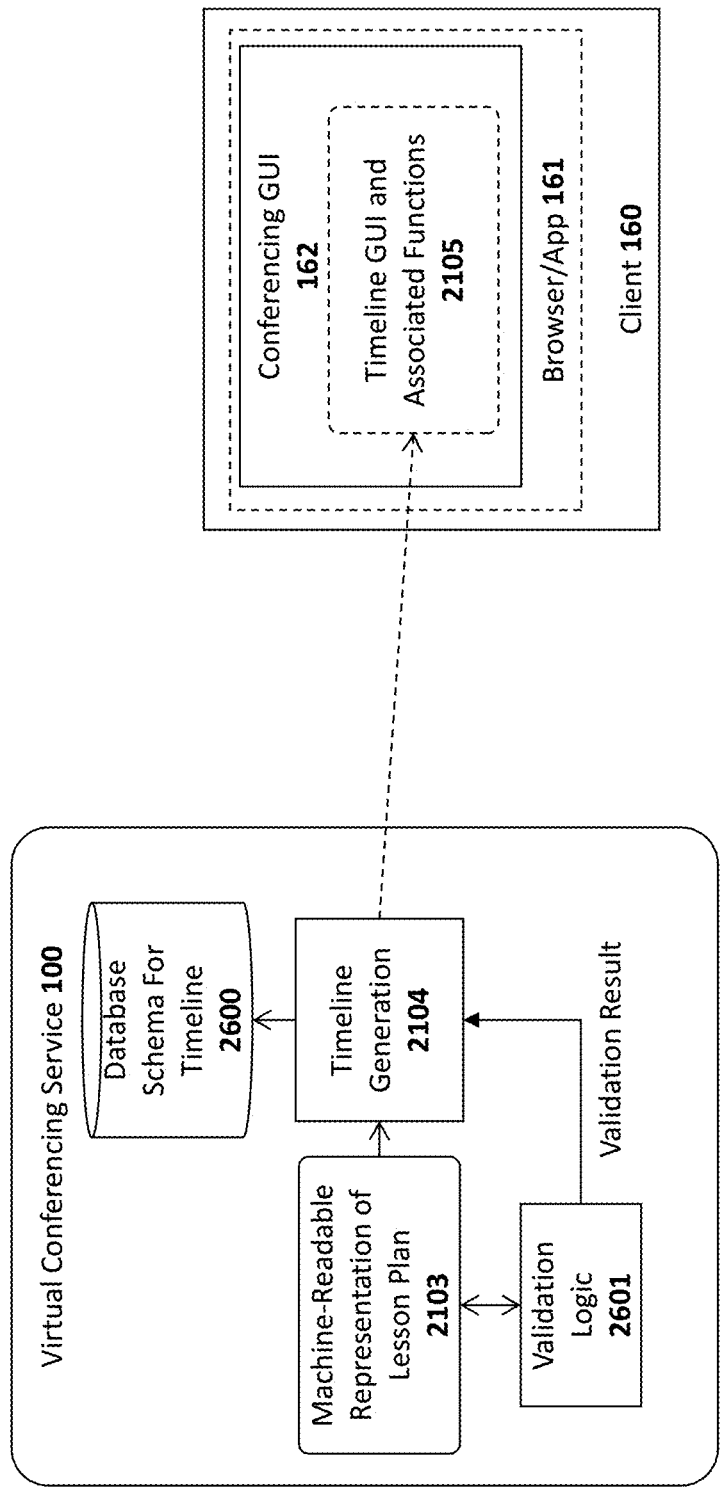
FIGS. 26A-B illustrate one embodiment of an architecture for generating a graphical interactive timeline.

FIG. 26A illustrates one particular implementation where a machine-readable representation of the lesson plan 2103 is interpreted by timeline generation logic 2104 on a virtual conferencing service 100 and the resulting timeline GUI and associated functions 2105 are transmitted to the instructor's client 160. In this particular example, the timeline GUI and associated functions are implemented within the context of the conferencing GUI 162 executed within a browser or application 161 on the instructor's client 160. In one embodiment, the timeline generation logic 2104 also establishes a database schema required to implement the functions of the timeline. The database schema may be established, for example, to set up the resources and other state required to implement each section and segment within the timeline. In one embodiment, the database schema is set up in accordance with the various operations and objects specified within the machine-readable representation of the lesson plan 2103.

In addition, in the illustrated embodiment, validation logic 2601 is employed which validates the machine-readable lesson plan 2103 prior to generating the timeline 2105 and database schema 2600. For example, the validation logic 2601 may parse and analyze the machine-readable representation of the lesson plan 2103 to ensure that no errors are present in the machine-readable representation. If the machine-readable representation is in a YAML format, for example, the validation logic 2601 may check to determine that the syntax used within the YAML file is valid and may also check to determine that various resources such as files referenced within the YAML file exist in the locations specified for the classroom.

As mentioned, once the timeline has been generated on the instructor's computer, the instruction may readily implement all of the operations associated with a segment by selecting that segment. A variety of different operations may be included within a segment including, by way of example and not limitation, featuring a random or particular participant, or selecting a participant based on specified criteria (e.g., featuring the participant who has spoken the least in class thus far, the participant who scored the highest on a recent quiz, the participant who answered a particular poll question in a particular manner, etc). In addition, the segment may be configured to implement a variety of different graphical user interface elements such as featuring different numbers of participants within the speaker region(s) (e.g., 1-up, 2-up, 3-up, 4-up, 5-up, 6-up, or 8-up for 1-8 featured speakers, respectively) or displaying one or more resources such as PDFs, Youtube® videos, links to web sites, word processing or presentation documents, spreadsheets, photos, to name a few. Other operations included in a segment may include, but are not limited to, conducting a poll, displaying poll results to the participants, comparing poll results of multiple polls or the same poll conducted more than once (e.g., one conducted at the beginning of class and the other at the end of class), conducting a quiz, conducting a breakout session (e.g., selecting participants based on results of a poll), featuring breakout groups and their work-product (e.g., notes), pitting two students against one another in a debate, sharing the instructor's or a participant's screen, initiating an open discussion (with notes for the professor related to how to direct it), and allocating a time period for independent work.

Figure 26B:
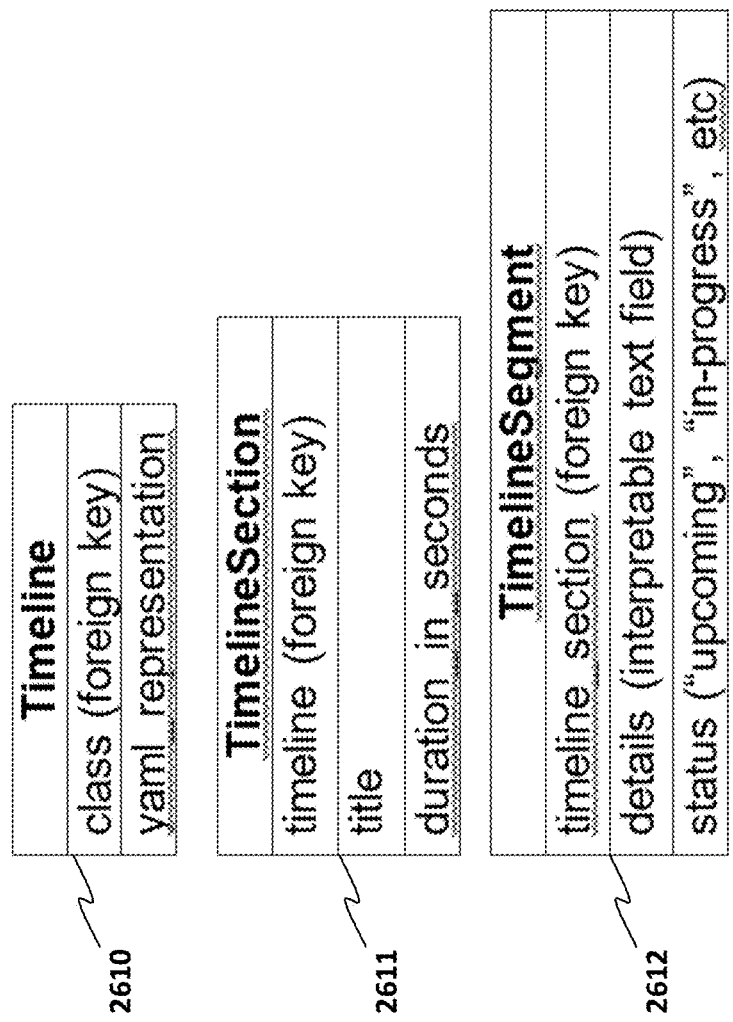

An exemplary database schema for the timeline 2600 is illustrated in FIG. 26B including a timeline component 2610, a TimelineSection component 2611 and a TimelineSegment component 2612 which define the data structures used for the timeline, sections within the timeline, and segments within each section, respectively.

After a user enters the timeline specification (e.g., as a YAML file or via the user interface as described herein), it is sent to the server 100, performs interpretation. Specifically, as mentioned above, validation logic 2601 may validate the YAML file or other machine readable representation 2103, thereby ensuring that all references to resources, breakouts, polls, etc, exist and are accessible. In the case of YAML file format, there are additional checks that the format is properly adhered to. If there is a problem, it is reported back to the user and the database is not updated.

In one embodiment, if validation passes, the timeline specification goes through a "normalization" step (e.g., implemented by timeline generation logic 2104), whereby the human-interpretable YAML file is converted into a form that is more uniform and thus simpler and more efficient for the computer to interpret. In one embodiment, the normalized form is written into the database 2600 using the schema shown in FIG. 26B.

In the illustrated schema, a "Timeline" 2610 consists of zero or more "TimelineSection"'s (connected through a foreign key). A "TimelineSection" consists of zero or more "TimelineSegment"s. Each TimelineSection has a "title" as well as "duration_in_seconds" for keeping track of time during class and helping the instructor stay on track.

Each TimelineSegment has a generic "details" text field, which contains all of the information needed to display the user interface components of the timeline and perform the operations that are part of that timeline segment. The "details" field is left generic because there is a great deal of variety in the types of operations a TimelineSegment might perform and, thus, a greater need for flexibility in what data is stored. Each TimelineSegment also has a "status" field, which indicates whether this TimelineSegment (1) has not yet been used by the professor; (2) is currently in-progress in class; or (3) has already been used. This state is used to maintain the Timeline graphical user interface.

As mentioned above, different TimelineSegment operations have different "details" field formats (which, in one embodiment, are stored as json code). An example "details" field for displaying on stage one student with email address student@minerva.kgi.edu and the last poll result for the poll named "Reducing homelessness: Best practices" is shown below.

```
{
    title: "Discuss poll result",
    op: layout,
    number-of-panes: 2,
    duration: 120,
    panes: [
        {
            type: "person",
            email: "student@minerva.kgi.edu"
        },
        {
            type: "poll-result",
            name: "Reducing homelessness: Best practices"
            instance-back: 0
        }
    ]
}
```

In one embodiment, this normalized version would be created from a user-input YAML one example of which is:

```
Title: Discuss poll result
Duration: 2m
Op: 2-up
Panes:
    - type: person
      email: student@minerva.kgi.edu
    - type: poll-result
      title: Reducing homelessness: Best practices
```

There are many user-input YAML files that would generate the same normalized version. For example, a user could specify the full name of the person to feature as opposed to their email address. Converting to the normalized version makes the client-side code that executes the Timeline easier and less error-prone to develop.

Figure 27:
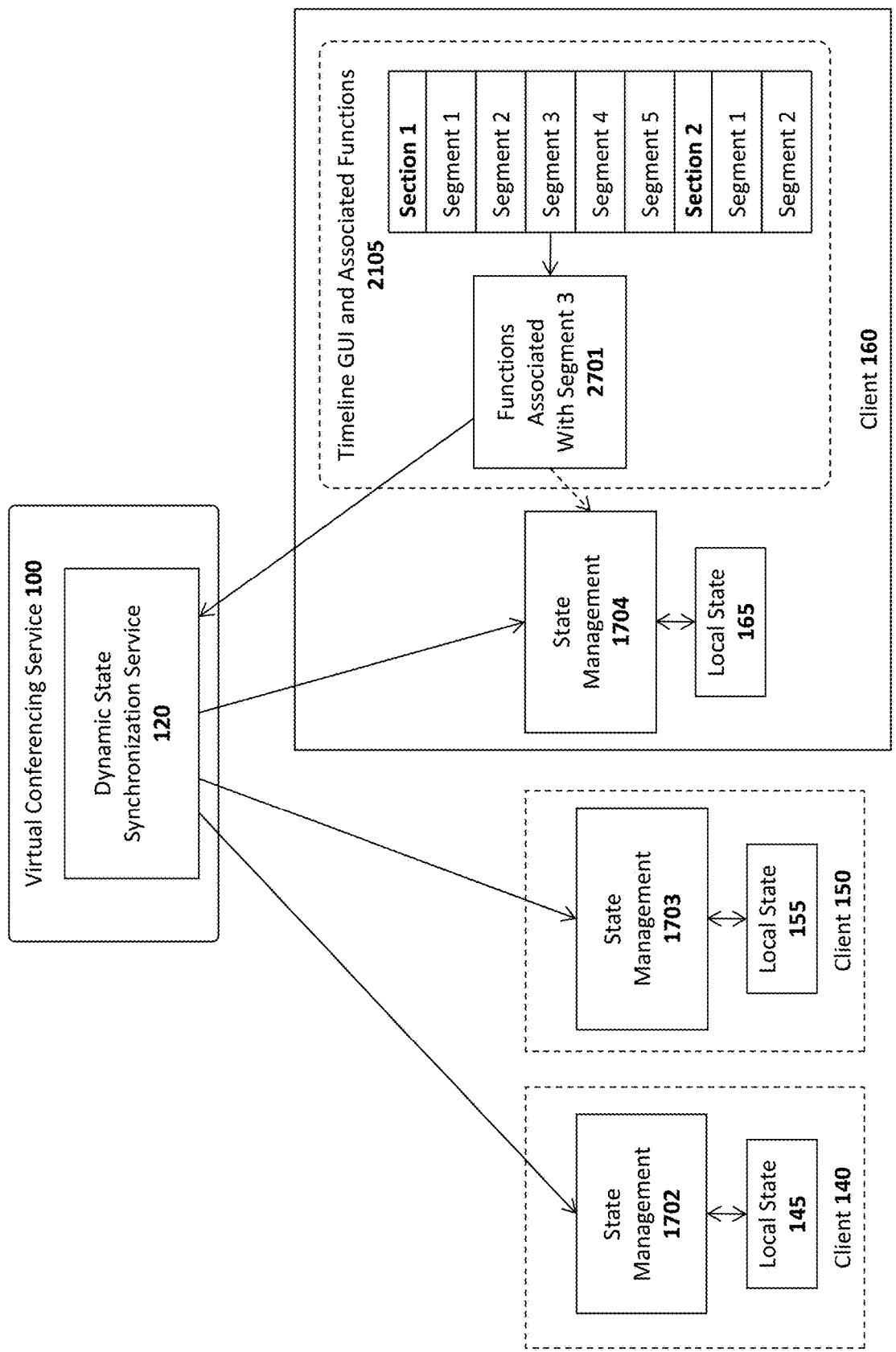
FIG. 27 illustrates how functions associated with a segment of a timeline may be synchronized with clients participating in a virtual conference.

As mentioned, in one embodiment, the state synchronization infrastructure described above may be used (at least in part) to implement the operations associated with each selected timeline segment. FIG. 27 illustrates one such example in which the instructor has selected a segment, Segment 3, within a timeline GUI 2105. In response, the set of functions associated with Segment 3 are implemented in succession and streamed to the dynamic state synchronization service 120 on the virtual conferencing service 100. As in prior embodiments, the state updates resulting from the execution of these functions are then streamed down to clients of each of the participants to the video conference, including the client 160 of the instructor. For example, if Segment 3 specifies that video of two speakers should be displayed alongside the results of a poll, then a sequence of commands to display two speakers along with poll results will be streamed from the client 160 and synchronized with all of the clients 140-160 via the dynamic state synchronization service 120. In one embodiment, the commands transmitted from the client 160 comprise the same set of commands that would result if the instructor manually set up the dual speaker configuration with poll results. The end result is that the local state 145, 155, 165 on each client will be consistent and will display the desired GUI and associated configuration.

Figure 28B:
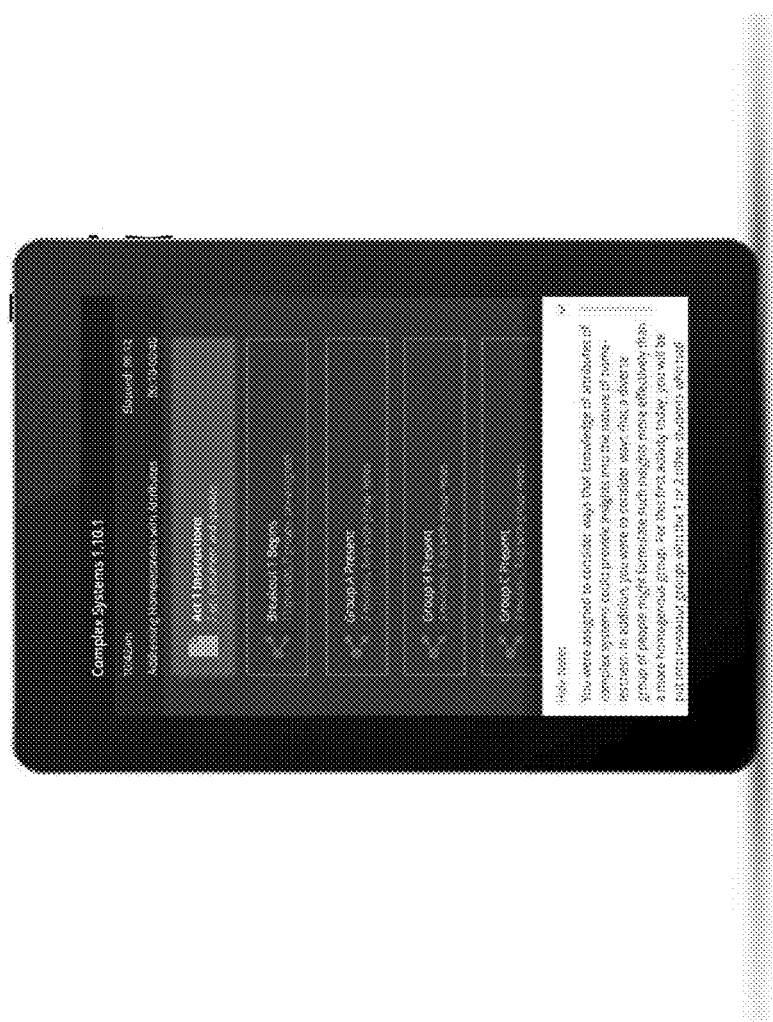
FIGS. 28A-C illustrate an interactive timeline displayed on a secondary display in accordance with one embodiment.
Figure 28A:
Figure 28C:
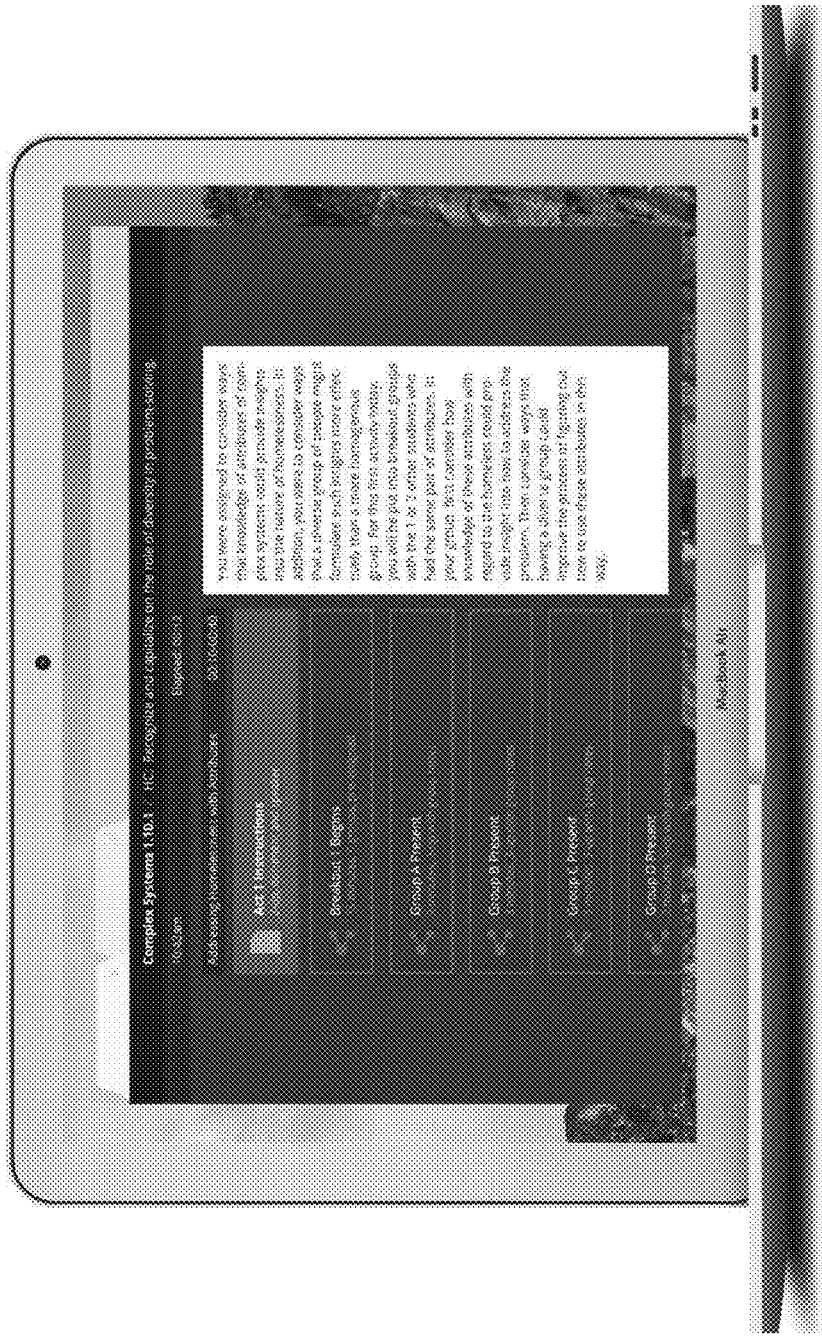

In one embodiment, the instructor may log in to the virtual conferencing service 100 using two devices and may use one device for implementing the interactive timeline while using the other device for implementing the standard conferencing GUI. FIGS. 28A and 28B illustrate the interactive timeline implemented on a mobile device and tablet, respectively, and FIG. 28C illustrates the interactive timeline implemented on a personal computer. In these embodiments, the user logs in to establish a first communication socket with the virtual conferencing service 100 using a first client device, and also logs in to establish a second communication socket with the virtual conferencing service 100 using a second client device. in one embodiment, the virtual conferencing service 100 will associated each of the two sockets with the instructor's account and will process commands from either device in a similar manner. However, in one embodiment, the state updates from the dynamic state synchronization service 120 reflecting changes to the virtual conferencing environment are transmitted to the client device implementing the virtual conferencing GUI but not to the client device implementing the interactive timeline.

System and Method for Decision Support in a Virtual Conference

As mentioned above, in some virtual conferencing systems, the meeting organizer or moderator is provided with control over the current state of the virtual conferencing system via a graphical control panel. For example, in a virtual classroom environment, the instructor is provided with the ability to choose the current speaker or group of speakers. Once selected, video of the current speaker or group of speakers may be displayed within a central speaker region of the virtual conferencing GUI.

When an instructor (e.g., professor, teacher) chooses to call on a student during in-class discussions, the choice of student to benefit from this learning opportunity may be unfair or inefficient. A choice may be perceived to be unfair because humans are prone to various cognitive biases (e.g., gender, or "availability" effects), which may affect a professor's decision in selecting a student to answer a question. An instructor's choice of a student may be inefficient because the educational value associated with calling on a student to answer a question varies and different students benefit to different degrees from attempting to respond to the same question.

Web conferences outside of the context of a synchronous classroom environment suffer from a generalized form of this problem; conference leaders often intend to be fair and efficient in how they engage other conference participants, but their attempts are impaired by various human biases and inefficient choices. Furthermore, to the extent an instructor or other moderator wants to be fair or efficient, he or she needs to expend both significant cognitive effort during the class/meeting to track student behavior as well as time pre- and post-class/meeting to prepare.

As a result of these limitations, some students (or participants) are afforded fewer learning and/or speaking opportunities than others and valuable learning opportunities are missed.

One embodiment of the invention provides a web conference leader (e.g., an instructor or other moderator) with information about which participants (e.g., which particular students, meeting attendees) may benefit most from active participation at a particular point in time. For example, a student may be called on to answer a particular question during a class, or a meeting attendee may be invited to speak at a particular point during a conference. Using the techniques described herein, speaking and learning opportunities are provided efficiently and fairly without bias.

While the discussion below will focus on a virtual classroom or "e-learning" environment to facilitate discussion of the present application, one of ordinary skill in the art will appreciate that the underlying principles of the invention may be extended to any virtual conference in which participants are invited to speak or otherwise participate.

FIG. 29 is a block diagram illustrating components of an exemplary computer system which may be used to implement the various clients and servers described herein. The exemplary computer system may execute program code stored on a machine-readable medium to implement the various techniques described herein. Specifically, FIG. 29 shows a diagrammatic representation of a machine in the example form of a computer system 2900 within which instructions 2924 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. As is further described below, this machine representation provides an example configuration to execute the processes described herein whether on the server side and/or client side.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2924 (sequential or otherwise) that specify actions to be taken by that machine. Further, while only a single machine is illustrated, the term "machine" shall also be taken to include any collection of machines that individually or jointly execute instructions 2924 to perform any one or more of the methodologies discussed herein.

The example computer system 2900 includes a processor 2902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2904, and a static memory 2906, which are configured to communicate with each other via a bus 2908. The computer system 2900 may further include graphics display unit 2910 (e.g., a plasma display panel (PDP), a liquid crystal display (LCD), a projector, or a cathode ray tube (CRT)). The computer system 2900 may also include alphanumeric input device 2912 (e.g., a keyboard), a cursor control device 2914 (e.g., a mouse, a trackball, a joystick, a motion sensor, or other pointing instrument), a storage unit 2916, a signal generation device 2918 (e.g., a speaker), and a network interface device 2920, which also are configured to communicate via the bus 2908.

The storage unit 2916 includes a machine-readable medium 2922 on which is stored instructions 2924 (e.g., software) embodying any one or more of the methodologies or functions described herein. The instructions 2924 (e.g., software) may also reside, completely or at least partially, within the main memory 2904 or within the processor 2902 (e.g., within a processor's cache memory) during execution thereof by the computer system 2900, the main memory 2904 and the processor 2902 also constituting machine-readable media. The instructions 2924 (e.g., software) may be transmitted or received over a network 2926 via the network interface device 2920.

While machine-readable medium 2922 is shown in an example embodiment to be a single medium, the term "machine-readable medium" should be taken to include a single medium or multiple media (e.g., a centralized or distributed database, or associated caches and servers) able to store instructions (e.g., instructions 2924). The term "machine-readable medium" shall also be taken to include any medium that is capable of storing instructions (e.g., instructions 2924) for execution by the machine and that cause the machine to perform any one or more of the methodologies disclosed herein. The term "machine-readable medium" includes, but not be limited to, data repositories in the form of solid-state memories, optical media, and magnetic media.

Figure 30:
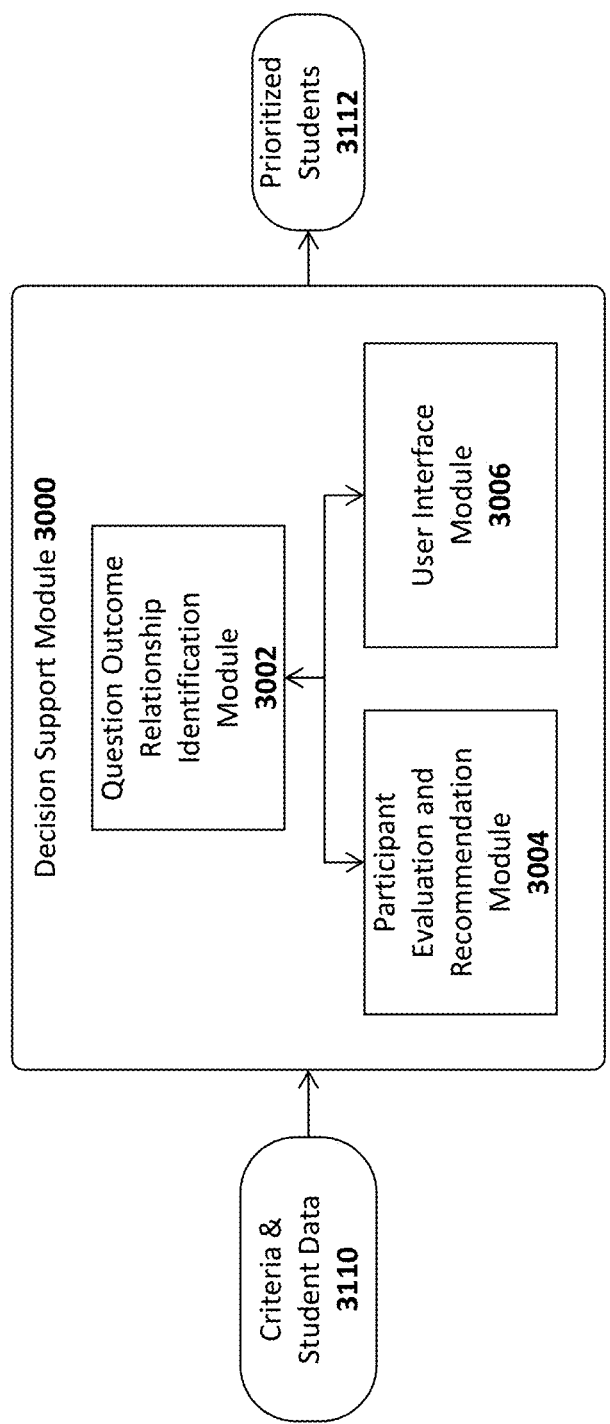
FIG. 30 illustrates an exemplary decision support module employed in one embodiment of the invention.

FIG. 30 illustrates an exemplary decision support module 3000 which generates a prioritized list of students 3112 who would benefit the most from participation, based on a set of criteria and student data 3110. As discussed below, the criteria and student data may include one or more questions (q) and learning outcomes (o) of the question with respect to each student. The student data may also include variables such as the length of time since the student has participated in the virtual classroom.

In one embodiment, the decision support module 3000 is configured to quantify values of a question q, which is designed to promote a learning outcome o, for each student. The decision support module 3000 comprises a question outcome relationship identification module 3002, a participant evaluation and recommendation module 3004, and a user interface module 3006. In one embodiment, the decision support module 3000 is implemented in program code executed on the client of the instructor. However, in another embodiment, the decision support module 3000 is implemented on a server within the virtual conferencing service 100 (i.e., and the decision results transmitted to the instructor's client).

Figure 31:
FIG. 31 illustrates an exemplary graphical user interface for identifying students recommended for participation.

In one embodiment, the question outcome relationship identification module 3002 is configured to identify the relationship between a question and an underlying outcome, the participant evaluation and recommendation module 3004 is configured to evaluate a participant's performance based on the identified relationship and recommend one or more participants based on the evaluation, and the user interface module 3006 is configured to generate a user interface to identify participants for speaking and/or learning opportunities (see, e.g., FIG. 31 and associated text below). While illustrated within the context of the decision support module 3000, the user interface module 2006 may be implemented as a separate module which generates user interface features in response to the decisions made by the decision support module 3000.

Questions in some examples provided herein are teaching instruments. For example, instructors ask questions to facilitate teaching. Questions may be asked to help the students achieve a learning outcome, to develop a habit of mind, or to acquire a foundational concept. As illustrated, the decision support module 3000 is configured to facilitate a web conference leader's decision making when selecting a student to participate in the virtual classroom. The present application refers to underlying outcomes as o, questions as q, and students as s. In one embodiment, the decision support module 3000 is configured to identify the relationship between a question q and a student's output, which is the student's performance with respect to the underlying outcome o. A many-to-many relationship may exist between a question q and an underlying outcome o, associated with the question q. It is noted that the decision support module 3000 may be embodied as a computer program product comprised of instructions, e.g., 2924, stored in a storage unit and/or memory, e.g., 2904, 2916, and/or 2922, an executable by a processor, e.g., 2902.

In various embodiments, a decision support module 3000 may generate a score related to a student, by using a criterion function C, as illustrated in Equation (1):

$$C:(o,s)\rightarrow[0,1]$$

The question outcome relationship identification module 3002 may define a criterion function C to describe the relationship between a question and an outcome. A criterion function C may be defined to include a set of factors. For example, a criterion function C may include a period of time since the last time that a student s answered a question q involving outcome o correctly during class discussion. As another example, a criterion function C may include a period of time since the last time a student s answered a question q involving outcome o correctly in submitted homework assignments. Another criterion function C may include a distance from mastery, which is a quantitative measurement indicating the difference of a student s from mastering an outcome o (assuming that the students has not yet demonstrated mastery based on past performance on tests or quizzes). The distance from mastery is designed to provide a student with opportunities to demonstrate newly-acquired mastery or any incremental progress (e.g. a higher score on a metric of mastery) based on the practice opportunity and professor feedback. In various embodiments, the distance from mastery is configured to be a metric including a set of factors such as a student's past attempts exhibited in synchronous settings (e.g. prior class sessions), or a student's past attempts exhibited in asynchronous settings (e.g. submitted assignments, discussion boards).

A criterion function C may further include a period of time since the last time a student s has spoken in a class and/or may include the number of times that a student s fails in grasping the outcome o. In some cases, an instructor may call on a student s who does not fully grasp a concept and needs to have a basic understanding of the learning outcome o.

The participant evaluation and recommendation module 3004 evaluates a participant's mastery of an outcome according to the defined criterion function C. A participant's performance in past sessions (which may be recorded) may provide a basis for evaluating the participant in a present session. Various embodiments may record, store, and analyze, student participation in web conference session. For example, data may be created to evaluate a student's performance according to a rubric defining a set of evaluation rules provided by an instructor.

An instructor may take into account multiple criteria when determining which student to select to participate. For example, in some embodiments, a composite criterion function $C_x$ may be defined to include a set of individual criteria functions $\{C_1 \ldots, C_n\}$. A composite criterion function $C_x$ may be defined as the weighted sum of a set of individual criterion functions and may be used to determine a score for students according to an outcome o:

$$C_x = \Sum_{i=1}^{n} w_i C_i \quad (2),$$

where each of the criteria functions $\{C_1 \ldots, C_n\}$ has a corresponding weight $\{W_1 \ldots, W_n\}$, and $$\Sum_{i=1}^{n} w_i = 1.$$

Of course, in some implementations, the student selection process may be simpler than that described above. For example, in one embodiment, a single criterion such as the length of time since each student last participated or the frequency of participation of each student may be used as a sole variable for selecting a student. For example, the participant evaluation and recommendation module 3004 may generate the prioritized set of students 3112 based solely on one of these variables.

In the context of a single-criterion decision support module, a set of students $\{s_1 \ldots, s_n\}$ may be ordered according to their C scores based on a learning outcome o associated with a question q, as illustrated in Equation (3). In various embodiments, the student with the highest score according to a criterion C may be reported. The student with the highest score is the one who, according to a decision criterion C, is expected to benefit the most from being asked a question q focused on this learning outcome o.

$$C_{sort}:(o,\{s_1,\ldots,s_n\}) \rightarrow [s_{highest},\ldots,s_{lowest}] \quad (3).$$

In the context of a multiple-criteria decision support module, a set of students $\{s_1 \ldots, s_n\}$ may be ordered based on each individual score according to a composite criteria function $C_x$, according to Equation (4) below. One or more students with the highest score(s) are the ones whom, according to the composite decision criteria, are expected to benefit the most from answering the question that addresses the learning outcome o.

$$C_{x\ sort}:(o,\{s_1,\ldots,s_n\}) \rightarrow [s_{highest},\ldots,s_{lowest}] \quad (4).$$

Various embodiments identify one or more students who are most likely to benefit from answering a question addressing an outcome and may present a metric to an instructor recommending one or more students to be called on. The metric may include one or more students with the highest score(s) based on an outcome associated with a question.

In one embodiment, information is presented to an instructor on-demand or in real-time within a virtual conference user interface as illustrated in FIG. 31. The user interface may present results of the decision support module 3000 by highlighting a set of one or more students 3112-3117 having the highest scores for each decision criterion and/or highest composite scores. In particular, in the embodiment shown in FIG. 31, video thumbnails are displayed for all of the students and a subset of the video thumbnails 3112-3117 are highlighted using multi-colored circles. Once highlighted, the instructor may manually select one of the highlighted user to participate (e.g., answer a question).

In one embodiment, the user interface module 3006 creates (or provide for display on a visual display or screen) the illustrated user interface based on recommendations made by the participant evaluation and recommendation module 3004. In the illustrated example, the set of video thumbnails 3112-3117 associated with recommended students are highlighted to the professor 3110 based on the learning outcome 3120 identified by the professor. A video image 3110 of the professor is illustrated in the center speaker region.

In various embodiments, a user (e.g., an instructor, a conference leader, a moderator) may specify an outcome (e.g., a learning outcome, a conference objective, a meeting objective) that is desired or needs to be addressed. A set of recommendations is provided based on the outcome. An outcome may be defined in different ways. For example, a professor may indicate a learning outcome. A learning outcome may evaluate whether hypotheses are based on plausible premises and assumptions, and are falsifiable.

Before a class session begins, the professor 3110 may select a learning outcome from a list provided. The selected learning outcome may be included in prepared class materials. The professor may pull it up during a class from a dashboard of prepared class materials (e.g., such as the interactive timeline 2402 described above), either on their primary computer display or a dedicated dashboard on a tablet or other mobile device (as shown in FIGS. 28A-C).

The professor 3110 may prepare specific questions before class and indicate the learning outcome associated with each question. During class, decision support recommendations may then be generated by the decision support module 3000 when a question is selected.

The professor 3110 may also specify a learning outcome during class, without advanced preparation. A set of learning outcomes may be provided in an order to make the selection straightforward. Minimum attention is required to make the decision while the professor 3110 leads a class discussion. Once again, the interface may be displayed on the primary display or on a dedicated interface on a secondary display.

Various embodiments allow a user, e.g., the professor 3110, to select from a set of criteria and/or a weight associated with a criterion. In order to calculate scores for students, e.g., 3112-3117, based on the specified learning outcome, a set of criteria may be specified. If a composite score is desired, per-criterion weights may be specified. Such selections may be made before or during class. For example, the professor 3110 may select a criteria and/or a weight.

The professor 3110 may toggle on/off a criterion from a list of criteria provided before the class session begins (e.g., on the primary display or a secondary display). The professor 3110 also may toggle on/off a criterion from a list of criteria provided during class, without advanced setup. Moreover, for different questions, the professor may activate or deactivate a criterion. This interface may be displayed on the primary display or on a dedicated view on a secondary display.

Various different types of information may be considered by the decision support module 3000 to identify and prioritize a set of students who would most benefit from participation. In many of the examples set forth above, the criteria is based on specific questions and outcomes. Additional criteria may include the how frequently or how recently each user has participated in the class discussion. For example, one embodiment of the decision support module 3000 may identity a set of participants who have participated the least in class discussions and/or a set of participants who have not participated recently (compared with other participants). Using this information, the decision support module 3000 may generate a prioritized list of participants with those users who have participated the least towards the top of the prioritized list and those who have participated the most towards the bottom of the prioritized list. In other embodiments, the participation level of each user is just one criteria among several evaluated by the decision support module 3000 when prioritizing the list of students. Like other criteria, the participation level of each student may be assigned a weight which may be combined with the weights of other criteria to arrive at the final prioritization determination.

The number of recommendations for each active criterion may be specified. For example, the instructor may specify the number of students to be highlighted as potential candidates for participation. The number may be the same for all criteria or may vary by criterion. If a composite criteria scoring is desired, control over the weights attached to each active criterion can be exposed. In one embodiment, weights may all be set to 1/n where n is the number of active criteria. Sliders (or other such controls) may be used to increase or decrease any of the individual weights and the other weights can automatically adjust to compensate proportionally. For active criteria functions $\{C_1 \ldots, C_n\}$ and current weights $\{w_1 \ldots, w_n\}$, if $w_j$ changed to $w_{j'}$, the other weights may be adjusted in accordance with the difference $w_j - w_{j'}$ such that the sum of all weights is maintained to be unity: $\Sigma_i w_i = 1$.

Once an outcome is identified, recommendations may be presented to an instructor or other moderator. In some embodiments, recommendations may be determined, stored, and provided even before a class begins. By way of example, based on specified criteria, recommendations may be generated and integrated within the interactive timeline 2402 described above. In such a case, the instructor may only need to select the relevant segment from within the timeline 2402 to view the set of recommended students 3112-3117.

While one specific implementation is illustrated in FIG. 31, in which differently-sized highlight elements are displayed over certain video thumbnails 3112-3117, decision support recommendations may be presented to a user in a wide variety of ways. For example, recommendations can be conveyed to an instructor by visually modifying or styling video or photographic representations of students through: (1) change in brightness, opacity, saturation, and/or contrast of the video or photograph of relevant students; (2) change in size, color, or opacity of a border or shadow around the video or photograph of relevant students; (3) addition of a pulse or wiggle animation of a border or shadow around the video or photograph of relevant students; (4) increase in size/dimensions of the video or photograph of relevant students; (5) addition of an icon or badge on or near the video or photograph of relevant students; (6) a word or phrase appearing below or otherwise associated with the video or photograph of relevant students; or (7) a change in position of a photograph (e.g., slightly elevated on y-axis), or change in ordering of a row of photos (e.g., arranging students from left to right in a descending order).

Students that are evaluated to benefit from a learning opportunity to different degrees may be visually modified differently. For example, in FIG. 31, a more pronounced (i.e., larger) highlight is used for the student identified in video thumbnail 3112 compared to the student identified in video thumbnail 3113 (indicating that the student in 3112 may benefit more from participation based on the results generated by the decision support module 3000).

In one embodiment, students who demonstrate a lower mastery of a subject may be presented more visually distinguishable than students who demonstrate greater mastery. A student may be presented most visually distinguishable when the student is determined to demonstrate the least amount of mastery of the underlying outcome associated with a question. Students 3112, 3115-3116, and 3117, in the illustrated example, are more visually distinguishable than students 3113-3114.

For instance, the highlighted area around students 3112, 3115-3116, and 3117 are larger and the color is brighter than the highlighted area around students 3113-3114. Via this visual presentation, the professor 3110 may be notified that among the students being recommended 3112-3117, students 3112, 3115-3116, and 3117 have demonstrated relatively less mastery. As such, the professor 3110, with very little cognitive effort, may make a decision in picking a student to answer the question. In one embodiment, the professor may pick a student by selecting the video thumbnail or other icon associated with that student.

The relevant criteria may be identified and presented to a user. Recommendations may be made based on at least one criterion, the criteria used as a basis for each recommendation may be identified and presented to a user. Criteria that are used may be presented to a user by visual modification. A visual style modification can display the name of and/or short identifier for one or more criteria by which the student was recommended, either always or upon a trigger action like a mouse click, hover, or tap.

When there are multiple displays, a live-updating display of recommendations may be visible for all active criteria for all learning outcomes of interest. All recommendations are always visible for all outcomes of interest. A user does not need to select a learning outcome to view recommendations. For example, a grid of student names or photos may be displayed. Each row is associated with one learning outcome and each column is associated with one decision criterion. In each cell, a visual representation of the top students being recommended for the combination of outcome and criterion is displayed.

When multiple criteria are selected but only one outcome is specified, a list of top students per criteria are distributed across multiple rows, such that only one student is displayed in a cell. When several outcomes are selected but only one criterion is specified, a list of students in each cell may be distributed across multiple columns, such that only one student is displayed in a cell.

Figure 32:
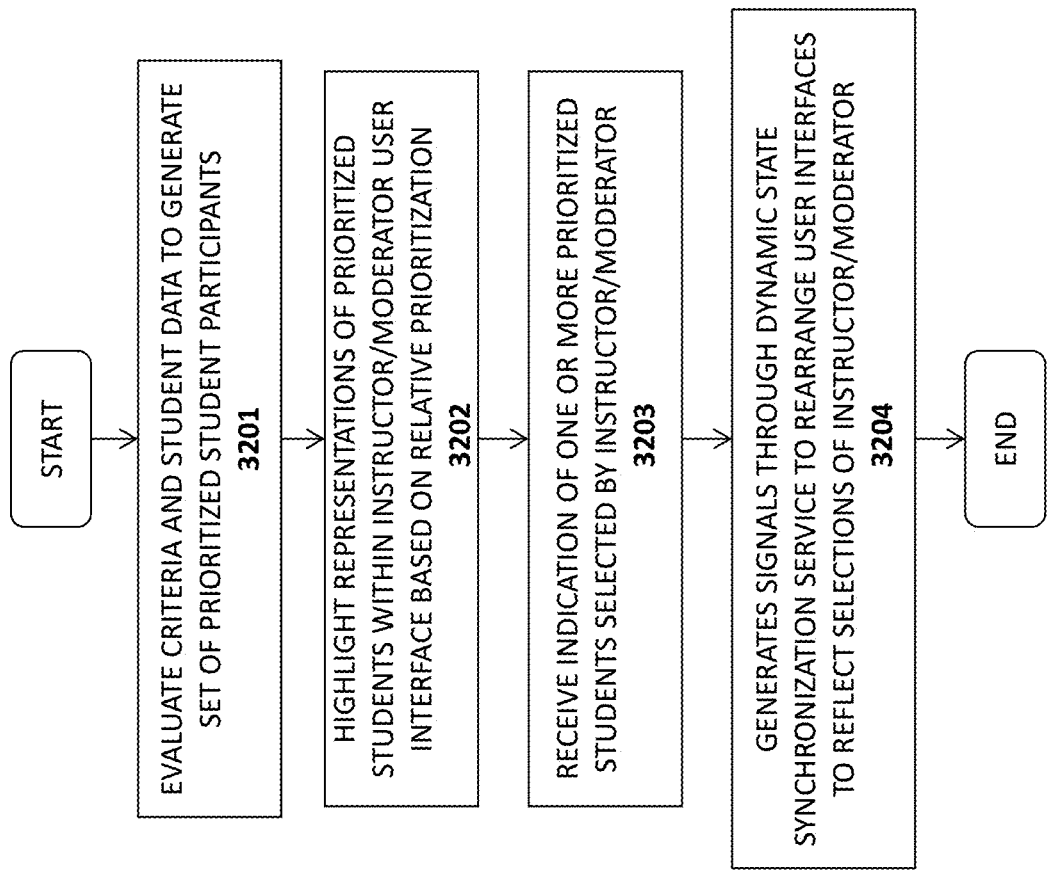
FIG. 32 illustrates a method in accordance with one embodiment of the invention.

A method in accordance with one embodiment of the invention is illustrated in FIG. 32. The method may be implemented within the context of the system architectures described above, but is not limited to any particular system architecture.

At 3201, criteria and student data are evaluated to generate a set of prioritized student participants (i.e., ordered based on relative priority). As mentioned, in one embodiment, multiple weighted criteria may be used to perform the prioritized ordering. Variables such as the specific question, the learning outcome for the question, and the length of time since each student has last participated may be evaluated to generate the ordering.

At 3202, representations of the prioritized students may be highlighted within the instructor's graphical user interface based on the relative prioritization of the students. For example, in the embodiment shown in FIG. 31, the highlight graphics surrounding some of the prioritized students 3112-3117 are bolder and/or larger to reflect the prioritization. Of course, various other techniques may be used to convey the prioritization including simply ordering the representations of the students based on priority (e.g., higher priority to the left and lower priority to the right), displaying a numerical value, and/or using color-coding.

At 3203, an indication of one or more prioritized students selected by the instructor/moderator are received (e.g., by program code executed on the instructor's client and/or the virtual conferencing service 100). As mentioned, the instructor may select a student simply by clicking on the highlighted representation of that student within the graphical user interface.

At 3204, signals are generated to rearrange the user interfaces of all of the virtual conference participants in response to the instructor's selection. For example, if the instructor has selected a particular student to address a question, then that student may be moved into the center speaker region of the graphical user interface. In one embodiment, the rearrangement of the user interfaces is accomplished through the dynamic state synchronization service as described above. For example, the local state of the instructor's user interface may first be modified to reflect the selection. The state changes may be transmitted to the dynamic state synchronization service from the instructor's client from which they may be propagated to all clients participating in the virtual conference (e.g., using the publish/subscribe techniques described above).

System and Method for Tracking Events and Providing Feedback in a Virtual Conference As mentioned above, students in a virtual classroom can benefit from formative feedback on their contributions during classroom discussions. Such feedback requires identifying, classifying, and/or assessing each contribution (e.g., spoken contribution, written contribution) by each individual participant, which may be time consuming and impractical. Notwithstanding the pedagogical value of formative feedback and assessment, the time and resources required in providing such feedback and assessment to participants can prevent or diminish this learning opportunity for participants.

One embodiment of the invention actively captures "events" related to the activity of each student during the course of a virtual conference. These events may then be stored along with timing data to indicate the points in time during the course of the virtual conference when the events occurred and information associating each event with particular participant. An instructor or other moderator may then review the activities of a given participant by filtering the events associated with that participant from the events associated with all other participants. In one embodiment, the timing data may be used to review the events within the context of the overall virtual conference (i.e., at the specific times at which the events occurred). In this manner, the instructor or other moderator can efficiently review the contributions of each student and provide formative feedback. In one embodiment, identified contributions may be classified and assessed according to the goals defined by the instructor.

While the embodiments described below focus on a virtual classroom or "e-learning" environment to facilitate discussion of the present application, one of ordinary skill in the art will appreciate that the present application can be used to provide feedback and support decision making in various other forms of virtual conferences.

Figure 33:
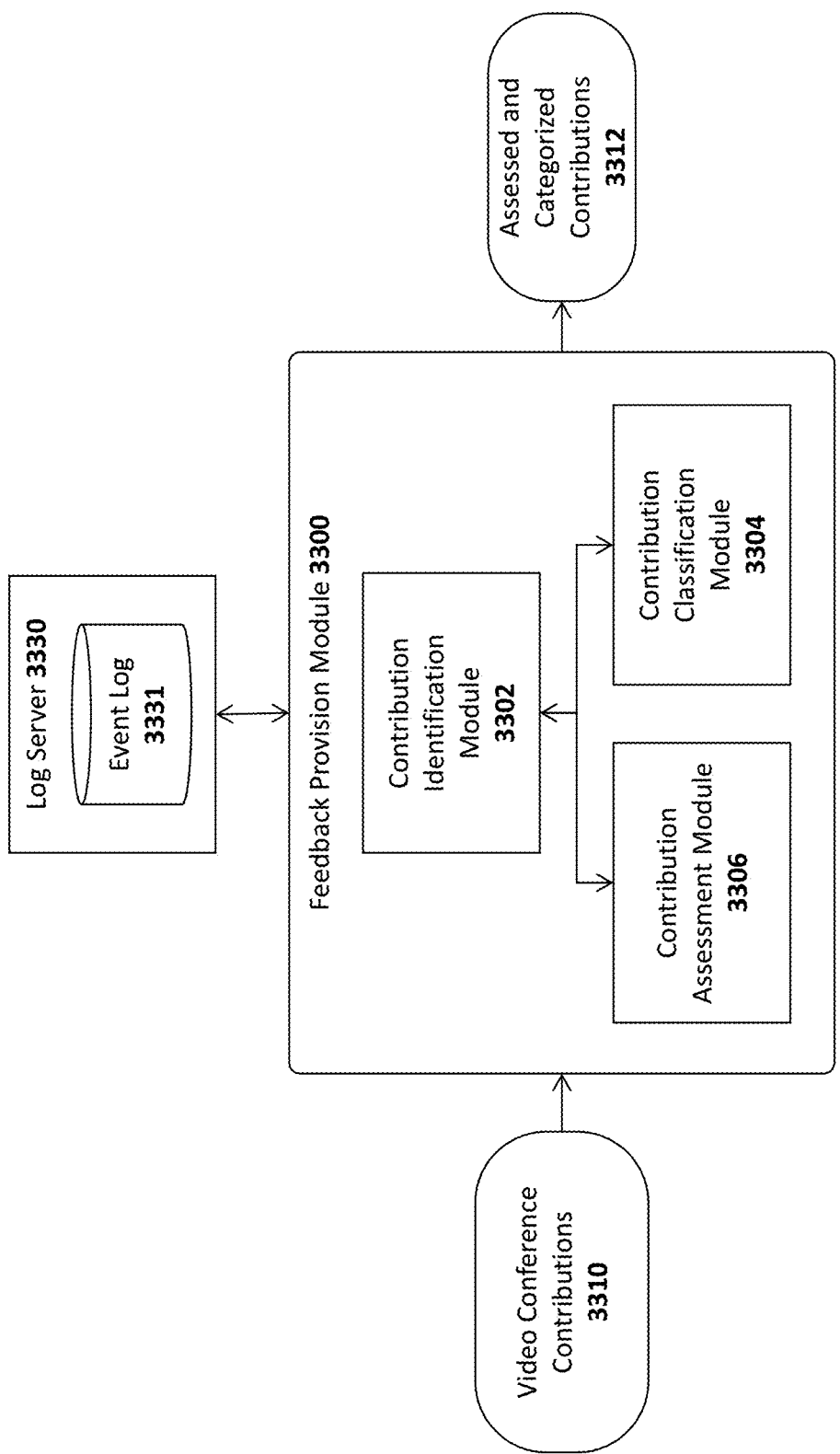
FIG. 33 illustrates an example feedback provision module configured to providing assessment of participants based on defined learning outcomes.

FIG. 33 illustrates an example feedback provision module 3300 which evaluates the video conference contributions 3310 of each participant and responsively generates sets of assessed and categorized contributions 3312. In one embodiment, the assessed and categorized contributions 3312 includes data associating each contribution with at least one participant and timing data indicating a point in time at which the contribution occurred during the virtual conference. The feedback provision module 3300 may be embodied as program code (e.g., software instructions) that may be read into the memory 2904 and executed by the processor 2902 of the computer system 2900 as illustrated in FIG. 29. The exemplary feedback provision module 3300 comprises a contribution identification module 3302, a contribution classification module 3304, and a contribution assessment module 3306. Briefly, in one embodiment, the contribution identification module 3302 identifies a participant's (e.g., a student's) contribution during the virtual conference, the contribution classification module 3304 classifies the participant's contribution, and the contribution assessment module 3306 assesses a participant's contribution and generates assessment data.

Turning first to the contribution identification module 3302, a participant's action may be identified as a contribution according to a web conference leader's (e.g., the instructor's) definition or according to some predefined criteria (e.g., implemented in a rubric). Various types of actions may be identified and recorded for assessment purposes including, by way of example and not limitation, a participant speaking during a class, a participant typing a comment during a class, a comment provided by a participant and publicly spotlighted by an instructor during a class, a participant's response to a poll or a quiz question during a class, a participant formally asking a question during a class, or any of the above actions in a group discussion. As mentioned above with respect to FIG. 20, high quality audio and/or video clips 2000 of each student's participation may be recorded locally on each client 130 and subsequently archived within a multimedia storage service 190. In addition, a participant's action may be recognized from the recorded audio and/or video clips 2000, as further described herein.

An event may be recorded when the contribution identification module 3302 identifies a participant's action as a contribution of interest to a web conference leader or assessor. In one embodiment, upon detecting an action of interest, a record is created to store the action. For instance, when a user U takes an action A at time T and the action A is recognized as a contribution, other participants may be notified that the action A taken by the user U and an entry may be created to record that user U took an action A at time T. The participants may be notified through the dynamic state synchronization service 120 (e.g., using a publish/subscribe mechanism described above) and a record of the event may be created and stored within an event log 3331 on a log server 3330 (e.g., on the virtual conferencing service 100 and/or on each of the individual clients).

In some embodiments, all actions by all participants are recorded and stored by the contribution identification module 3302 according to a reference time point. That is, all events are recorded and logged including those that may not be of interest to a web conference leader. As such, an event type that was not initially perceived to be of interest when an event occurred may be retroactively incorporated if it is later determined to be of interest. For example, when a user U takes an action A at time T, a server may be notified by a message to publish this action A at time T. The other participants may be notified and a log entry may be created to record that the user U took the action A at the time T. The log entry is thus associated with a timestamp.

As mentioned, an event of interest may be recognized by the contribution identification module 3302 when a participant's action is detected and determined to meet a web conference leader's definition. For example, in the case of speaking contributions, a "push-to-talk" model or a "record-when-speaking" model as previously described may be used to detect a participant's contribution which is of interest to the conference leader. In the "push-to-talk" model, a participant activates a microphone and features his or her video by a trigger action (e.g., holds a specific key on a keyboard, toggle a button) Such a "push-to-talk" model may generate a time-stamped "spoken-contribution-started" event. Audio may be recorded from the student's microphone when the triggering action is detected (e.g., a key is pressed). Recording of audio may be stopped or terminated when another triggering action is detected (e.g., a key is released) and a "spoken-contribution-ended" event is generated. The recorded audio may be uploaded and archived on a server (e.g., on the multimedia storage service 190) along with the starting event and the concluding event. As such, records of when a participant starts and finishes speaking and an audio clip of his or her contribution may be created. The duration of the participant's spoken contribution may also be determined and recorded. In the "record-when-speaking" model, a participant's audio input is monitored for sound that is likely to be recognized as human speech (e.g., volumes above a threshold).

In one embodiment, a speech recognition module or application translates each participant's verbal contribution into text—either during the conference or as a post-processing operation following the conference. The speak recognition operations may be performed on recorded speech at the multimedia storage service 190 (e.g., after all captured audio clips have been uploaded) or on each individual client 130 (e.g., directly from the captured audio clips 2000). In this embodiment, the text may be stored and associated with the speaking event which was used to generate the text (e.g., using the same set of timestamps).

Figure 34:
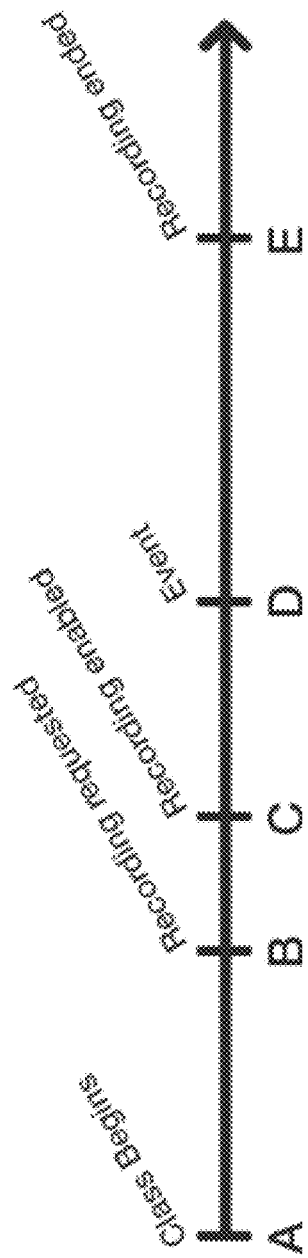
FIG. 34 illustrates an example event timeline chart.

Records may be created to log each event within the event log 3331, for example, "spoken-contribution-started" or "spoken-contribution-ended" events may be recognized and recorded each time the threshold (e.g., −50 dB) is crossed and/or each time the user holds down the "push to talk" button. Every identified event is associated with reference time points in the audio/video recording, of which one reference time point indicates the starting point of the identified event and the other reference time point indicates the completion point of the identified event. In one embodiment, a reference event is created immediately before the recording such that the time point to which the reference event corresponds is used as an offset to determine the reference time points for an identified event. For example, as illustrated in FIG. 34, when a class starts, event logging begins at time A (e.g., record start time). The instructor requests audio/video recording at time B, and the recording is enabled at time C. When an event is logged at time D, the log of the event is synchronized within the event log 3331 with the video recording of the event by associating it with timestamp "TS=(D−C)" in the recorded audio/video.

In one embodiment, the contribution classification module 204 classifies contributions made by participants according to one or more predefined evaluation rubrics or evaluation rubrics defined by a conference leader. A conference leader may be able to specify an outcome and a rubric for evaluating each contribution making contribution classification efficient and accurate. One embodiment of the contribution classification module 204 allows a user to non-linearly navigate a tethered video timeline and event stream. In addition, the user may flexibly filter events to separate events that are contributions from those that are not contributions in the event log 3331. A user may select one or more learning outcomes of events from a larger set of outcomes. An outcome may be an objective to be achieved in a web conference session. A participant's contributions may be classified based on the types of the contributions (e.g., speaking, typing, writing, drawing, outlining, etc.). Each contribution may be associated with a set of contribution attributes such as the type, the timestamp, the duration, and/or the content, etc.

Figure 35A:
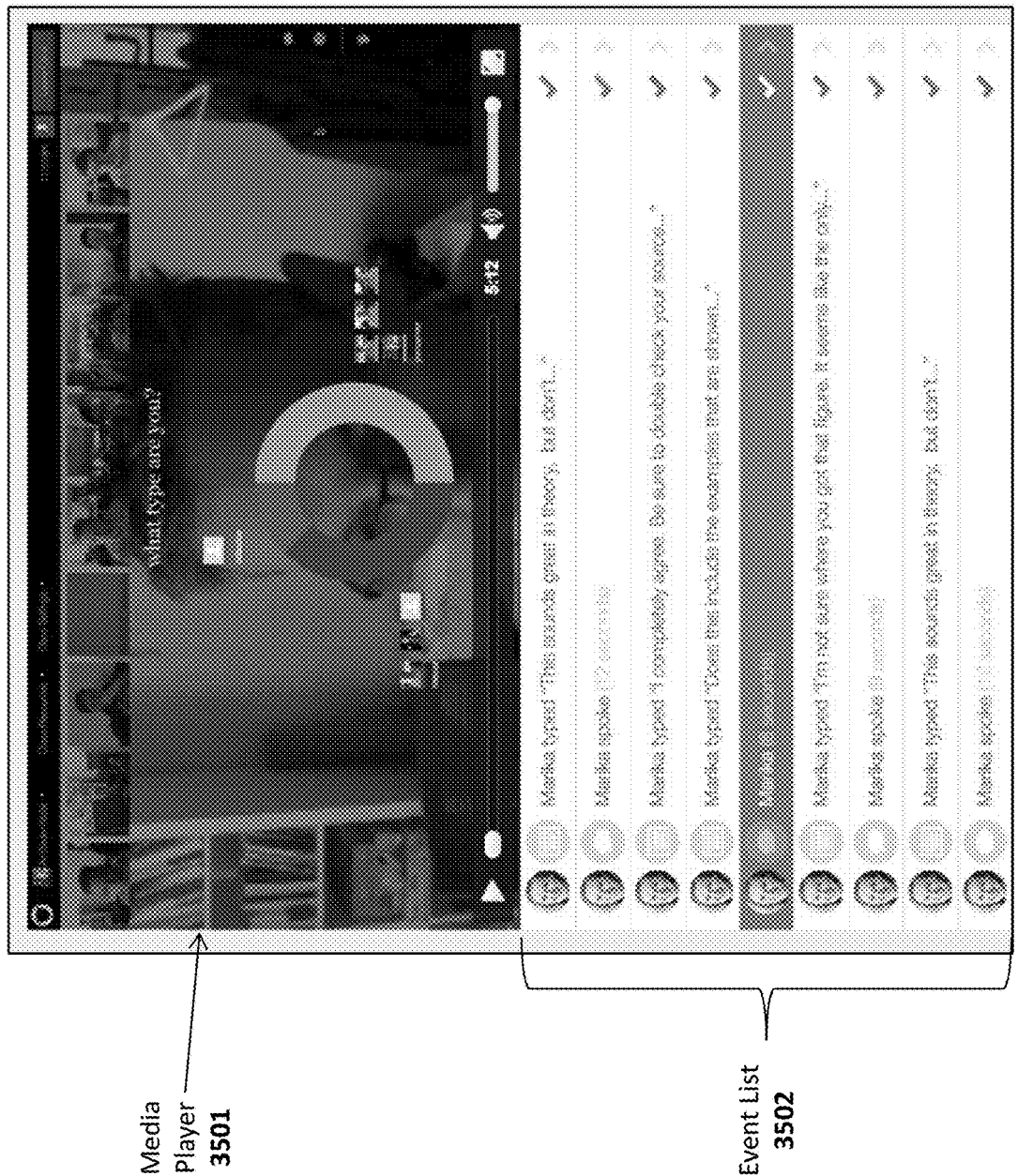
FIG. 35A illustrates an example event list.

A non-linear navigation that employs at least two mechanisms to navigate a video recording may be provided. FIG. 35A illustrates an exemplary user interface which includes a media player component 3501 for displaying video and rendering audio of a recorded video conference and an event list 3502 for selected portions of the recorded virtual conference. As illustrated in FIG. 35A, a video may be played, paused, and searched using a video controller (or associated keyboard shortcuts) in the media player 3501. In addition, one or more events may be selected from an event list 3502, via a user interface controller (e.g., by clicking or tapping on an event in the list 3502 or triggering via a keyboard shortcut). In one embodiment, each item in the event list 3502 is an event associated with an event type, event description, event timestamp, event creator/actor, and/or event type-specific metadata and details. In one embodiment, when a video is navigated using one of the navigation mechanisms (e.g., moving the navigation bar within the user interface of the media player), a corresponding event within the event list may be automatically highlighted. For example, when playback is dragged to a new point in the video, the event with timestamp before that time point or the closest to that time point is selected. While playing a video, when the playback passes over the timestamp of an event, that event is visually highlighted in the event list 3502 (e.g., changed to be distinguishable from the other events). When an event is selected from the event list 3502 via a triggering action, the video playback jumps to the time corresponding to the timestamp of the selected event. While the media player 3501 is displayed above the event list 3502 in the illustrated example, the media player 3501 and the event list 3502 may be positioned in other configurations (e.g., side by side).

In one embodiment, each event within the event list 3502 may be displayed in accordance with the type of event. In the example shown in FIG. 35A, different events are identified using different icons (e.g., speaking events include a speaking bubble icon, typing events include a keyboard icon, etc). In addition, color coding may be used to indicate whether an event in the list is a speaking event, typing event, bookmarked moment, etc. The color coding may be set to the left, right or across the entire event within the event list 3502. Of course, different events may be identified in various different ways while still complying with the underlying principles of the invention.

In addition, events within the event list may be filtered by participant, event type and/or event content. Examples of filtering GUI functions are illustrated in FIGS. 35B and 36 and described in greater detail below.

Figure 35B:
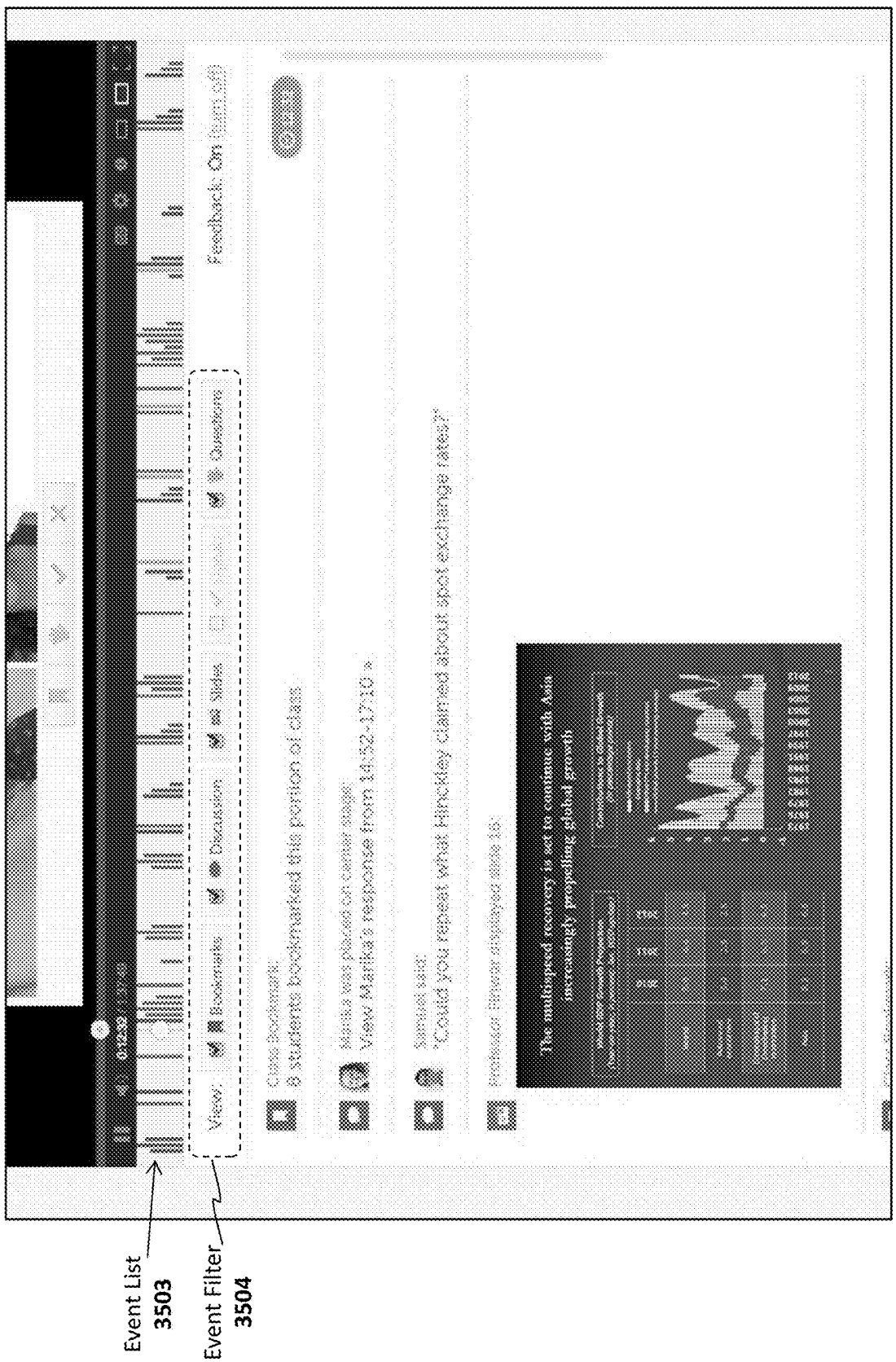
FIG. 35B illustrates an example event list.

FIG. 35B illustrates another embodiment of an event list 3503 which visibly includes event details with formatting that varies by event type. For example, the bars shown in FIG. 35B each have a different color corresponding to a different event type (including bookmarked events, discussion events, slides, and questions). A user may configure the display of certain event types via the user interface control 3504 which includes selection elements (e.g., selectable check boxes) allowing the user to apply a set of filters in accordance with the selected elements. For example, if the user were only interested in discussion events (e.g., speaking events), then the user would place a check only in the discussion selection element.

Figure 36:
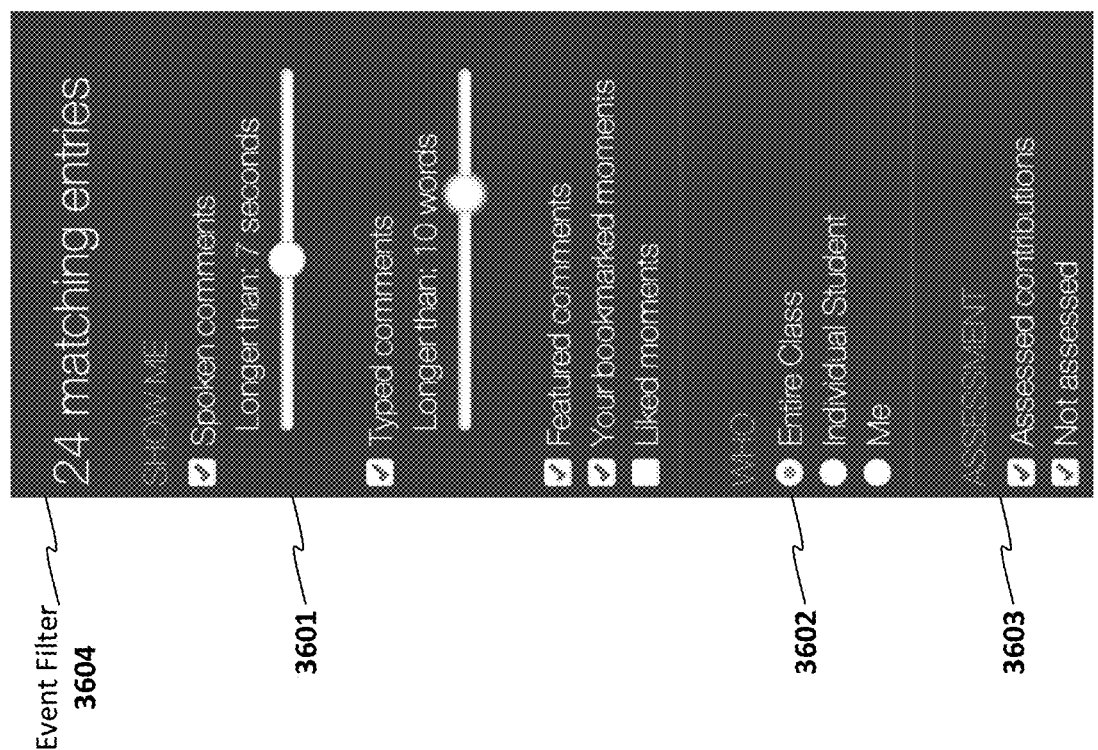
FIG. 36 illustrates an example event filter control.

FIG. 36 illustrates another example event filter control 3604 through which a user may control and select a subset of events associated with a virtual conference. The illustrated event filter control 3604 includes a first section 3601 in which the user may specify the types of events to be displayed which includes spoken comments, typed comments, featured comments, bookmarked moments, and liked moments. Some of the event types are configurable for further fileting. For example, the user may select spoken comments above a user-configurable duration (e.g., 7 seconds in the example) and may select typed comments above a certain length (e.g., 10 words in the example). The second section in the event filter control 3602 allows the user to filter based on the identity of one or more students. Here, using radio buttons, the user may select the entire class, an individual student, or the user herself. A third section 3603 allows the user to choose between assessed contributions (e.g., those for which feedback has been provided), unassessed contributions, or both.

As mentioned, when users take actions that are recognized as contributions, events are automatically generated and stored within the event log 3331. In one embodiment, metadata related to those actions is also associated and stored with the events. For example, an event may be associated and stored with metadata defining an event type (e.g. spoken comment, typed comment, bookmarked moment), a type-specific event duration (e.g. number of words in written comment, number of seconds in spoken comment), an event actor (i.e. which person took the action resulting in the event entry), and/or the number of assessments of the event. In this embodiment, the event filter control 3602 provides the user with options to use the metadata as a basis for filtering or sorting events. Different categories of filters may be provided to select events to be displayed. Upon selection by the user, the event list displays events that match the conditions defined by the filters. If an event does not match conditions specified by one or more of the filters, the event is not displayed.

Event filters may include an event type filter, a type-specific filter, an event actor filter, or an event assessment filter. Examples of the event type filter and type-specific filter are illustrated in section 3601 of the event filter 3604; examples of an event actor filter are illustrated in section 3602, and examples of an event assessment filter are shown in section 3603. By way of example, an event type filter may include spoken contributions, typed contributions, instructor-featured contributions, or bookmarked moments. A type-specific filter may include the minimum duration (e.g., time duration, word counts) of a participant's contribution (e.g., spoken contributions, typed contributions). An event actor filter allows a user to select events made by everyone, by a specified/named participant, or by the viewing/current participant. An event assessment filter allows a user to select events that have been assessed or have not yet been assessed. An event list 3502, 3504 may be updated in real time when a filter is enabled, disabled, or modified. An indicator of the number of events included in a list may also be displayed.

Figure 37B:
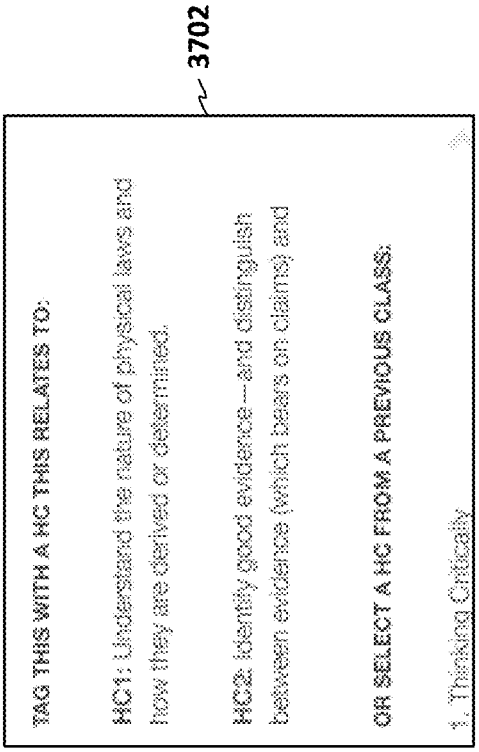
FIG. 37B illustrates an example user interface for selecting a learning outcome.
Figure 37A:
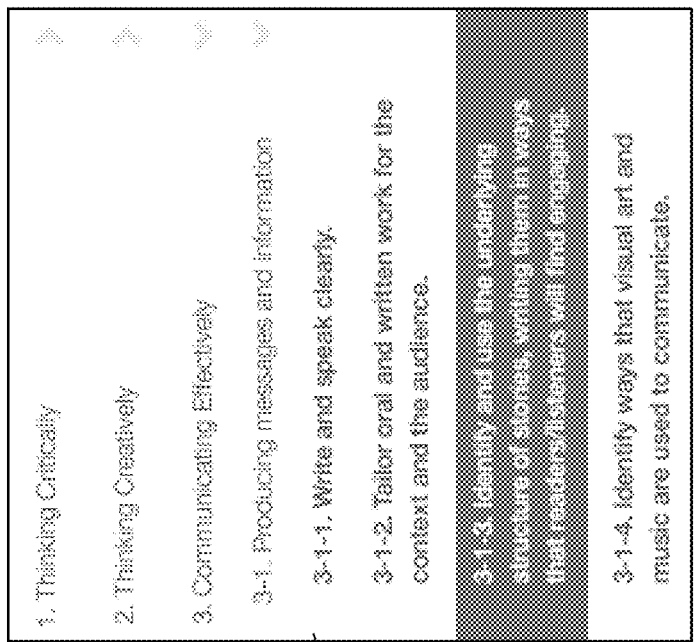
FIG. 37A illustrates an example user interface for selecting a learning outcome.

FIG. 37A illustrates an example user interface 3701 for selecting a learning outcome. A web conference leader may select a learning outcome to associate with an event thereby choosing the most efficient path for their particular situation. Leaning outcomes may be organized hierarchically. A user may select a learning outcome by clicking a mouse or trackpad, tapping on a touch-screen input, or typing a keyboard shortcut or by making a series of actions. For example, an instructor may select a learning outcome from a domain of 125 learning outcomes by making a series of three 5-option selections.

FIG. 37B illustrates a user interface 3702 including a learning outcome at the bottom of an organizational hierarchy which may be "pinned" in advance of the web conference for quick access. For class discussions that are focused primarily on a small number of learning outcomes, providing fast shortcuts to these outcomes can avoid repeating the same multi-step selection process many times for a single assessment session.

Figure 37C:
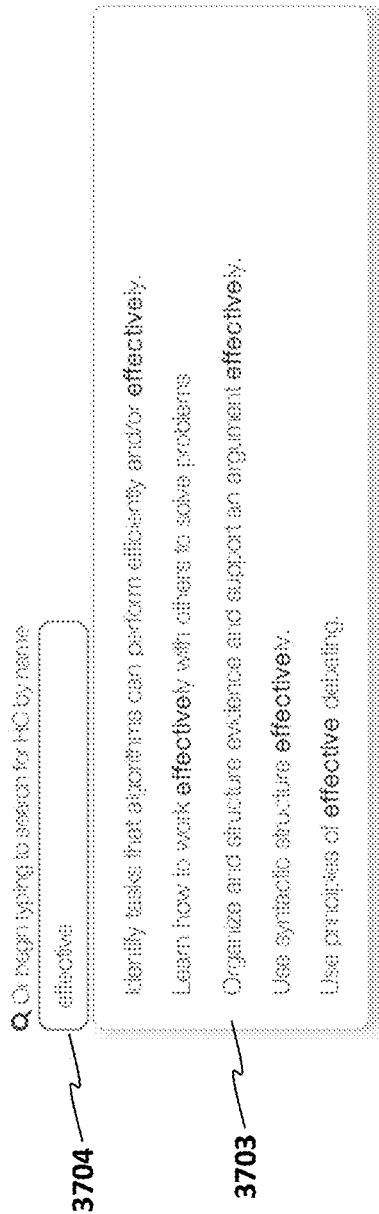
FIG. 37C illustrates an example user interface for selecting a learning outcome.

FIG. 37C illustrates an example user interface 3703 in which a search field 3704 with an auto-complete feature helps a web conference leader find learning outcomes based on a keyword, which can efficiently facilitate selection via the hierarchical structure. When an instructor types in the text field, only items that match with the words typed are displayed. As such, the instructor may locate the appropriate outcome more easily.

Figure 38:
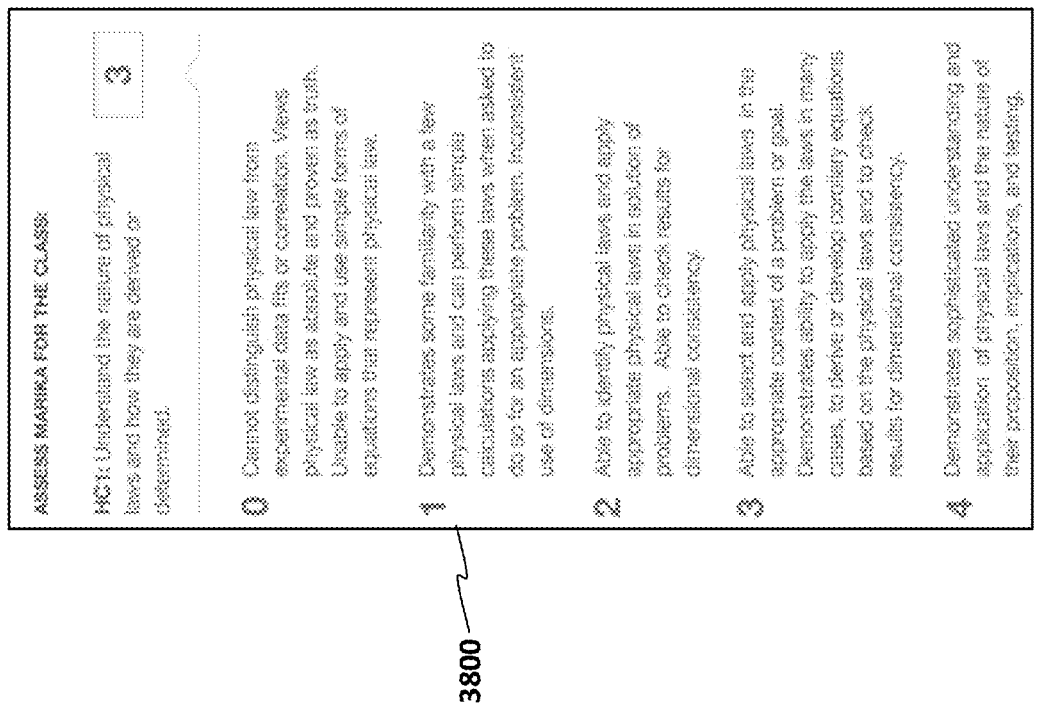
FIG. 38 illustrates an example evaluation rubric.

FIG. 38 illustrates an evaluation rubric 3800 from which a student's evaluated contributions may be selected. In one embodiment, the contribution assessment module provides these options to the instructor and compiles the instructor's selections. After the identified events are classified according to learning outcomes, each student may be assessed with respect to the learning outcomes. The instructor may iterate over the list of students and view filtered sets of contributions made by each student labeled with each relevant learning outcome. The instructor may then evaluate the student's contributions and provide a feedback based on the student's contribution and the objective (e.g., a learning outcome).

Figure 39:
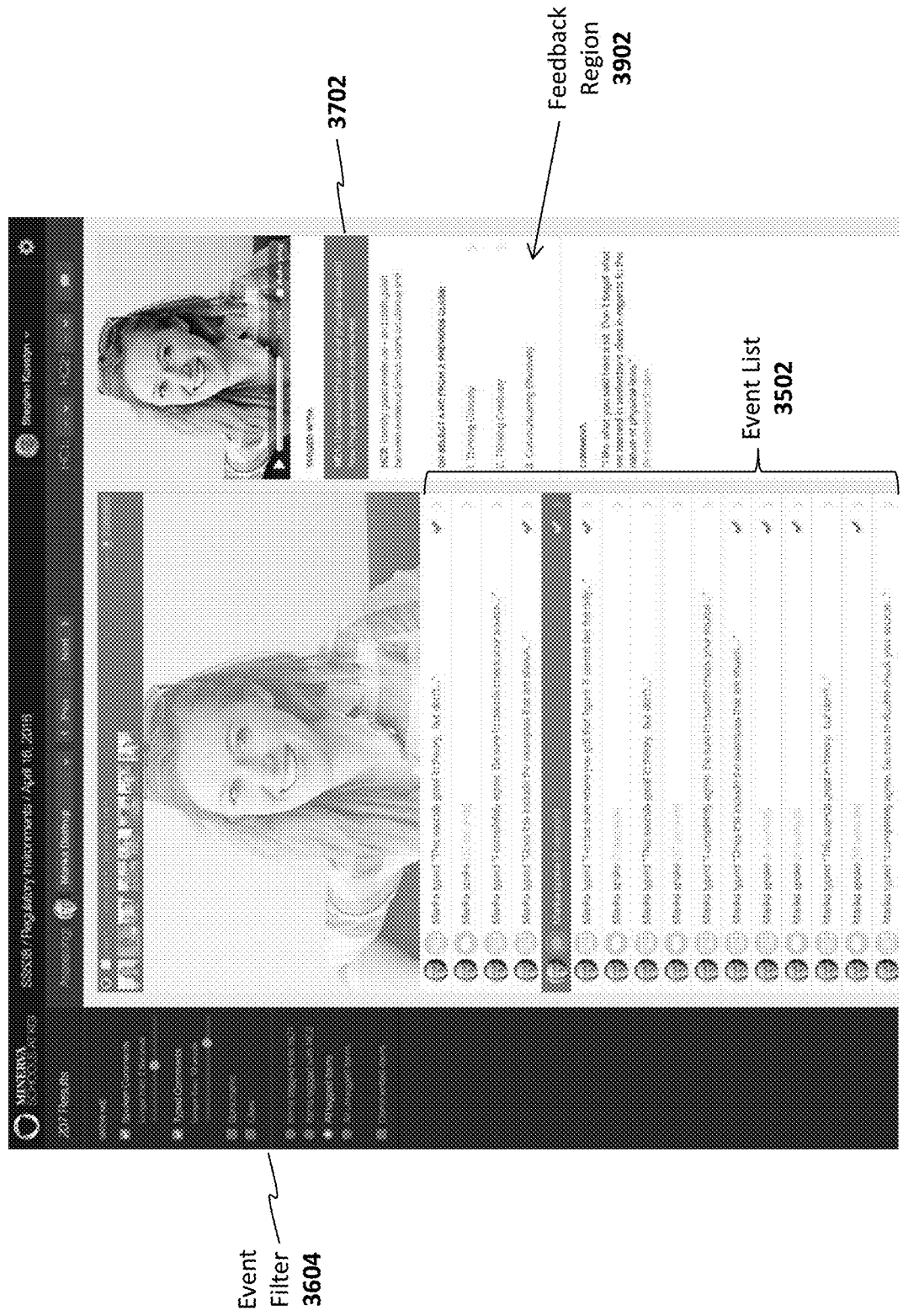
FIG. 39 illustrates an example user interface for evaluating a participant's contribution.
Figure 40:
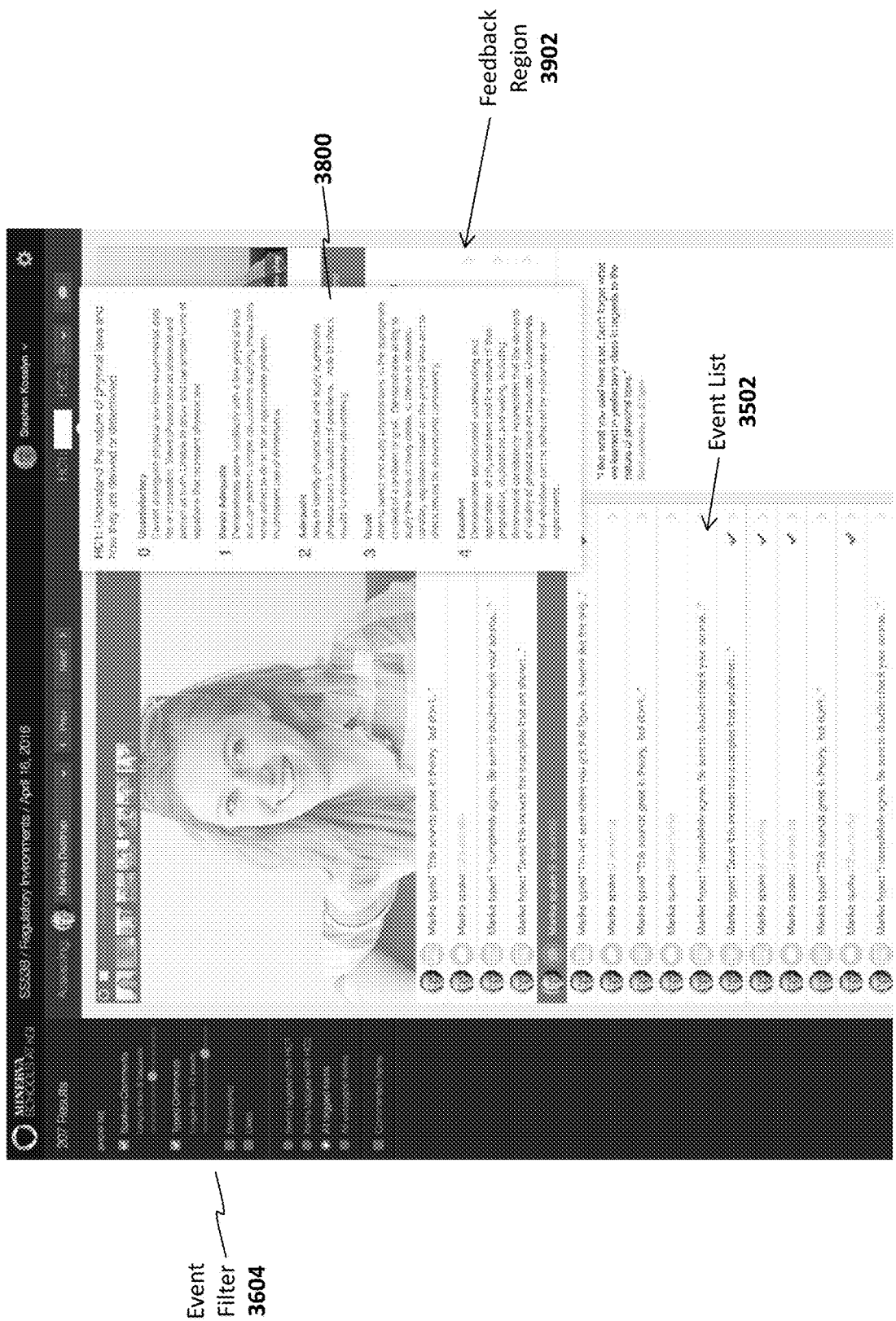
FIG. 40 illustrates an example user interface for evaluating a participant's contribution.
Figure 41:
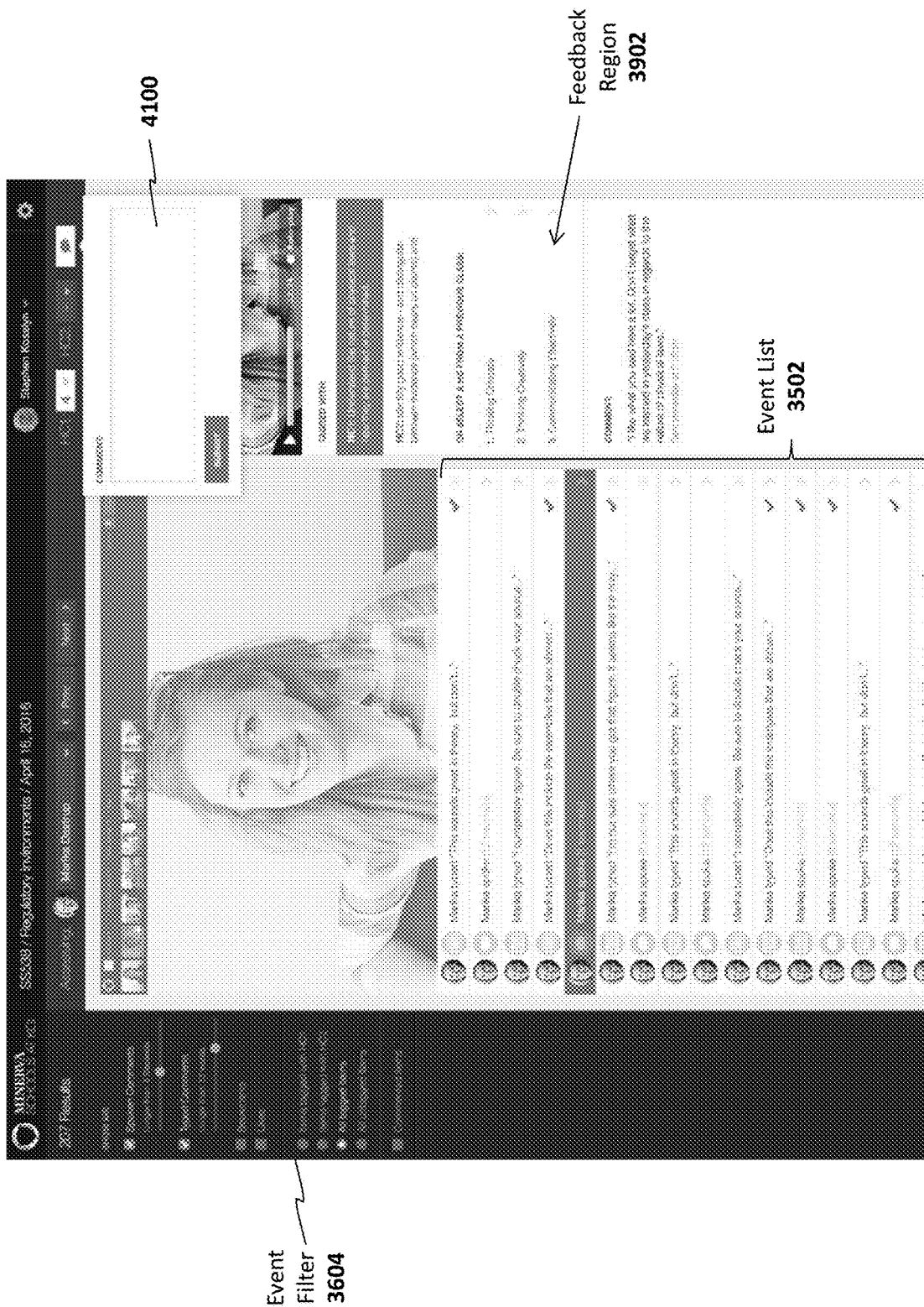
FIG. 41 illustrates an example user interface for evaluating a participant's contribution.

FIGS. 39-41 illustrate example user interfaces for evaluating and providing feedback on a participant's contribution. This embodiment includes the event filter 3604 for filtering events within an event list 3502 as described above, and also includes a feedback region 3902 for performing an evaluation and providing feedback. As illustrated, the right pane of the user interface may be used to provide feedback via the various user interface components 3701-3704, 3800 described above for selecting learning outcomes and evaluation content. For example, in FIG. 39, an instructor may review a participant's contributions by selecting a contribution from the filtered event list 3502 and providing feedback on that contribution from user interface component 3702 within feedback region 3902. As illustrated in FIG. 40, the instructor may also review and provide input via an evaluation rubric 3800 which provides a guidelines for evaluating a contribution (e.g., providing a ranking from 0-4).

Subsequently as illustrated in FIG. 41, the instructor may provide specific comments to a participant related to an event via a comment entry window 4100. The evaluation result may then be further appended with the additional comments from the instructor. The evaluation result may be submitted to a classroom grade book and the student may be immediately notified of the feedback upon logging in to the virtual conferencing service 100. In various embodiments, in a period of time specified by an instructor, a summary of a participant's contributions may be provided. For example, data analytics such as the frequency of the participant's contributions, evaluations of each of the participant's contributions, or a comparison of a participant to other participants in a session may be provided. Feedback may then be provided based on the participant's contributions and data analytics.

Figure 42:
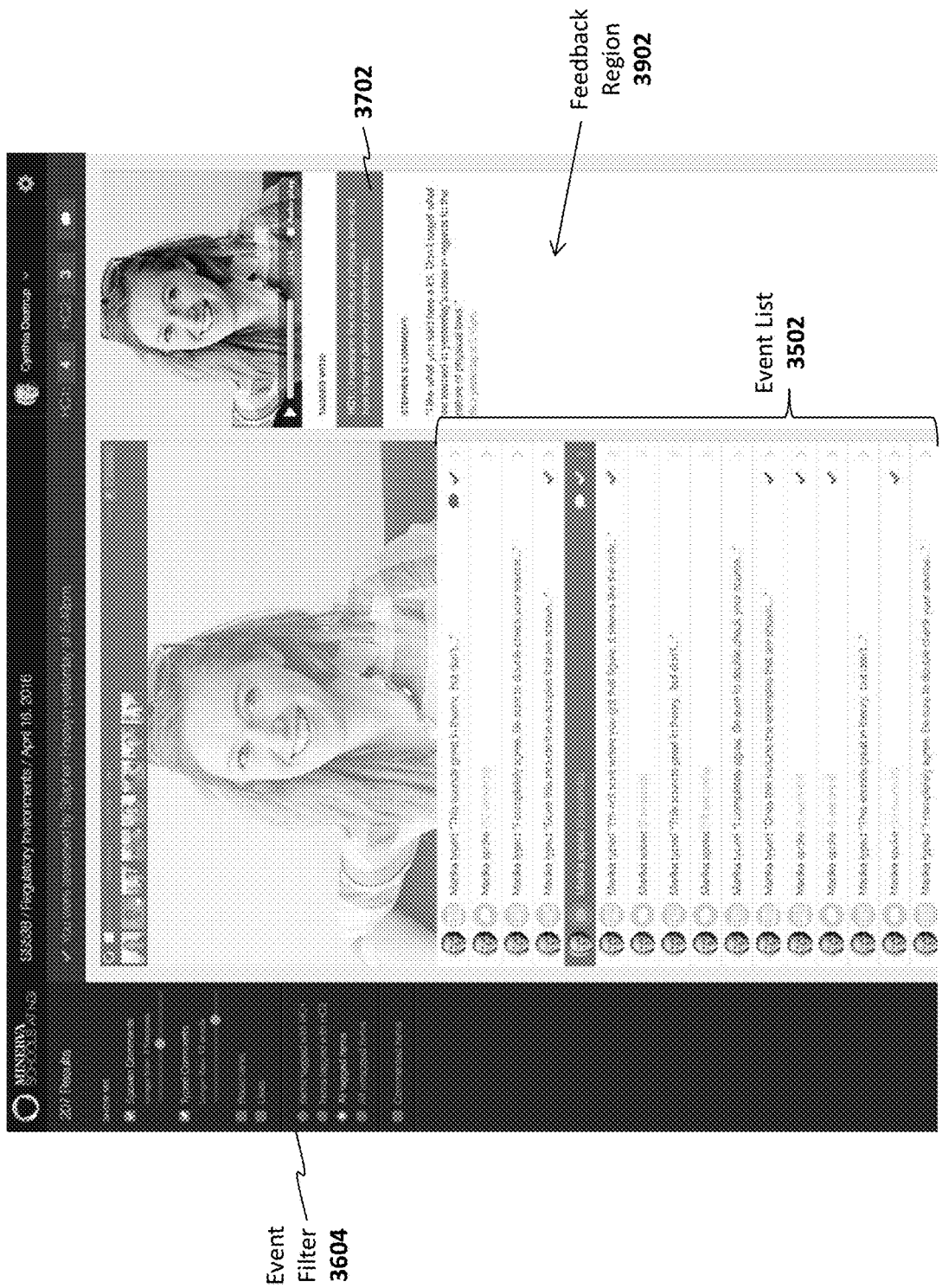
FIG. 42 illustrates an example user interface for a participant to review evaluations.
Figure 43:
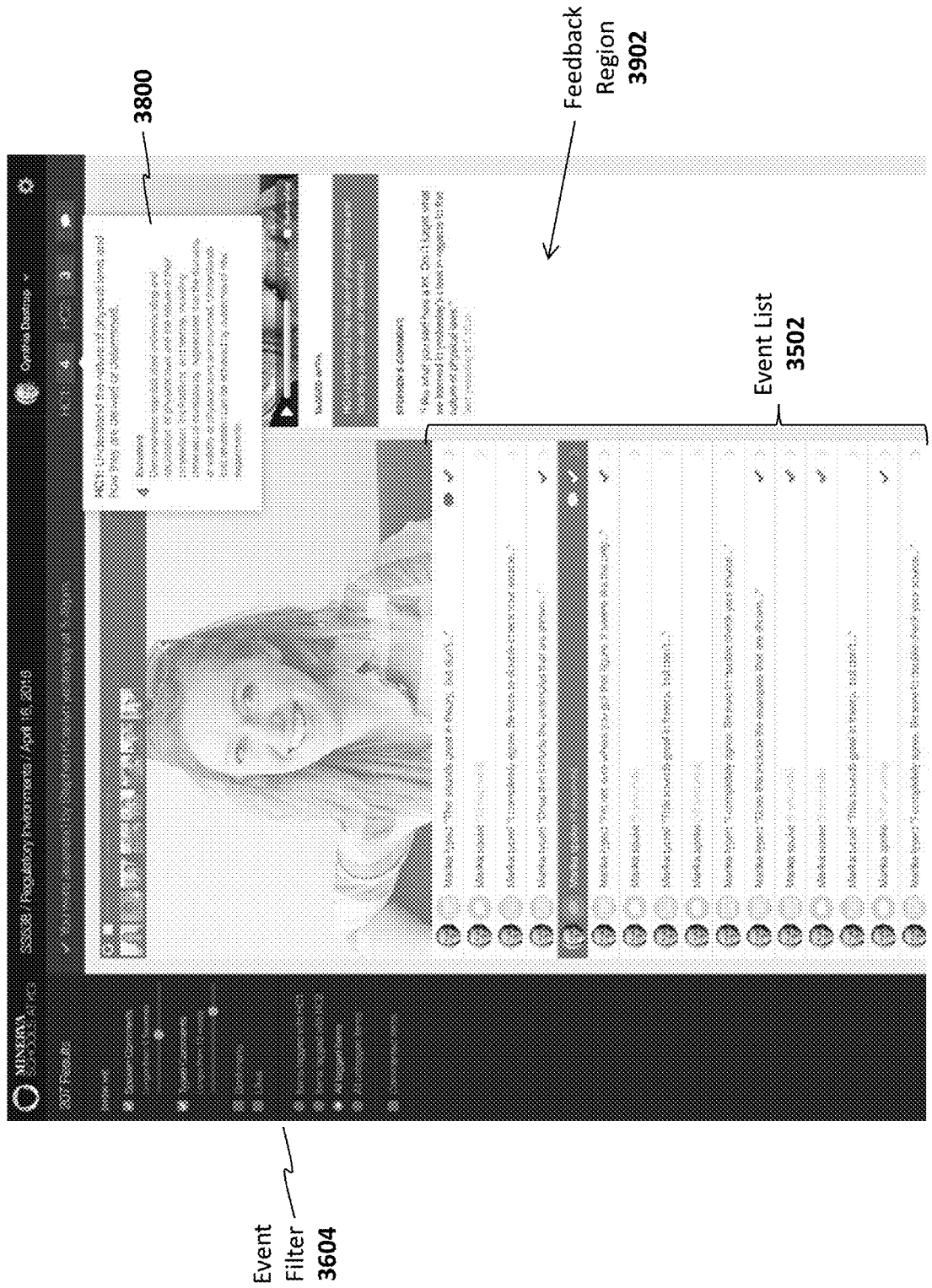
FIG. 43 illustrates an example user interface for a participant to review evaluations.

FIGS. 42-43 illustrate example user interfaces for a participant to review evaluations submitted by an instructor. As illustrated, a participant may review evaluations and/or additional comments by selecting a contribution event from the event list 3502. Evaluations and additional feedback from an instructor may be displayed to the participant.

Some embodiments of the invention provide peer assessment among web conference participants to facilitate peer evaluations. The same or similar techniques described herein may be employed for peer assessment. For example, peers may be provided with an event list 3502, media player 3501, and feedback region 3902 using the the same GUI features as described above. Thus, a web conference participant may be evaluated by both the web conference leader and other web conference participants. The goals may also be defined by both the web conference leader and web conference participants. A web conference participant's contributions may be identified and classified according to an outcome defined by the web conference leader and the other web conference participants. A web conference participant's contributions may be evaluated according to one or more evaluation rubrics and the objective. A participant may be evaluated in every session, in multiple sessions collectively, or over a period of time.

When no evaluation rubric is defined, contributions or events that are identified may be provided as appropriate attachment points to anchor open-ended discussions about specific contributions. The use cases vary based on permissions and visibility of comments on contributions. For example, if only a web conference leader can attach comments, only the web conference leader is provided with appropriate context to make comments. In some cases, both a web conference leader and web conference participants can comment and respond, but each web conference participant is only permitted to see comments made on his or her own contributions. A venue for asynchronous private discussions and free-form formative feedback is thus provided. In some other cases, both a web conference leader and web conference participants can comment and respond and all comments visible to everyone, and a public venue for continuing discussions after a web conference session ends is provided. If only web conference participants can comment on any entry but only the individual whose contribution is being commented on can see the comments, a structured note-taking space for the participant to annotate and reflect on the comments is provided. The comments may be made available for different purposes. For example, web conference participants and a web conference leader may be able to mark each comment as public, prof-student only, or entirely private.

Further learning opportunities are provided in addition to the goal of providing students with formative feedback on discussion participation. An event list may be filtered to include all events or contributions of a student during any class session in a course, with summary statistics quantifying the student's participation over the duration of the course. Summary statistics may include graphs and trend evaluation scores over time. An event list may be filtered to include events showing all contributions made by the student that are associated with one objective in any course during a semester, providing the student with a comprehensive view of their engagement with the objective. A student may review events showing all contributions associated with a particular learning outcome, made by the student who received the top score for the learning outcome in that class session. As such, the student may find examples of outstanding contributions for the particular learning outcome.

The disclosed configuration beneficially includes eliminating or reducing cognitive biases and the amount of cognitive effort involved in managing and providing feedback on web conferences. Various embodiments described herein may provide a web conference leader with evaluations and recommendations of web conference participants to facilitate the web conference leader's decision in engaging web conference participants in a session and providing feedback. Evaluations and recommendations of web conference participants may be based on an objective identified by a web conference leader. A criterion function may be defined to describe the relationship between the objective and a web conference instrument (e.g., a question). The criterion function includes one or more factors which may be configurable by the web conference leader. Web conference participants may be evaluated by using the criterion function and recommended based on the evaluations. Using the techniques described herein, a web conference leader may make a web conference session fairer and more efficient with little cognitive effort and preparation during, before, and after a web conference session. Web conference participants thereby may be afforded with equal amount of learning or speaking opportunities.

System and Method for Discussion Initiation and Management in a Virtual Conference Discussion between web conference participants can facilitate interactions among web conference participants and be used as a method for teaching or other purposes. However, during a discussion session, it is difficult to engage all the web conference participants. For example, participants who are not active participating (i.e., observers) may become disengaged and not actively contribute. Furthermore, recording participants' feedback may be challenging.

Figure 44:
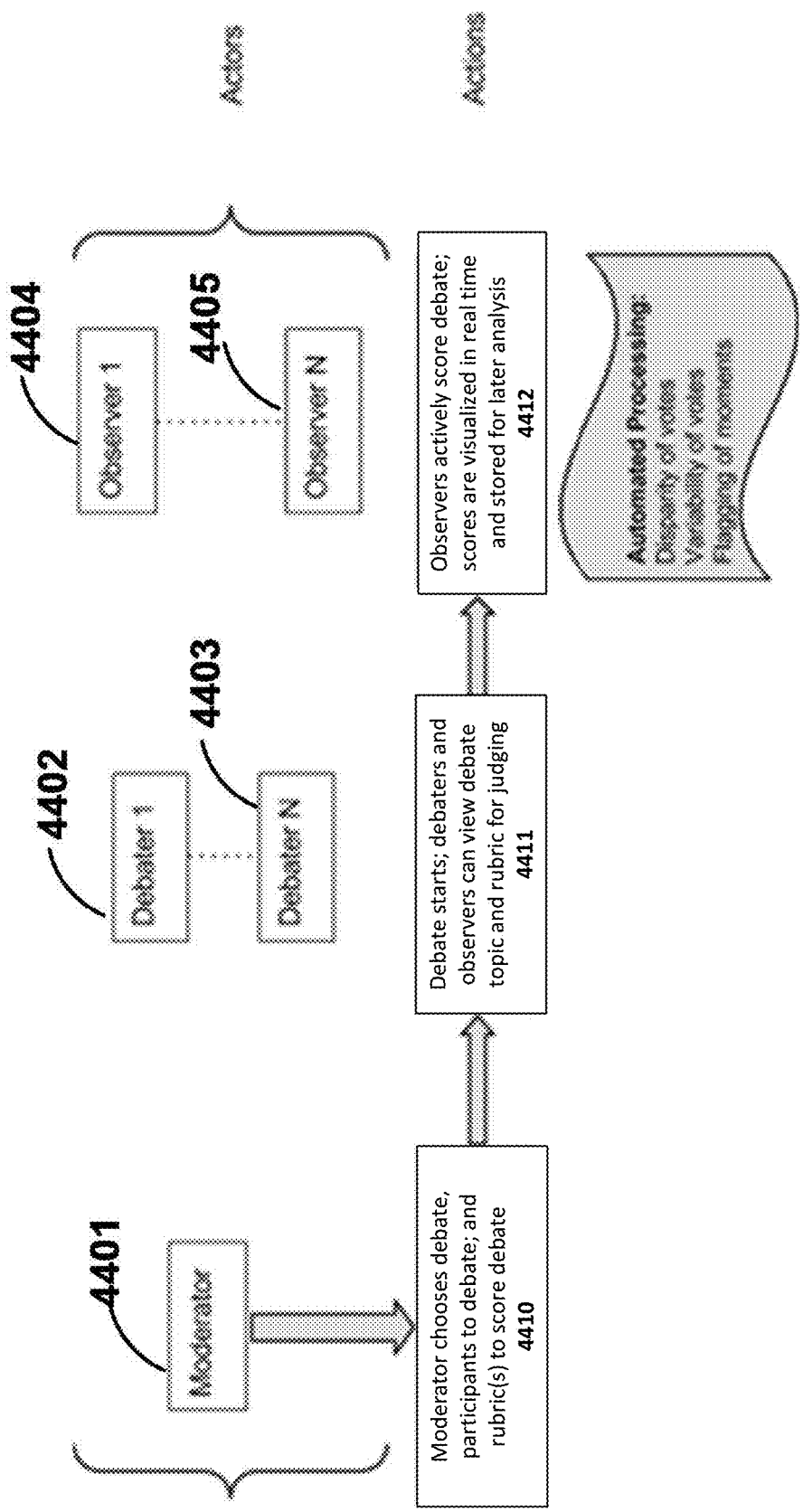
FIG. 44 illustrates a flow diagram of an example process of creating and maintaining a debate in web conferences.

Referring now to FIG. 44, it illustrates a flow diagram of an example process of creating and maintaining a debate in web conferences. The flow diagram corresponds to functional instructions, e.g., 2924, that may be stored on a computer readable storage medium, e.g., 2904 and/or 2922, and executable by a processor, e.g., 2902. A web conference moderator (e.g., an instructor in a virtual classroom) 4401 and all the participants of the web conference (e.g., debaters 1-N 4402-4403 and the observers 1-N 4404-4405) are engaged during the entire discussion period (e.g., logged in to a virtual conference). For example, the web conference moderator 4401 may initiate a discussion through their client and each participant may be engaged in the discussion through their own client computer system (e.g., 2900).

The web conference moderator 4401 may create a debate at 4410 by choosing two or more participants of a web conference to debate each other. In addition, at 4410, the web conference moderator 4401 may choose a debate topic and one or more rubrics from a database of stored rubrics which define a framework according to which a debater can be evaluated (e.g., defining the basis for evaluation of the debaters). The debate topic and the rubrics selected by the moderator 4401 may be made available to the debaters 4402-4403 and/or observers 4404-4405. The observers 4404-4405 (i.e., the participants who are not chosen to be debaters) may actively evaluate each debate and their evaluations may be made visible in real-time. Further analysis (e.g., disparity, variability) of the evaluations may be provided in real-time. In addition, during a discussion session, the moderator 4401 or any web conference participant may create a bookmark to mark a point in a debate or other discussion which may then be revisited by selecting the bookmark (e.g., via the event list described above).

As the debate is initiated at 4411, the debaters and observers are provided with the ability to view the debate topic and related parameters (e.g., the rubric for evaluating the debate) and, at 4412, the observers may actively score the debate in accordance with the debate topic and rubric. in one embodiment, the scores submitted by observers are collected from the observers in real time and may be visualized during the debate and/or stored for later analysis.

Figure 45:
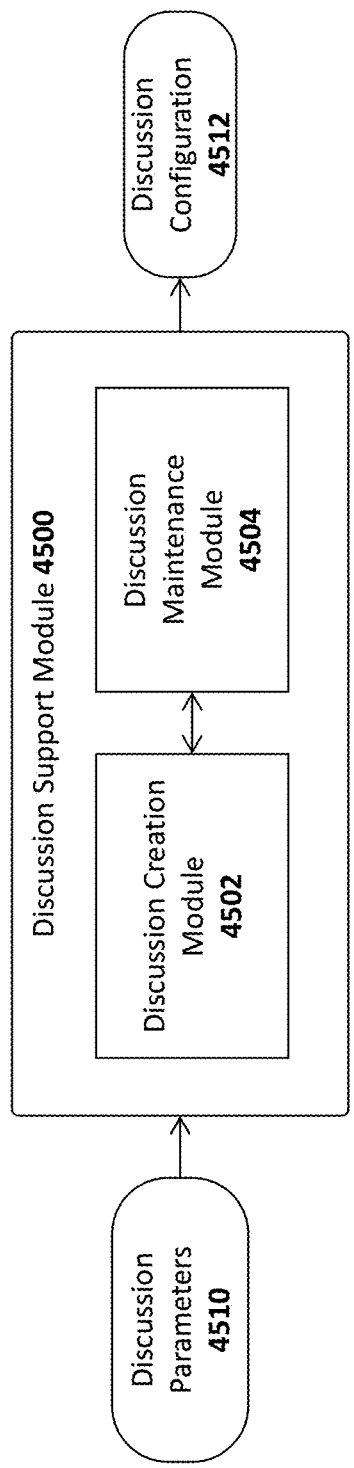
FIG. 45 illustrates an example discussion support module configured to support discussion in web conferences.

FIG. 45 illustrates an example discussion support module 4500 to support discussions in web conferences by generating a discussion configuration 4512 comprising the data structures and GUI features required to implement the discussion in response to a set of discussion parameters 4510 specified by the virtual conferencing moderator (e.g., number of debaters, rubrics for evaluation, debate topics, etc.). The discussion support module 4500 can be embodied as program code (or software instructions, e.g., 2924) that can be read into the memory 2904 and executed by the processor 2902 of the computer system 2900 illustrated in FIG. 29. The computer system on which the discussion support module 4500 is implemented may be a server on the virtual conferencing service 100 or one of more client computer systems of participants or moderators. In one embodiment, the discussion support module 4500 comprises program code reflected in the current state 135, 145, 155, 165 managed on each client 130, 140, 150, 160 using the state synchronization service 120 discussed above (e.g., which, in one embodiment, utilizes a publish/subscribe mechanism to maintain a consistent state on each client). However, the underlying principles of the invention are not limited to any particular location or mechanism within the virtual conferencing system for implementing the discussion support module 4500.

The illustrated discussion support module 4500 comprises a discussion creation module 4502 and a discussion maintenance module 4504. The discussion creation module 4502 creates a discussion involving a group of participants in a web conference session using the specified set of discussion parameters 4510. The discussion maintenance module 4504 maintains and updates the necessary data structures and GUI features among all participants including those do not actively participate in the discussion in a web conference session. In addition, in one embodiment, the discussion maintenance module 4504 compiles feedback from the virtual conferencing participants and/or the moderator during and/or after the discussion (e.g., such as voting results on a debate as described below).

In one embodiment, the discussion creation module 4502 allows a web conference leader to create a discussion in a web conference session by specifying a set of discussion parameters 4510. Various different discussion parameters may be specified by the moderator to create a discussion including, by way of example, and not limitation, the discussion topic, the number of participants involved in the discussion, the discussion participants, the position that each side of the discussion will take, and evaluation criterion according to which a discussion participant may be evaluated. A discussion may involve a set of participants against another set of participants, where a set of participants comprises one or more participants. The evaluation criteria may include an evaluation rubric which may be made available to the discussion participants including the debaters 4402-4403 and the observers 4404-4405. The evaluation rubric may be determined by the web conference moderator 4401 based on an objective. For example, in the class format of a web-meeting, an evaluation rubric may be aligned with a learning outcome for the class. In a business context, an evaluation rubric may be aligned to the criteria used to make a decision (e.g., a weighted decision matrix).

In one embodiment, the discussion support module 4500 may be used in combination with the timeline GUI and associated functions 2105 described above to initiate a debate. For example, a segment in the timeline GUI may specify when the debate should occur and the various parameters 4510 to be associated with the debate. in such a case, the instructor (or other moderator) may initiate the debate by simply selecting the graphical debate segment within the timeline 2105. In addition, the decision support module 3000 described above may be used to identify the set of debaters 4402-4403 to participate in the debate. For example, upon initiation of the debate (e.g., from the timeline or otherwise), the decision support module 3000 may identify those students who would most benefit from participation in the debate based on the criteria and student data 3110 as described above (e.g., such as how recently each student has contributed to the topic or in a prior debate), and provide the list of students as parameters 4510 to the discussion support module 4500. Using these techniques, the moderator may initiate the debate fairly and efficiently with little cognitive effort.

Figure 46:
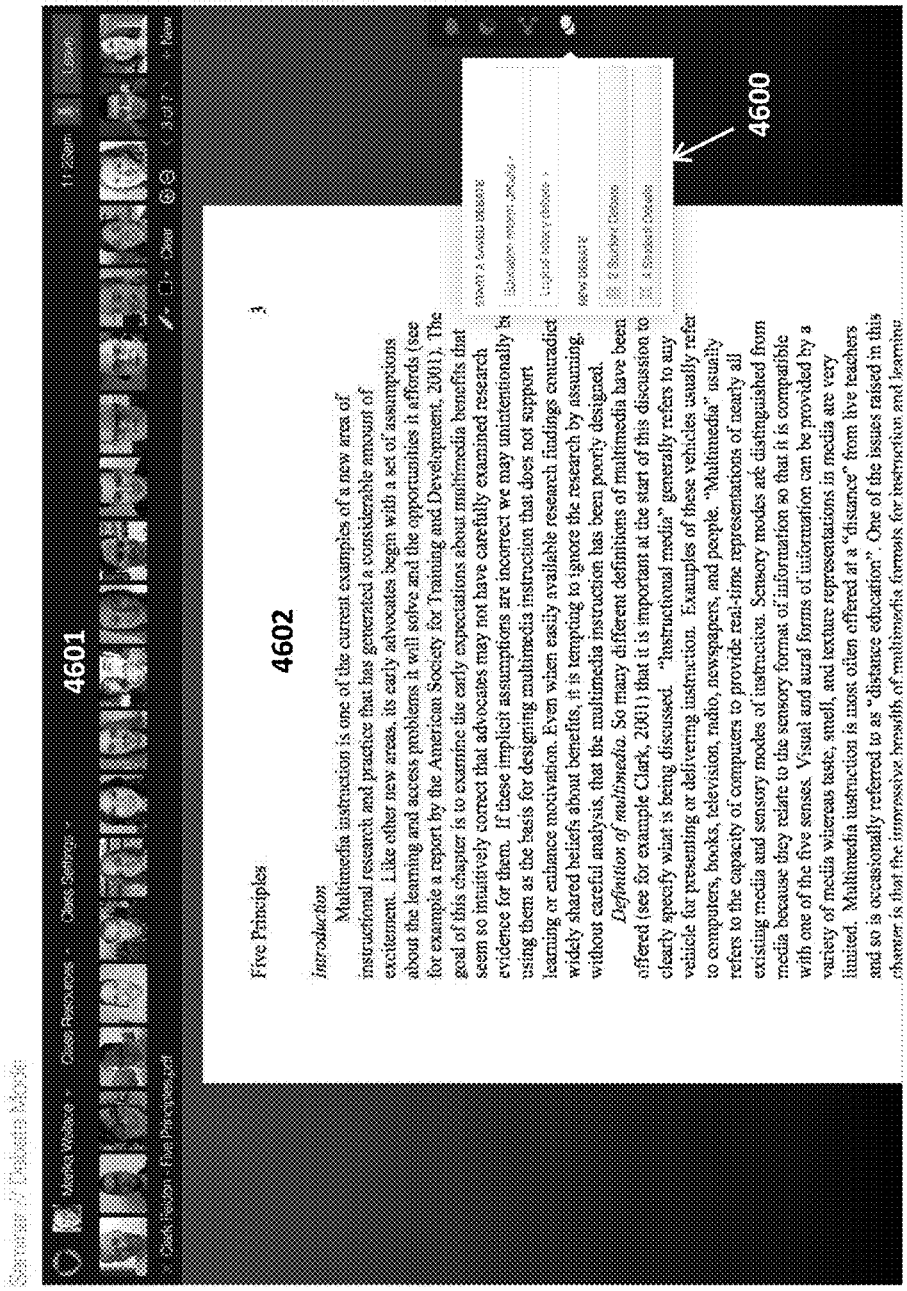
FIG. 46 illustrates an example user interface for creating a discussion.

FIG. 46 illustrates an example user interface which may be utilized by an instructor or other moderator to initiate a debate. The illustrated user interface includes a pop-up menu 4600 allowing the instructor to select from among a set of saved debates or to initiate a new debate. The user interface presents, in this example view, all the web conference participants as thumbnail images 4601 across a top of the user interface. A web conference leader may select two or more participants to participate in the debate by selecting the thumbnail images 4601 corresponding to the participants. The example user interface also illustrates in this view a page 4602 from a book that may form the topic that the selected participants will discuss, for example, in the form of a debate. The pop-up menu 3800 on the right in the example view controls the parameters of the debate and allows for the capture of data from the debate that corresponds to a rubric to be used.

Figure 47:
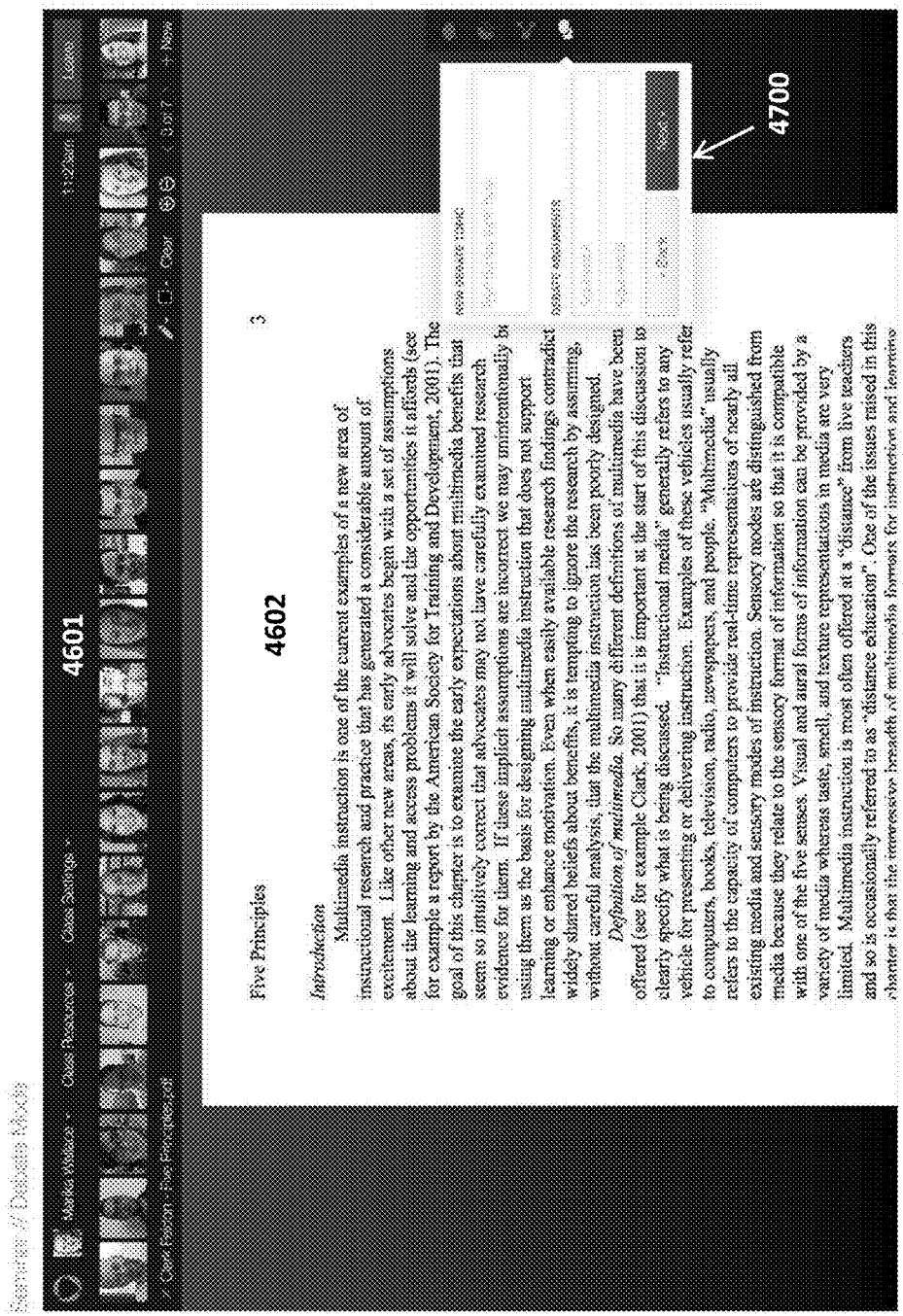
FIG. 47 illustrates an example user interface for creating a discussion.

FIG. 47 illustrates additional features of the example user interface for creating a discussion. In one embodiment, the new pop-up window 4700 may be automatically generated in response to the instructor or other moderator selecting a new debate from pop-up window 4600. In particular, the illustrated pop-up window 4700 includes data fields in which the instructor or other moderator may enter a new debate topic and a set of debate arguments (e.g., one or more positions that a discussion participant may take). The discussion topic and the discussion position may be related to an objective specified by the web conference leader.

Figure 48:
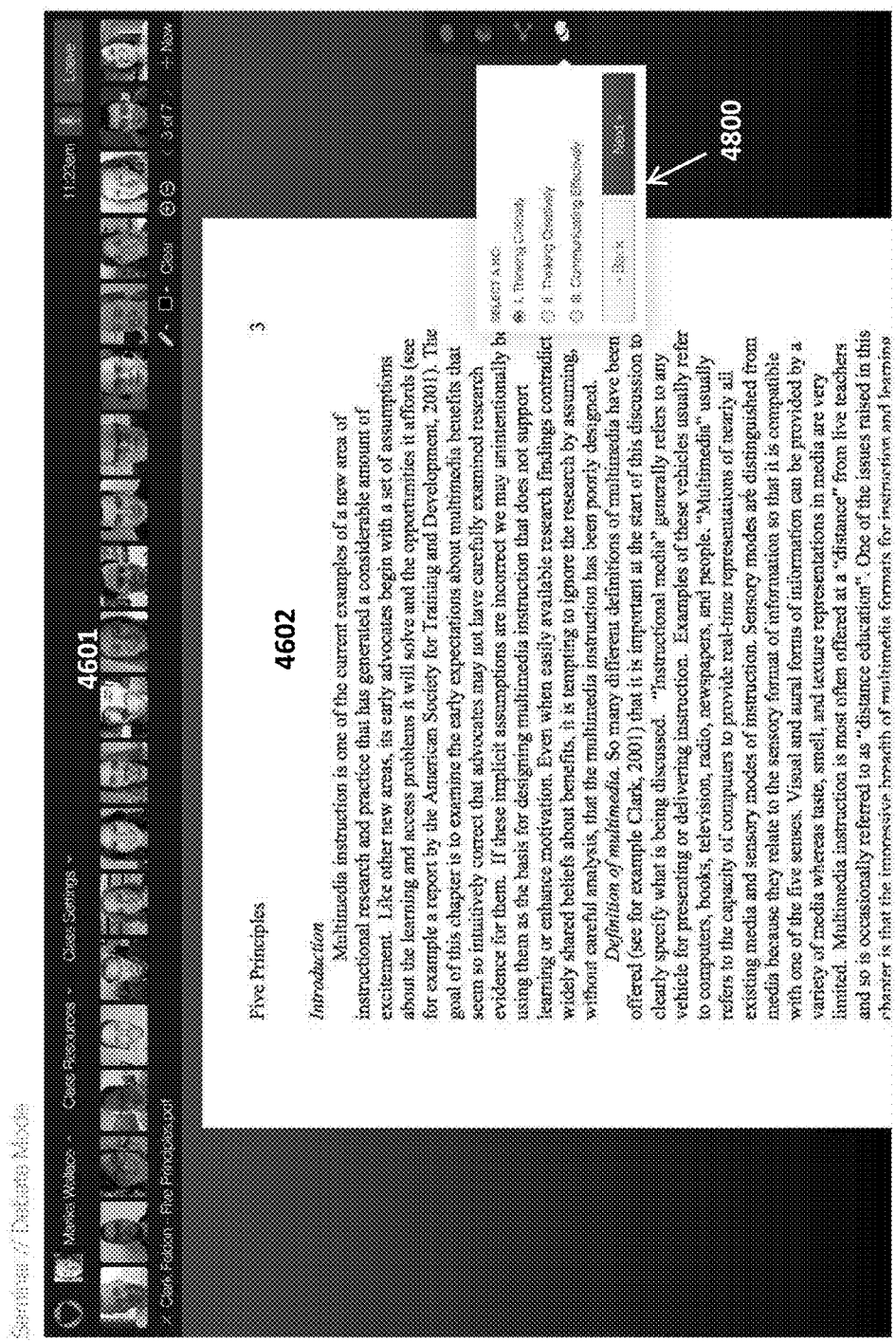
FIG. 48 illustrates an example user interface for creating a discussion.

FIG. 48 illustrates a new pop-up window 4800 which may be generated in response to the instructor entering data and selecting the "Next" button from the pop-up window 4700 in FIG. 47. A web conference leader may specify criteria for evaluating a discussion participant which is defined according to the web conference leader's objective. As such, evaluation of discussion participants is fair and uniform. In the example shown in FIG. 48, the selection options include (I) thinking critically, (II) thinking creatively, and (III) communicating effectively. An evaluation criterion may include an evaluation rubric. An example evaluation rubric is illustrated in Table 1 below.

TABLE 1

| 0- No Data | 1- Unsatisfactory: Student's work shows no comprehension of the Habits of Mind and Foundational Concepts ("HC") Unable to identify the keyelements of an argument. | 2 - Barely Adequate: Student's work showslimited comprehension of the H or C. Given the opportunity, sometimes uses the H or Identifies the key elements of an argument, but does not critique them. | 3 - Adequate: Student's work shows basic comprehension of the H or C and, given the opportunity, can use it consistently Can identify the key elements of an argument, and can critique them with some effectiveness, but ONLY in examples provided in class. | 4 - Good: Student's work shows consistent use of the H or C and ability to apply it to some, but not many, new/diverse Can identify the key elements of an argument, and can critique them with some effectiveness, in both examples provided in class and in similar examples | 5 - Excellent: Student's work shows comprehension of the H or C and ability to apply it to numerous new/diverse contexts Can identify the key elements of an argument and effectively critique them in both, familiar and novel contexts *OR* only novel contexts. |
|---|---|---|---|---|---|

Figure 49:
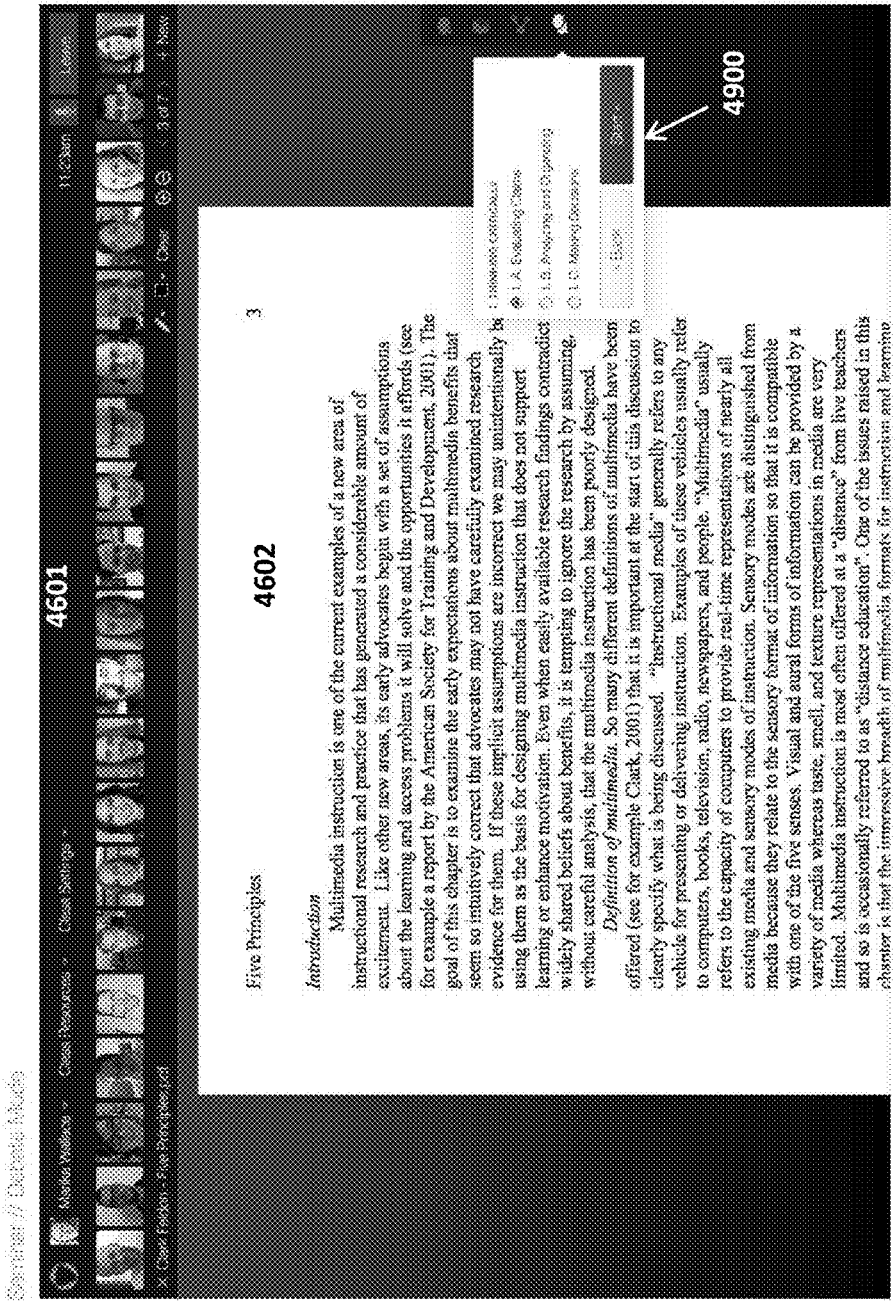
FIG. 49 illustrates an example user interface for creating a discussion.

FIG. 49 illustrates an new pop-up window 4900 generated in response to selection of an option from the pop-up window 4800 ("(I) Thinking Critically" in the example) and selecting the "Next" button. In the illustrated pop-up window, additional sub-options associated with the initial selection are illustrated including "(IA) Evaluating Claims," "(IB) Analyzing and Organizing," and "(IC) Making Decisions." Thus, each selection within a sequence of pop-up menus may generate a new set of options, until the bottom of the selection hierarchy has been reached. In this manner, various evaluation criteria may be specified for the debate by the instructor or other moderator. Responses may then be submitted with respect to the evaluation criteria during or after the debate, using an evaluation rubric such as shown in Table 1 for each evaluation criteria.

Figure 50:
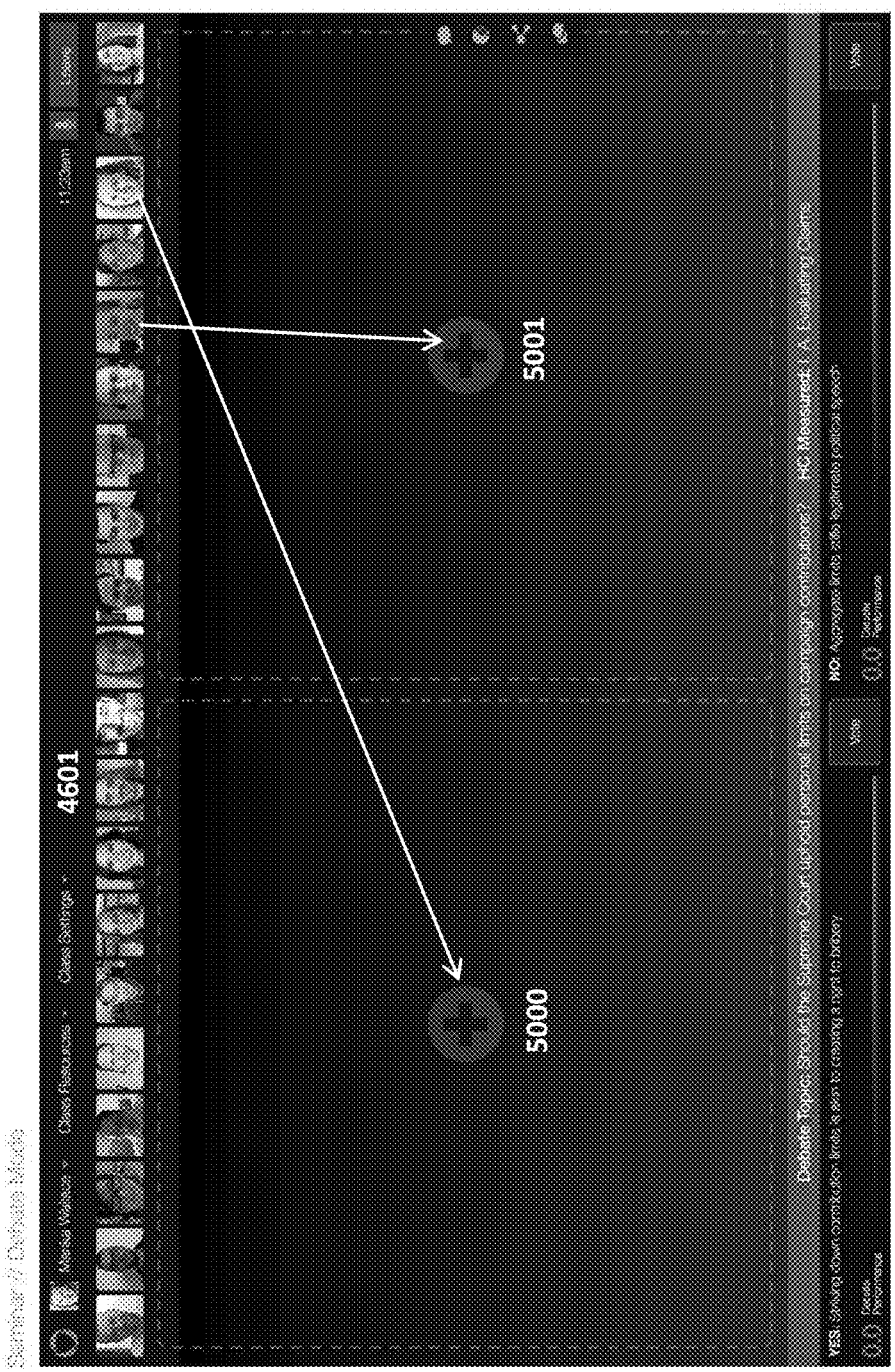
FIG. 50 illustrates an example user interface for creating a discussion.

FIG. 50 illustrates an example user interface for a debate. In this illustrated example, the instructor has chosen to select two participants to debate a topic and a first region 5000 is reserved for the video image of the first debater and a second region 5001 is reserved for the video image of the second debater. In one embodiment, the instructor may manually select the participants by clicking and dragging the thumbnail video images 4601 corresponding to the participants into a corresponding one of the two regions 5000-5001. As indicated by the arrows, a first video thumbnail of a first participant is clicked and dragged into region 5000 and a second video thumbnail of a second participant is clicked and dragged into region 5001. In one embodiment, upon selecting the two participants from the instructor's client, the state synchronization service 120 implements its publish/subscribe mechanism (described in detail above) to ensure that all clients are configured in a consistent manner (e.g., with video of the two debaters positioned in the central speaker regions 5000-5001 of the display).

Returning to FIG. 45, in one embodiment, the discussion maintenance module 4504 maintains a discussion by engaging all web conference participants. Debaters actively participate in the discussion by presenting input (e.g., verbal arguments) consistent with the position that they have been asked to take. All web conference participants stay actively engaged in the debate by providing an evaluation of each debater. The discussion maintenance module 4504 may actively request feedback from each participant as the debate progresses over time. It may request evaluations, for example, using the rubric in Table 1 to vote on each participant during and/or after the debate. A web conference leader may specify a time period in which an evaluation is required. For example, the evaluation may be limited to certain specific time windows (e.g., once every five minutes, once in the first 5 minutes and again at the last 5 minutes, etc). In one embodiment, the discussion maintenance module 4504 aggregates the evaluation data provided by each of the participants, combines the data (e.g., taking an average) and generates an evaluation in real-time. The evaluation may then be provided to the discussion participants (the debaters and/or observers) in real-time.

FIG. 50 illustrates an example user interface for evaluating a discussion participant. In the illustrated example, an observer may evaluate a discussion participant by using a menu with a button system displayed on their user interface. The options of the buttons within the menu correspond on evaluation criteria (e.g., an evaluation rubric). A discussion participant may be evaluated by using other systems. For example, evaluations may be provided by voting on a secondary device or with keyboard shortcuts or with hand gestures (e.g., using LEAP Motion controller). Also noted in the user interface is information displayed along a bottom edge corresponding to the debate topic.

Figure 51:
FIG. 51 illustrates an example user interface for evaluating a discussion participant.

FIG. 51 illustrates an exemplary graphical user interface in which the two debaters have been selected, thereby causing video images of the two debaters to be displayed within regions 5000-5001. A first voting button 5100 is displayed under the first region 5000 to allow participants to vote for the first debater and a second voting button 5101 is provided beneath the second region to allow participants to vote for the second debater.

Figure 52:
FIG. 52 illustrates an example user interface for evaluating a discussion participant.
Figure 53:
FIG. 53 illustrates an example user interface for enabling or disabling evaluation of discussion participants.

As illustrated in FIG. 52, in one embodiment, when a participant selects a voting button 5100, a set of selectable evaluation options is generated within a pop-up menu 5200. In the illustrated example, the user's performance may be rated from 0 (unsatisfactory) to 4 (excellent). However, various other review criteria may be provided. As each user selects an option from the menu, scores are compiled for each user. As mentioned, the votes can be presented to the participants in real-time or can be concealed from the participants (e.g., until the debate is over). The votes may be further presented to observers and the web conference leader. The web conference leader may specify the visibility of an evaluation while preventing viewing by others. In the example user interface shown in FIG. 53, the score 5300-5301 for each debater is visually display along with graphs 5310-5311 showing the variability of the scores over time (i.e., as the debate progresses). In one embodiment, the scores 5300-5301 comprise an average value of all votes submitted for each debater.

Figure 54:
FIG. 54 illustrates an example user interface for terminating a discussion.

A web conference leader/moderator may control the starting and the ending time of a discussion as well as enable or disable evaluations within designated time periods. Additionally, each debater may be given a predetermined amount of time to make statements in different segments. For example, 5 minutes may be given for an opening statement, 10 minutes for analysis and 5 minutes for a conclusion. As illustrated in FIG. 54, the time period and/or a timer 5400-5401 may be made visible to the web conference participants to indicate how much time is available for the current segment.

Figure 55:
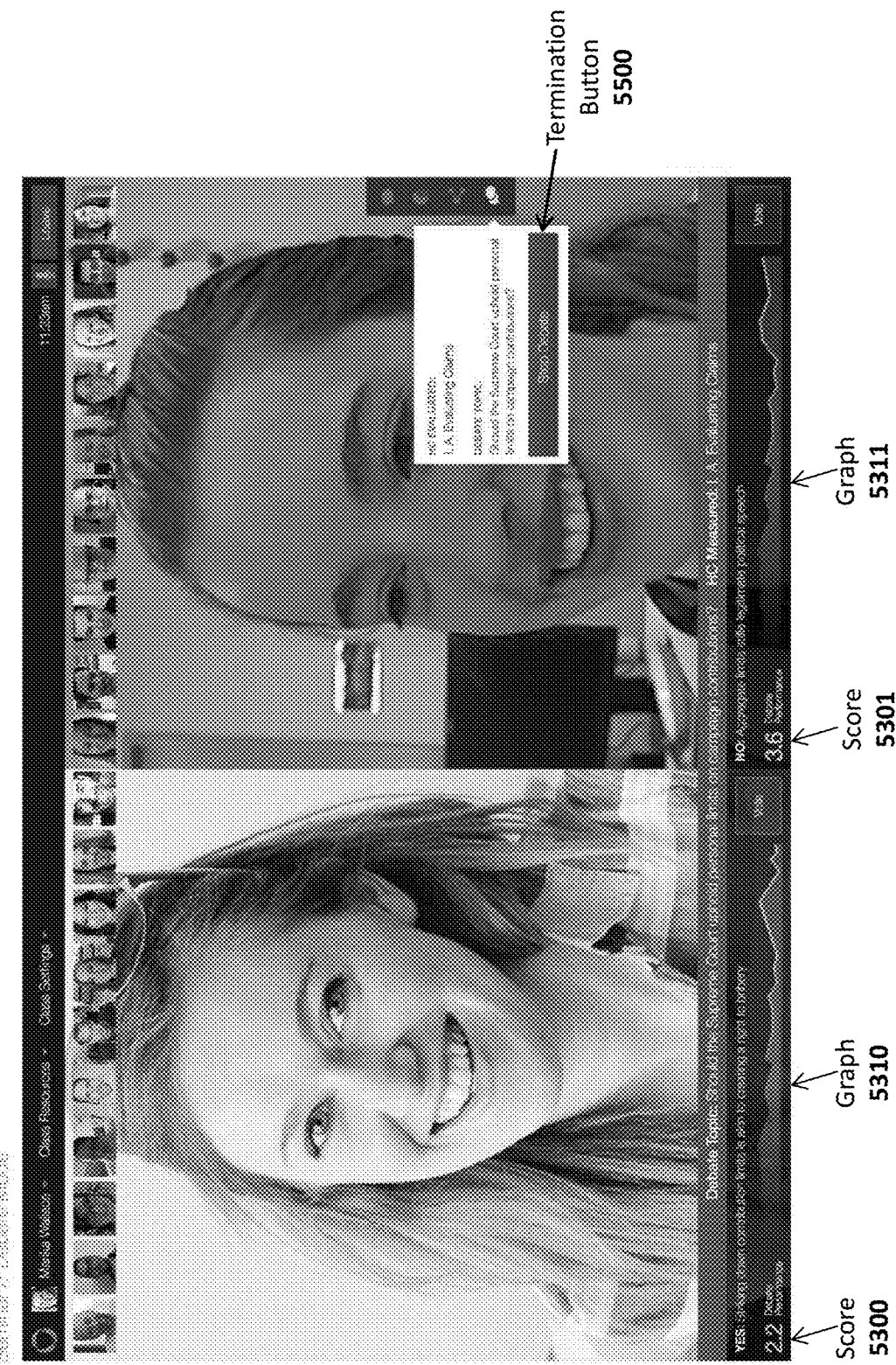
FIG. 55 illustrates an example user interface with a termination button for terminating a discussion.

FIG. 55 illustrates an example user interface with a termination button 5500 for terminating a discussion. In one embodiment, the termination button 5500 is only made available to the leader/moderator. In one embodiment, during the course of the debate, the moderator may generate flags or bookmarks at certain points in time using user interface controls so that the flagged or bookmarked portion of the debate can be reviewed at a later time (e.g., using the event filtering techniques described above, where the instructor can filter using bookmarks). In addition to bookmarking, one embodiment of the invention provides the instructor the ability to provide comments at different stages of the debate, which can later be reviewed by the debaters, the instructor, and/or other participants. Of course, the instructor or other web conference leader may choose the participants (debaters and/or observers) to be provided with access to bookmarks and/or comments. In one embodiment, the portions of a discussion with the greatest and least variability (i.e., agreement in votes) or disparity of votes (i.e., differences in ratings for the debaters) may be highlighted and subsequently reviewed. This disparity can be either among the evaluations of a single debater or between the overall evaluation of each debater, indicating junctures where one is clearly outperforming the other. A participant may be required to evaluate regularly during a discussion such as once every predetermined time interval (e.g., every 5 minutes) or at the end of each segment (e.g., following each of the opening statement, analysis, and conclusion). As such, variability or disparity can be computed both within each participant and across participants.

As described above, virtual conference sessions may be recorded. If the virtual conference includes a debate, the discussion may be organized according to each discussion participant's performance and evaluation. For example, clips of a specific duration (e.g., 10 seconds) with one or more evaluation characteristics may be identified and ordered by the evaluation characteristics. A sequence of more-to-less highly variable evaluations or of greatest-to-least disparity in overall votes (i.e., a winner most clearly indicated to least clearly indicated) may be displayed.

A web conference leader may also set up a discussion before or during the class or web conference. Discussion participants may be selected by the web conference leader or by the system. The system may select discussion participants randomly or based on answers to a previous poll or clicker-style question, the split between performances of members of breakout, groups, or other information (e.g., nationality) related to the participants. As mentioned, in one embodiment, the techniques described above with respect to the decision support module 3000 may be used to select the debaters (e.g., selecting debaters who would most benefit from the debate). Given a structured rubric and an archive of recorded discussion and the associated evaluation, participants can search for and review discussion participants who demonstrated good or bad skills defined in the evaluation rubric to serve as examples. This is done, in one embodiment, by generating a filtered event list 3502 by selecting certain participants and event types as described above.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules.

A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations.

A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APis).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing a web conference leader with information about a set of participants who may benefit the most from active participation through the disclosed principles herein. Thus, while particular embodiments and applications have been illustrated and described, it is to be understood that the disclosed embodiments are not limited to the precise construction and components disclosed herein.

Various modifications, changes and variations, which will be apparent to those skilled in the art, may be made in the arrangement, operation and details of the method and apparatus disclosed herein without departing from the spirit and scope defined in the appended claims.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
   a plurality of clients operated by participants and at least one moderator of a virtual conference;
   a virtual conferencing service to establish audio and/or video connections between the plurality of clients during the virtual conference;
   a contribution identification module to identify speaking events related to actions of participants during the virtual conference and to associate each speaking event with an audio recording of the speaking event, wherein the contribution identification module is to identify the speaking event by monitoring a participant's audio input and detecting a sound that is above a volume threshold and likely to be recognized as human speech; and
   a speech recognition module to translate each audio recording into text, each translated text to be stored and associated with a respective speaking event from which the audio recording was used to generate the text.

2. The system as in claim 1, wherein the contribution identification module is to identify the speaking event by detecting a first participant activating a microphone by holding a specific key on a keyboard or by toggling a button during the virtual conference.

3. The system as in claim 1, wherein the audio recording is uploaded and archived at a multimedia storage service of the virtual conferencing service.

4. The system as in claim 3, wherein the speech recognition module is to perform translation of audio recording into text at the multimedia storage service.

5. The system as in claim 1, wherein the audio recording is stored at the client of a speaking participant.

6. The system as in claim 5, wherein the speech recognition module is to perform translation of audio recording into text at the client of the speaking participant.

7. The system as in claim 1, wherein each identified speaking event is associated with one or more reference time points in the audio recording.

8. The system as in claim 7, wherein the one or more reference time points comprise a first reference time point to indicate a starting point of the identified speaking event and a second reference time point to indicate a completion point of the identified speaking event.

9. The system as in claim 1, wherein the speech recognition module is to translate the audio recordings into text during the virtual conference.

10. The system as in claim 1, wherein the speech recognition module is to translate all audio recordings after completion of the virtual conference.

11. A method comprising:
establishing audio and/or video connections between a plurality of clients with a virtual conference service during a virtual conference, the plurality of clients operated by participants and at least one moderator of the virtual conference, each of the plurality of clients further to maintain a current state of the virtual conference;
monitoring
identifying speaking events related to actions of participants during the virtual conference and to associate each speaking event with an audio recording of the speaking event, wherein the identifying comprises monitoring a participant's audio input and detecting a sound that is above a volume threshold and likely to be recognized as human speech; and
translating each audio recording into text, wherein each translated text is stored and associated with a respective speaking event from which the audio recording was used to generate the text.

12. The method as in claim 11, wherein identifying speaking events related to actions of participants during the virtual conference further comprises detecting a first participant activating a microphone by holding a specific key on a keyboard or by toggling a button during the virtual conference.

13. The method as in claim 11, further comprising uploading and archiving the audio recordings at a multimedia storage service of the virtual conferencing service.

14. The method as in claim 13, further comprising performing translation of the audio recordings into text at the multimedia storage service.

15. The method as in claim 11, further comprising storing the audio recordings at the client of a speaking participant.

16. The method as in claim 15, further comprising performing translation of audio recording into text at the client of the speaking participant.

17. The method as in claim 11, associating each identified speaking event with one or more reference time points in the audio recording.

18. The method as in claim 17, wherein the one or more reference time points comprise a first reference time point to indicate a starting point of the identified speaking event and a second reference time point to indicate a completion point of the identified speaking event.

19. The method as in claim 11, further comprising translating the audio recordings into text during the virtual conference.

20. The method as in claim 11, further comprising translating all audio recordings after completion of the virtual conference.

21. A system comprising:
a plurality of clients operated by participants and at least one moderator of a virtual conference;
a virtual conferencing service to establish audio and/or video connections between the plurality of clients during the virtual conference;
a contribution identification module to identify speaking events related to actions of participants during the virtual conference and to associate each speaking event with an audio recording of the speaking event, wherein the contribution identification module is to identify the speaking event by detecting a first participant activating a microphone by holding a specific key on a keyboard or by toggling a button during the virtual conference; and
a speech recognition module to translate each audio recording into text, each translated text to be stored and associated with a respective speaking event from which the audio recording was used to generate the text.

22. The system as in claim 21, wherein the audio recording is uploaded and archived at a multimedia storage service of the virtual conferencing service.

23. The system as in claim 22, wherein the speech recognition module is to perform translation of audio recording into text at the multimedia storage service.

24. The system as in claim 21, wherein the audio recording is stored at the client of a speaking participant.

* * * * *